United States Patent
Carmein

[11] Patent Number: 5,980,256
[45] Date of Patent: *Nov. 9, 1999

[54] VIRTUAL REALITY SYSTEM WITH ENHANCED SENSORY APPARATUS

[76] Inventor: David E. E. Carmein, 9200 Russell Ave. S., Bloomington, Minn. 55431

[ * ] Notice: This patent is subject to a terminal disclaimer.

[21] Appl. No.: 08/600,893

[22] Filed: Feb. 13, 1996

Related U.S. Application Data

[63] Continuation-in-part of application No. 08/401,550, Mar. 10, 1995, Pat. No. 5,562,572, and a continuation-in-part of application No. 08/145,413, Oct. 29, 1993, Pat. No. 5,490,784.

[51] Int. Cl.$^6$ ....................................................... G09B 9/00
[52] U.S. Cl. ......................... 434/55; 434/29; 434/307 R; 434/365; 482/902
[58] Field of Search .................................. 434/29, 30, 34, 434/35, 37, 38, 40, 43, 45, 55, 58, 59, 62, 69, 118, 247, 307 R, 308, 365, 372; 482/1–9, 71, 72, 52, 54, 55, 57, 900–903; 472/2, 17, 60, 132; 73/379.01, 299, 323; 463/1, 36; 345/157, 179, 302, 473, 8; 414/4, 5; 348/121; 198/370.01–370.03, 779, 371.01–371.03, 840

[56] References Cited

U.S. PATENT DOCUMENTS

| | | |
|---|---|---|
| 2,344,454 | 3/1944 | Plotner . |
| 3,135,057 | 6/1964 | Nelson et al. . |
| 3,281,963 | 11/1966 | Johnson . |
| 3,451,526 | 6/1969 | Fernandez . |
| 3,514,102 | 5/1970 | Wakefield . |
| 3,550,756 | 12/1970 | Kornylak . |
| 4,489,932 | 12/1984 | Young . |
| 4,536,690 | 8/1985 | Belsterling et al. . |
| 4,545,574 | 10/1985 | Sassak . |
| 4,753,596 | 6/1988 | Hart et al. . |
| 4,856,771 | 8/1989 | Nelson et al. . |
| 4,906,192 | 3/1990 | Smithard et al. . |
| 4,908,558 | 3/1990 | Lordo et al. . |
| 4,934,694 | 6/1990 | McIntosh . |
| 4,995,603 | 2/1991 | Reed . |
| 5,018,973 | 5/1991 | Alet et al. . |
| 5,051,094 | 9/1991 | Richter et al. . |
| 5,054,771 | 10/1991 | Mansfield . |
| 5,060,932 | 10/1991 | Yamaguchi . |
| 5,071,352 | 12/1991 | Denne . |
| 5,076,584 | 12/1991 | Openiano . |
| 5,179,525 | 1/1993 | Griffis et al. . |
| 5,182,150 | 1/1993 | Carlos et al. . |
| 5,185,561 | 2/1993 | Good et al. . |
| 5,186,270 | 2/1993 | West . |
| 5,229,756 | 7/1993 | Kosugi et al. . |
| 5,238,099 | 8/1993 | Schroeder et al. . |
| 5,240,417 | 8/1993 | Smithson et al. . |
| 5,319,387 | 6/1994 | Yoshikawa ............................. 345/179 |
| 5,320,538 | 6/1994 | Baum . |
| 5,322,441 | 6/1994 | Lewis et al. . |
| 5,354,162 | 10/1994 | Burdea et al. ............................. 414/5 |
| 5,385,519 | 1/1995 | Hsu et al. . |
| 5,490,784 | 2/1996 | Carmein . |
| 5,495,576 | 2/1996 | Ritchey . |

*Primary Examiner*—Joe H. Cheng
*Attorney, Agent, or Firm*—Fredrikson & Byron, PA

[57] ABSTRACT

The invention provides a motion simulating device which provides the user with full freedom of motion. Ideally, the motion is coordinated with the user's senses. The motion simulating device may include a generally spherical capsule supported by a number of rollers, at least one of which is a multi-directional active roller which frictionally engages the spherical capsule. This causes the spherical capsule to rotate in any desired direction. The capsule may have mounted within it an interactive solid, which may take the form of an omni-directional treadmill for supporting the user.

28 Claims, 37 Drawing Sheets

FIG. I

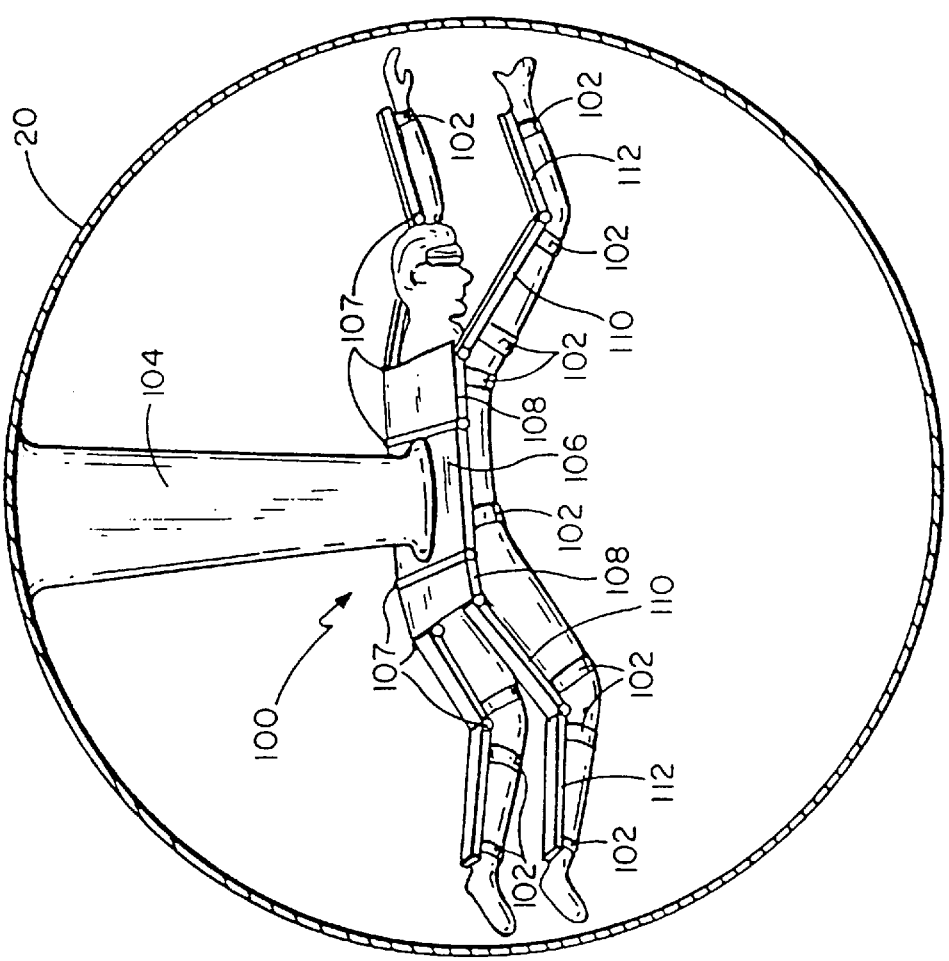

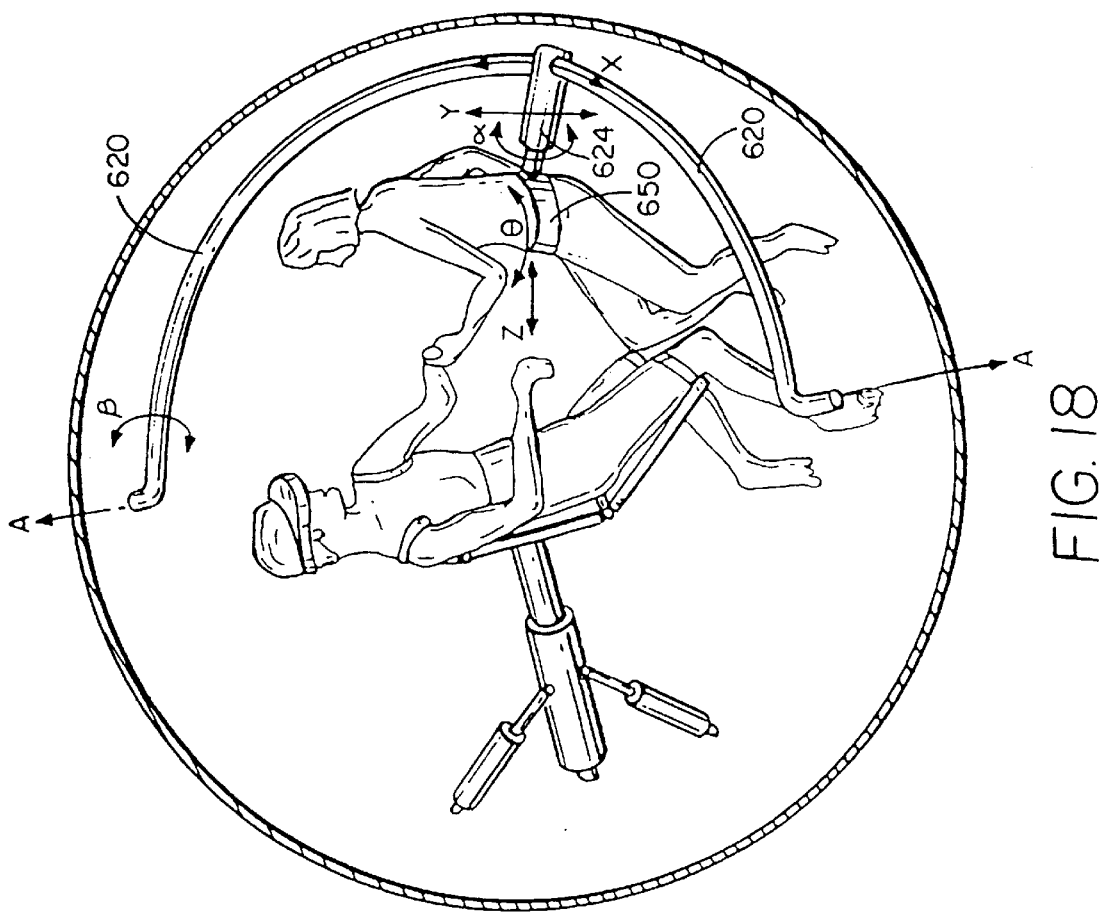

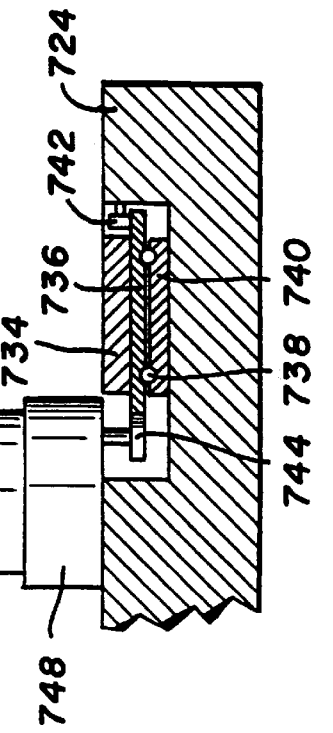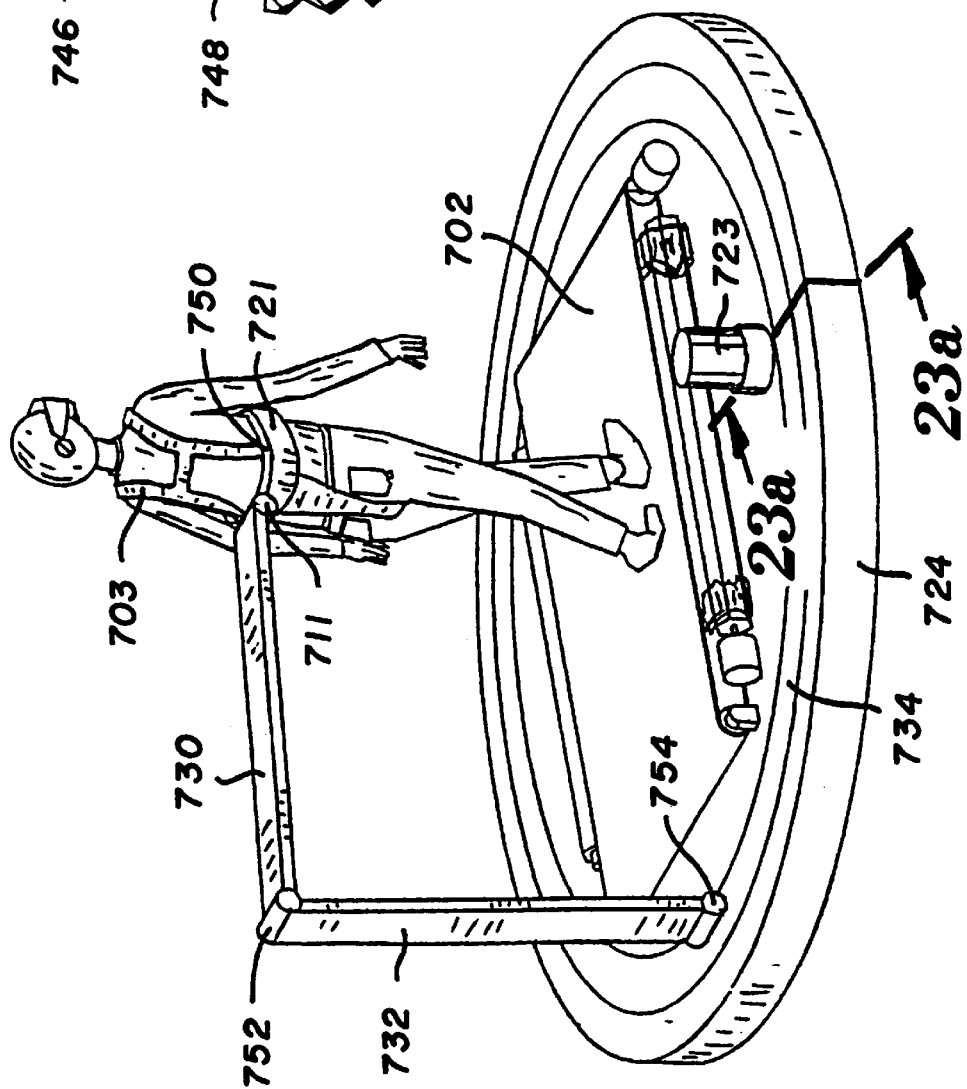

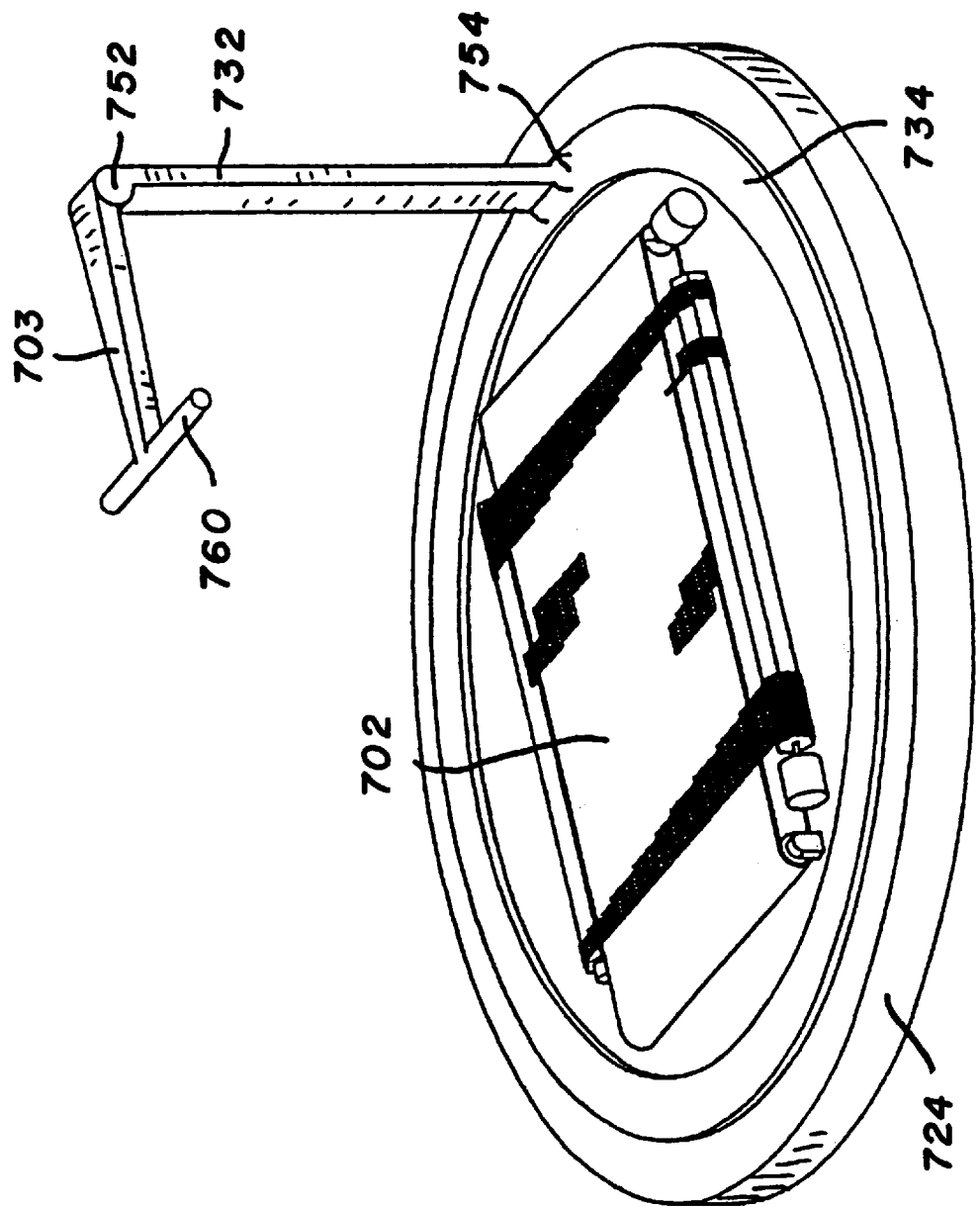

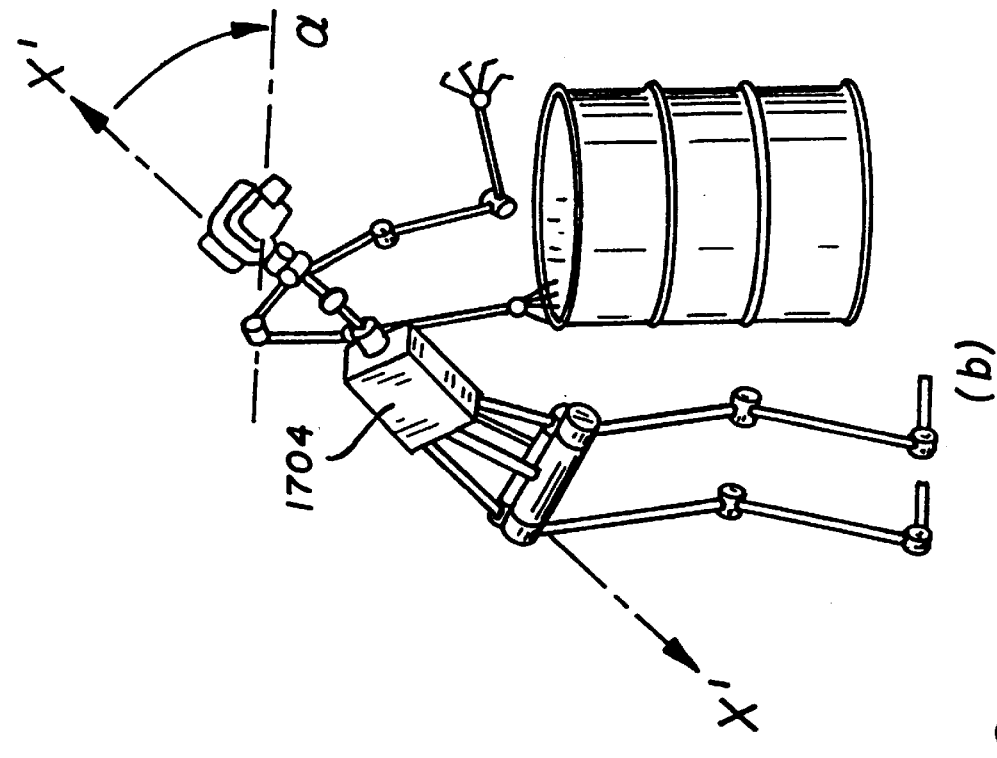
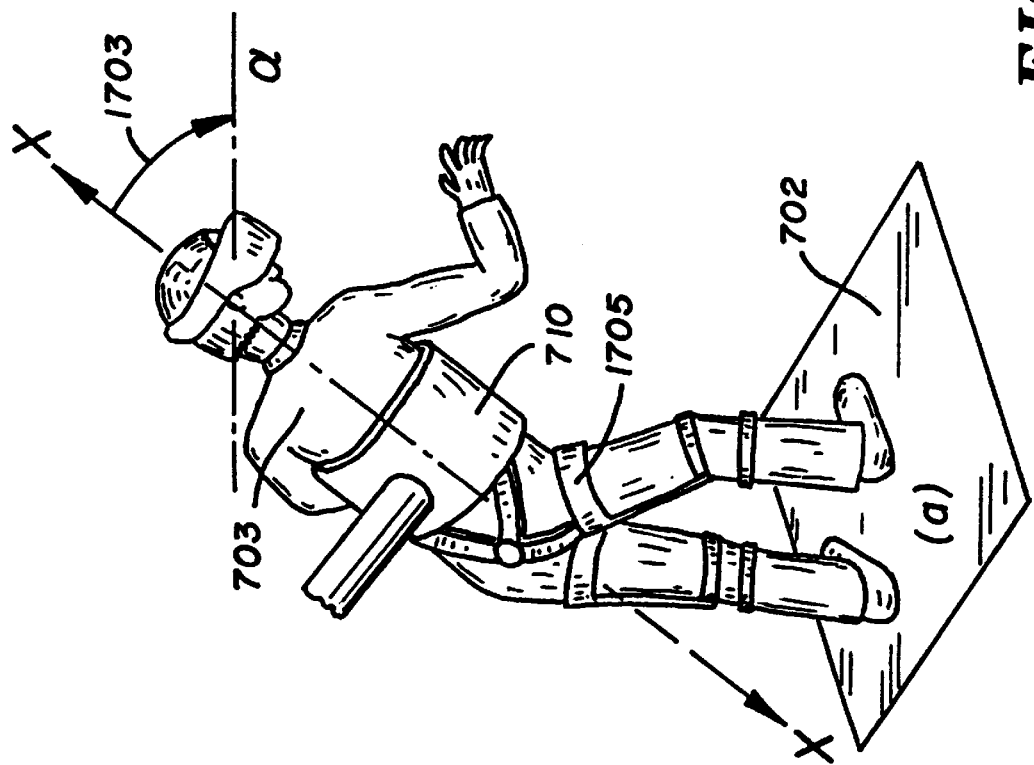
FIG. 39

VIRTUAL REALITY SYSTEM WITH ENHANCED SENSORY APPARATUS

RELATED APPLICATIONS

The present application is a continuation-in-part of U.S. patent application Ser. No. 08/401,550 (filed Mar. 10, 1995), now U.S. Pat. No. 5,562,572, and of U.S. patent application Ser. No. 08/145,413 (filed Oct. 29, 1993), now U.S. Pat. No. 5,490,784.

FIELD OF THE INVENTION

The present invention generally relates to training and entertainment devices and provides a device particularly useful in interactive simulation environments such as are encountered in flight simulators, computer-based video games, and "virtual reality" systems.

BACKGROUND OF THE INVENTION

In virtual reality ("VR"), the sensation of motion is coordinated with the senses of sight, sound, and even touch. The "environment" that a person experiences is manufactured and contained in the silicon of computer processors and memory. Flight simulators used for training professional pilots and astronauts are a type of virtual reality system commonly in use today. As technology advances, the applications for "virtual reality" have grown well beyond such expensive, specialized equipment and are anticipated as being increasingly common as home entertainment or learning devices.

Although the hardware and software for generating the audio and visual components of virtual reality systems has been decreasing in cost, motion systems for use with such components to complete a virtual reality system have consistently been prohibitively expensive. Furthermore, the motion systems are either too complex, limited in their freedom of motion, or lack adequate responsiveness.

Various devices have been proposed for generating motion. U.S. Pat. No. 4,489,932, for example, describes a sphere resting on three passive casters, with motion of the sphere being actuated either by the user shifting his weight inside the sphere or by a multi-directional drive wheel. Another device for generating motion is found in U.S. Pat. No. 4,545,574, which discloses a sphere supported by an air stream moving within a large tube where the sphere is rotatable by louvers directing the force of the air around the sphere. Although both U.S. Pat. Nos. 4,489,932 and 4,454,574 describe a sphere rotatable about the three orthogonal axes at the center of the sphere, these devices cannot move the center of the sphere with respect to the external environment, i.e. they are not capable of linear motion. Moreover, these devices described in these patents also lack an interactive system coordinating motion, sight, and sound.

Other patents have proposed simulated motion devices which coordinate motion with audio and visual input. U.S. Pat. No. 3,135,057, for example, shows a capsule disposed within heavy inertial rings offset at 90° from one another. U.S. Pat. No. 4,856,771 shows a system that coordinates motion, video, and sound by using a cockpit situated inside two rings that are offset by 90° where the rings rest on a rotatable base. U.S. Pat. No. 5,060,932 describes a large gyroscope-like device where various means of visual and aural stimulations are provided. Although U.S. Pat. Nos. 3,135,057, 4,856,771, and 5,060,932 describe motion devices that combine motion with audio and visual input, they all are limited in their applicability to virtual reality systems because of their slow response or large expense.

U.S. Pat. No. 4,908,558 describes a spherical motion simulator mounted on a stationary frame for angular and translational movement along pitch, roll and yaw axes. Magnetic bearing supported by the stationary frame provide three degrees of freedom. Drive means mounted on the stationary frame and connected to the test unit generate three degrees of freedom of movement.

U.S. Pat. No. 5,071,352 describes a motion platform with limited translational and rotational motion. An arrangement of three linear actuators is combined with an A-frame type restraining mechanism to allow rotation about the pitch and roll axes and along a vertical axis. A multiple-user capsule sits on a rigid frame and users view images and experience sound in coordination with motion.

Current devices for simulating motion are cumbersome and expensive. As a result, the devices have slow response times. Moreover, these devices are limited in their ability to provide linear and rotational motion about three orthogonal axes.

A major limitation in state-of-the art VR is the inability to permit simple walking and running. Navigation is typically experienced as a disembodied center of consciousness which is directed by pointing, other gesture or by manipulation of a joystick, trackball, mouse, or similar device. The actual physical sensation of walking is limited to one of two forms: a) The user is restricted to a confined and immobile surface where tracking and signal generation are well-controlled, and b) the user is confined to device such as a linear treadmill or wheelchair which transduces the user's linear motion to virtual space navigation. The conventional linear treadmill has a movable track which can be upwardly inclined. The track is only movable in one direction which restricts motion of the user to the direction of movement of the track. A monitor, such as a motivational electric display, associated with the track, records the time, speed, and distance accomplished by the user.

Use of a linear treadmill, consisting of one continuous moving track, in conjunction with a monitor permits a user to walk in a straight line. The user cannot step in arbitrary directions as he or she would be able to in real life. This limitation in directionality detracts from the immersive nature of the experience, and requires that the experience take on more of a vehicular nature rather than freely walking and navigating body.

SUMMARY OF THE INVENTION

The present invention provides a mechanical system for creating motion with six full degrees of freedom; three rotational degrees of freedom and three linear-translational degrees of freedom. In its broader aspect, the present invention enables a user to physically experience full freedom of motion within a limited space.

In a preferred embodiment, the present invention provides a device in which the user will experience full freedom of motion in coordination with the user's senses of sight, hearing, and touch. A user utilizing the motion simulating device of the present invention will be able to interact with an electronic environment using many of the same senses used in the natural world. The claimed invention enables interaction with an electrically generated environment by employment of the user's natural center of balance center and sense of direction.

In its basic form, the motion simulating device consists of a generally spherical capsule that is supportively abutted by a number of rollers. At least one of the rollers is a multi-directional active roller that frictionally engages the capsule causing the capsule to rotate in any direction. A preferred embodiment uses three active rollers to impart rotational motion to the capsule. All rotational modes may be provided by rotating the sphere upon the rollers.

The linear, or translational, motion is imparted to the capsule by attaching the rollers to a movable frame. The translational modes are achieved by using actuator legs capable of moving the frame along one axis or, more preferably, with respect to three orthogonal axes.

Optimally, an interactive control means that coordinates sight, sound, and touch may be operatively connected to the capsule, active rollers, and frame. Through the interactive control means, a user may control and respond to a variety of environments and experience the corresponding motion associated with the user's control.

One objective of this invention is to enable the user to physically experience full freedom of motion in a responsive and less expensive device. Another objective of the invention is to permit a user to move in coordination with electronic simulation physical reality.

In accordance with another embodiment of the invention, active interactive solids and passive interactive solids are incorporated into a virtual reality system to impart the sensation of touch to the user. Interactive solids generally may be used to impart physical confirmation of what the user is touching in the virtual electronic environment. Active interactive solids are self-actuating objects operatively connected to the interactive control means. Active interactive solids may move in coordination with the electronic simulation of physical reality and physical input from the user. Passive interactive solids are not self-activating, and as such, provide physical confirmation of fixed objects generated in the virtual environment.

An active interactive solid may include an interactive support apparatus which is disposed within the capsule to impart the sensation of touch to the user. The interactive support apparatus includes a translatable support arm connected to a pneumatic support suit. A user can experience the sensation of support such as floating in water or other physical activity by imparting resistive forces to the pneumatic support suit.

The instant invention imparts full rotational freedom while minimizing the number of moving parts. Such freedom may be experienced as a "barrel" roll as they fly in a virtually-created fighter jet, or the tumbling of a virtual car involved in an end-over-end drivers' training accident.

The present invention efficiently utilizes the relatively low moment of inertia inherent in a rigid and light spherical structure. A maximum of rotational acceleration and deceleration is realized around all axes by utilizing a generally spherical capsule, minimizing the number and complexity of moving parts, and generally centering the interior mass.

In another embodiment, the invention employs an interactive solid which is similar to a linear treadmill in that the user is able to walk or run in an upright manner and employ proprioceptive sensing along with balance to imbue a sense of reality to the simulated environment. Alternatively, the user may assume any manner of postures with respect to the planar active surface. Other postures include kneeling, crawling on hands and knees, belly crawling, sitting and lying prone.

This embodiment of the invention employs an omni-directional treadmill apparatus that allows a user, such as a person, to walk or run in any arbitrary direction. The apparatus has a frame for supporting the apparatus on a fixed surface. A track assembly mounted on the frame provides a user support that moves in a direction determined by directional orientation of the user on the track assembly. The track assembly has a user support movable in first direction by a first drive motor. The user support means includes user support members rotatable about axes generally normal to the direction of movement of the support. A second drive, such as a power driven endless belt, engages the user support members to rotate the user support members whereby the combined movement of the user support members and user supports results in omni-directional user movement. Controls responsive to the directional orientation of the user on the user support selectively control the operation of the first and second drives which in turn controls the directional user movement to conform with the orientation of the user on the user support.

BRIEF DESCRIPTION OF THE DRAWINGS

FIG. 8 is a perspective view of an alternative interactive support apparatus, where the user is in a suspended position;

FIG. 18 is an elevational view of an interactive solid in accordance with another embodiment of the invention with a positioning track;

FIG. 23 is a perspective view of an alternative embodiment of a treadmill of the invention;

FIG. 23a is an enlarged sectional view taken along line 23a—23a of FIG. 23;

FIG. 24 is a perspective view of another embodiment of a treadmill of the invention;

FIGS. 39a and 39b are diagrammatic views showing how the user at one site controls a remote device at a distant site.

DETAILED DESCRIPTION OF THE INVENTION

Figure 1:
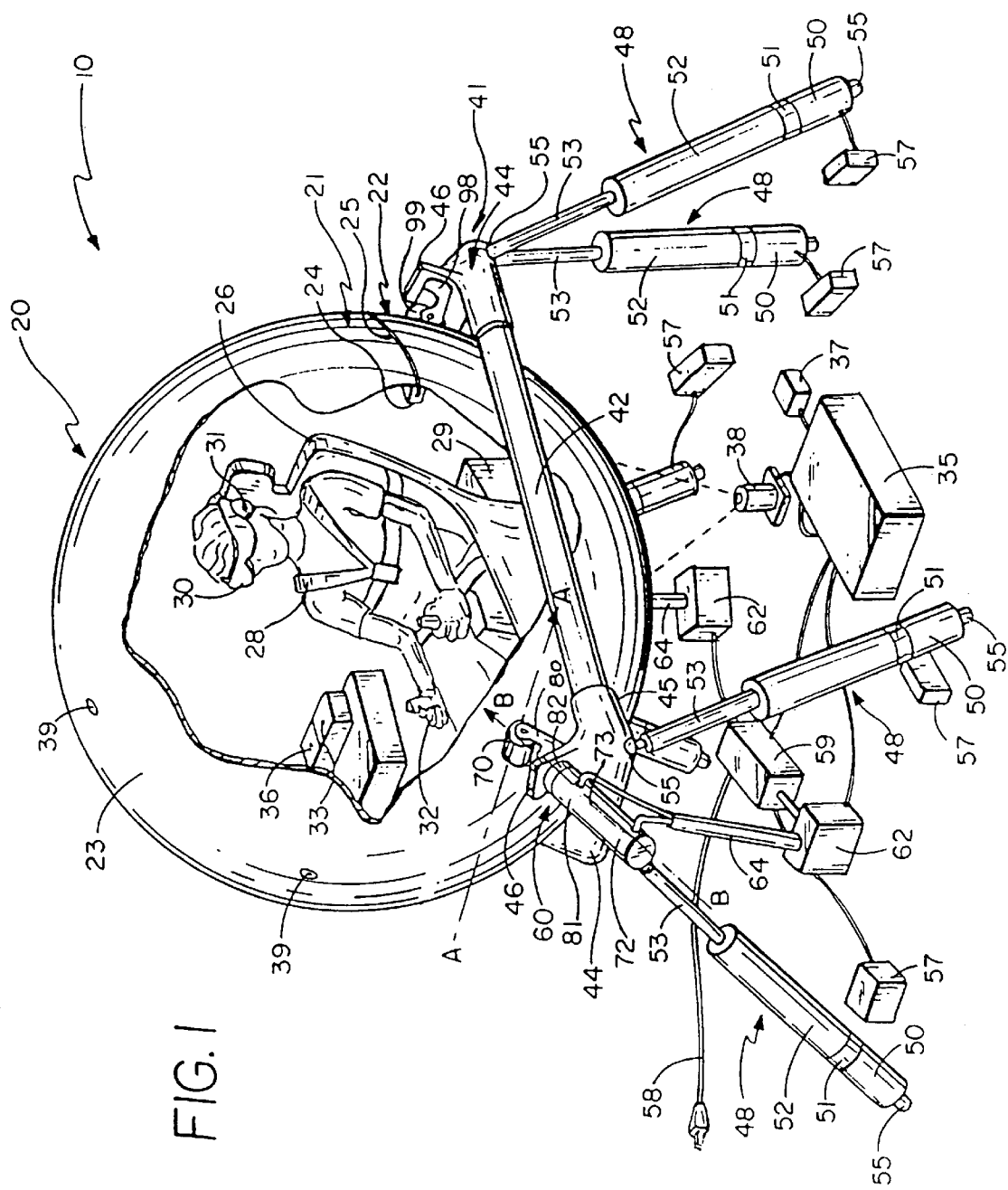
FIG. 1 is an elevational view of a motion simulating device in accordance with the invention.
Figure 2:
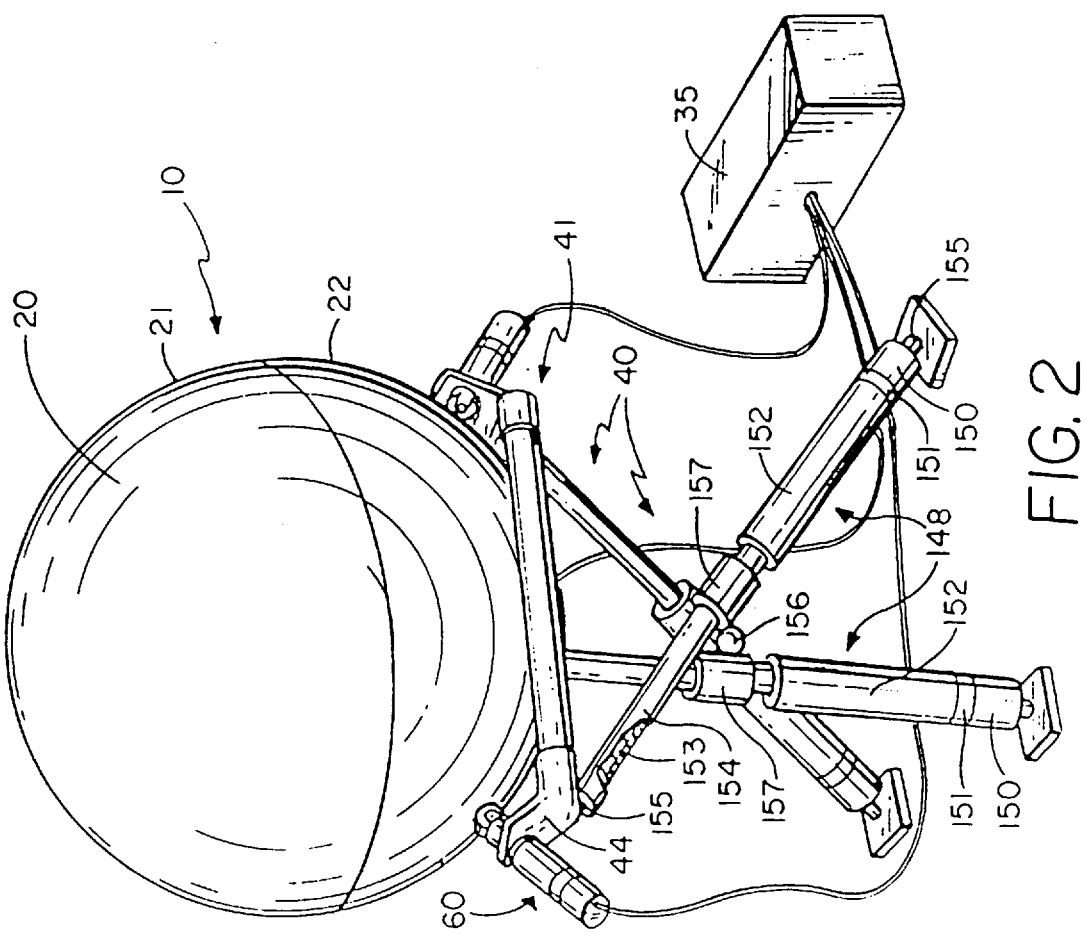
FIG. 2 is an elevational view of a motion simulating device in accordance with another embodiment of the invention.
Figure 3:
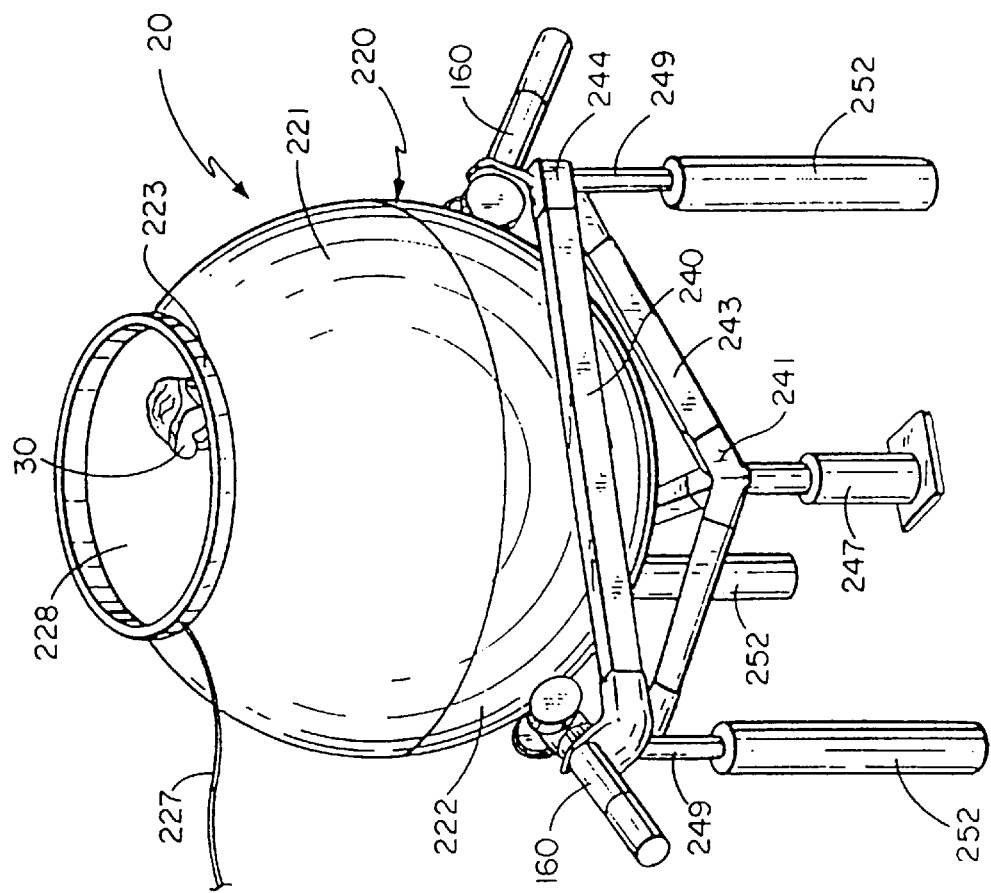
FIG. 3 is an elevational view of a third embodiment of the present motion simulating device.

A motion-simulating device (10) embodying the invention is illustrated in FIGS. 1–3. The device (10) comprises a generally spherical capsule (20) that rests on at least three rollers, with one or more active rollers (60) and, optionally, one or more passive rollers (99). These rollers are attached to a translatable frame (40).

In a preferred embodiment, a capsule is supportively abutted by three rollers of which two of the rollers are multi-directional active rollers. The rollers are then attached to a triangular platform which is linearly translatable along three orthogonal axes by six actuator legs. Each apex of the triangular platform is rotationally connected to two actuator legs and each of the actuator legs is rotationally connected on the other end to the ground. The visual and audio input, as well as the responsive output from the user, are then processed by computers which control the active rollers and actuator legs.

FIG. 1 shows a capsule (20) having an upper hemisphere (21) and a lower hemisphere (22). The upper hemisphere (21) and the lower hemisphere (22) may be hingedly connected at an internal hinge (24) and open along an equatorial contact line (25). The capsule (20) is fitted with a chair (26) and a set of full restraint harnesses (28). A user may receive visual input from a head-mounted visual display (30) and audio input from earphones (31) or speakers within the sphere (not shown). In an alternative embodiment, the visual input may be displayed upon the inner walls of the capsule (20).

When operating the virtual reality system, the user may control the motion of the frame (40) and the capsule (20) by a suitable controller. In the embodiment shown in the drawings, the controller may comprise two control sticks (32) with each control stick being capable of controlling three degrees of freedom, as detailed below.

The translatable frame (40) shown in FIG. 1 has three beams (42) which are rigidly connected to one another by connecting joints (44) at beam receptacles (45) to form a triangular platform (41). Each connecting joint (44) includes a mounting plate (46) for supporting either an active roller (60) or a passive roller (99). Each connecting joint (44) is supported by two actuator legs (48). The actuator legs (48) may each comprise a movable rod (53), a support housing (52), an actuating motor (50), and a gear reduction means (51). The movable rod (53) is driven by the actuating motor (50) so that the movable rod travels along the longitudinal axis of the support housing (52). The actuator legs (48) are attached to the connecting joints (44) and to the ground by rotatable connectors (55). By selectively and differentially moving the actuator legs (48), the triangular frame (41) can be translated along any of the three orthogonal axes. Such a construction is known to those skilled in the art as a Stuart platform. It is recognized that the movement of the triangular platform (41) may be effected by a variety of constructions of rigid members, flexible members, bearings, sliders, motors, and related motion system components.

The active rollers (60) and the passive rollers (99) are attached to the connecting joints (44) at the mounting plates (46). In a preferred embodiment, the capsule (20) is driven by two active rollers (60) about three orthogonal axes located at the center of the capsule (20), and a single passive roller (99) rests substantially upon a thrust bearing (98).

Each active roller (60) includes a drive wheel (70) that is attached to a rotating yoke (80). The drive wheel (70) is driven by a drive wheel motor (72) and a reduction means (73). The drive wheel (70) is rotatable about a drive axis "A—A" that is generally parallel to a tangent to the surface of the capsule (20). The drive wheel (70) frictionally engages the capsule (20) and causes the capsule (20) to rotate in a direction perpendicular to both the drive axis "A—A" and axis "B—B." The drive wheel (70) is rotatable about axis "B—B" by rotating the yoke (80). The yoke (80) is rotatably driven by the yoke motor (81) and a reduction means (82). In a preferred embodiment, the capsule (20) may be coated with a friction enhancing substance such as silicon carbide particles encapsulated by a spreadable liquid binder, or the surface may be roughened by a light sand blasting to enable faster rotational acceleration.

The active rollers (60) and the actuator legs (48) are controlled by an interactive virtual reality control system. The rotational position of the capsule (20) is measured, e.g., by a gyroscope (33), and the measurement, e.g., output from the gyroscope, is routed through an internal computer (34), which may be located inside the capsule (20). Once position information is processed by the internal computer (34), the data is optimally sent through a transmitter (36) to a receiver (37). The receiver (37) then sends the position data to the main computer (35), which may be located outside of the capsule (20).

The main computer (35) is also connected to the actuator motor controllers (57) and the active roller controllers (62). The actuator motor controllers (57) control the actuator legs (48). The active roller controllers (62) are connected to the active rollers (60) by a cable (64). The main computer (35) may also receive position data from the actuator legs (48) to determine the translational location of the platform (41).

While using the interactive virtual reality control system, a head-mounted display adjusts the images it displays in response to the user's movements. Data entry in the sphere for visual images, sound, and touch, can use a high-speed digital laser transmission system having a wide-beam transmitter (38) and a plurality of capsule receivers (39). Such capsule receivers (39) are evenly spaced on the outside of the capsule (20). The data entering the capsule (20) is processed by the internal computer (34) and then routed to the head-mounted visual display (30) and the earphones (31). An internal battery (29), which is rechargeable during periods of non-use and readily replaceable, powers the electrical system inside the capsule (20). A line voltage supply (58) connected to a power supply (59) provides the power for the electrical components located outside of the capsule (20).

FIG. 2 shows an alternative embodiment of the invention employing a different actuator leg system. The capsule (20) is supported by the active rollers (60) whose drive means are attached to the triangular platform (41) through the connecting joints (44). Linear actuation is achieved by placing the triangular platform (41) on top of a tripod comprised of three actuator legs (148). Every connecting joint (44) is supported by a single actuator leg (148). The actuator legs (148) may have the same structure as the legs (48) detailed above. Preferably, though, the legs (148) comprise a ball screw (153) (shown through cutaway), a supporting housing (152), an actuating motor (150), and a gear reduction means (151). Rotatable ball joints (155) attach the actuator legs (148) to the triangular platform (41) and to the ground. The actuator legs (148) are positioned relative to each other at their centers by a sliding fastener plate (156) through linear-rotational bearings (157). The ball screw (153) is held within a smooth-walled upper support cylinder (154) so that the linear rotational bearings (157) have a smooth and rigid surface upon which to travel.

As the actuator legs (148) change their lengths, the sliding fastener plate (156) passively seeks a position that keeps the tripod of actuator legs (148) rigid and stable. The tripod arrangement of actuator legs (148) as depicted in FIG. 2 will impart a known rotation about the vertical axis for any linear motion transmitted. Such rotation about the vertical axis may be negated by an equivalent counter-rotation of the capsule (20) itself. It is recognized that the movement of the triangular platform (41) may be effected by a variety of constructions of rigid members, flexible members, bearings, sliders, motors, and related motion system components.

In FIG. 3, a motion simulating device (210) having four degrees of freedom is depicted. The motion simulating device (210) retains full rotational motion, but linear motion is limited to up and down. In the embodiment shown in FIGS. 1 and 2, communication between the internal and man computers (24 and 35, respectively) is accomplished through the transmitter (36) and receiver (37). FIG. 3 illustrates a less expensive, though somewhat more cumbersome, system using a fixed cable. In this version, rotation around either horizontal axis is limited by the cable ring (223), which can serve as a movable means of attachment for a dedicated data exchange and a power cable (227). The motion simulating device (210) has a single translational mode which is along its vertical axis. The active rollers (160) rotate the capsule (220).

In the embodiment of FIG. 3, a user with a head-mounted visual display (30) is visible through an access port (228) in the upper hemisphere (221). A single actuator (227), attached to the ground at one end and an apex-connecting joint (241) at the other end, provides the single translational motion along the vertical axis. The apex-connecting joint (241) is connected by rigid supports (243) to the connecting joints (244). Stability is enhanced by rigid attachment of the sliding members (249) to the connecting joints (244). The sliding members (249) are free to move vertically, but are constrained in all other directions by housings (252) that are attached rigidly to the ground.

Figure 4:
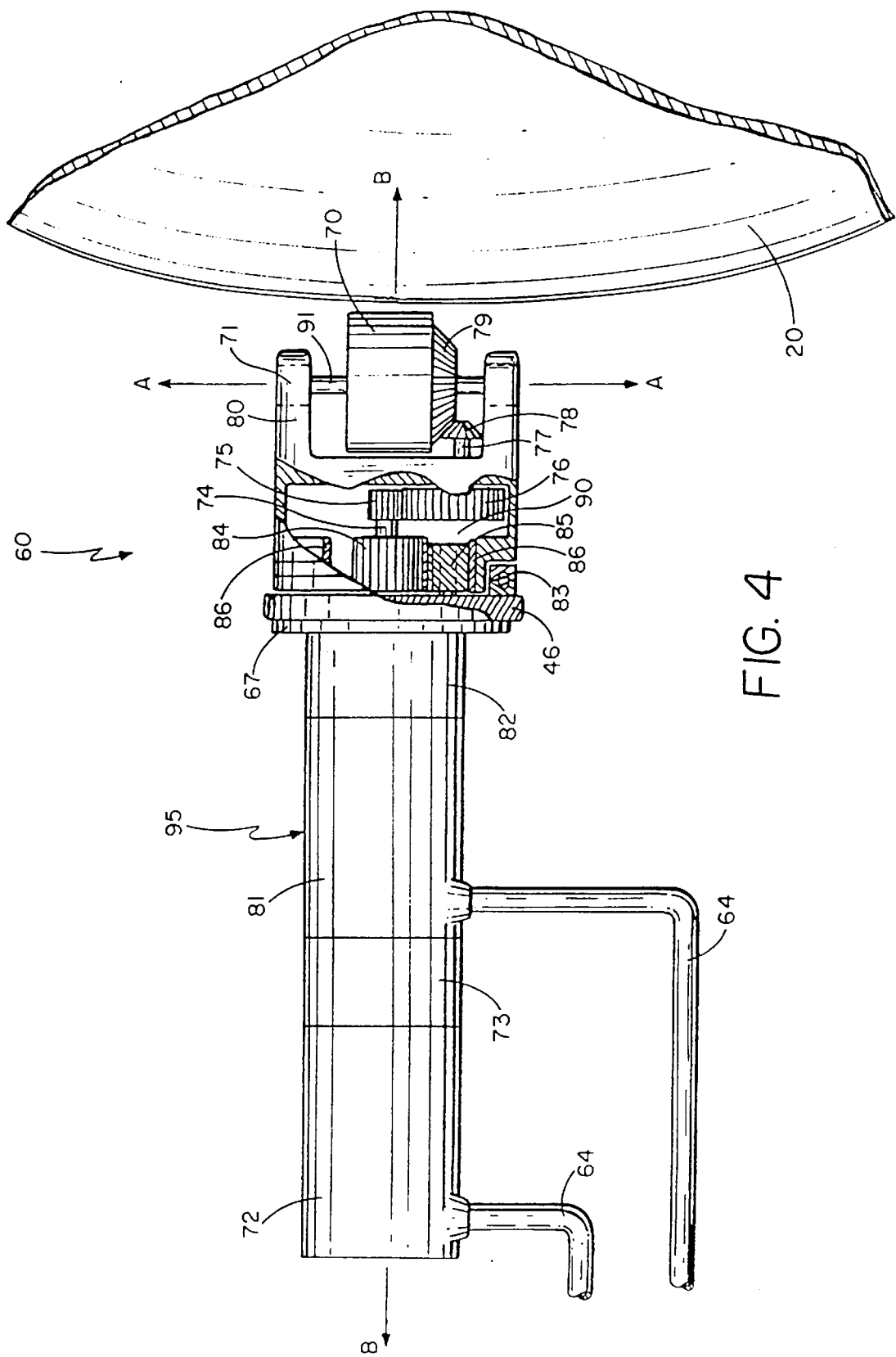
FIG. 4 is a cut-away view of an active roller for use in the invention.
Figure 5:
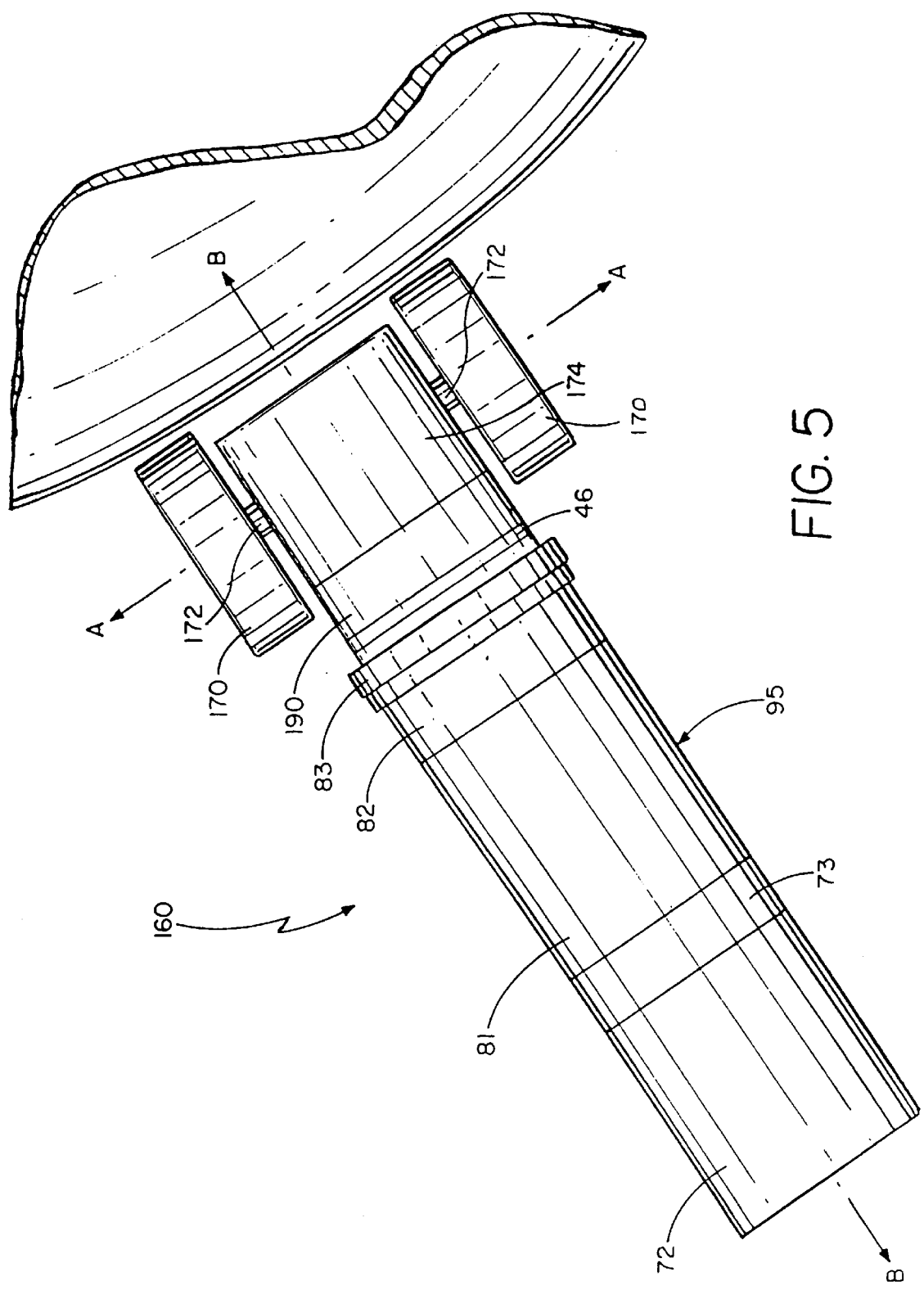
FIG. 5 is a top view of an alternative active roller in the invention.
Figure 6:
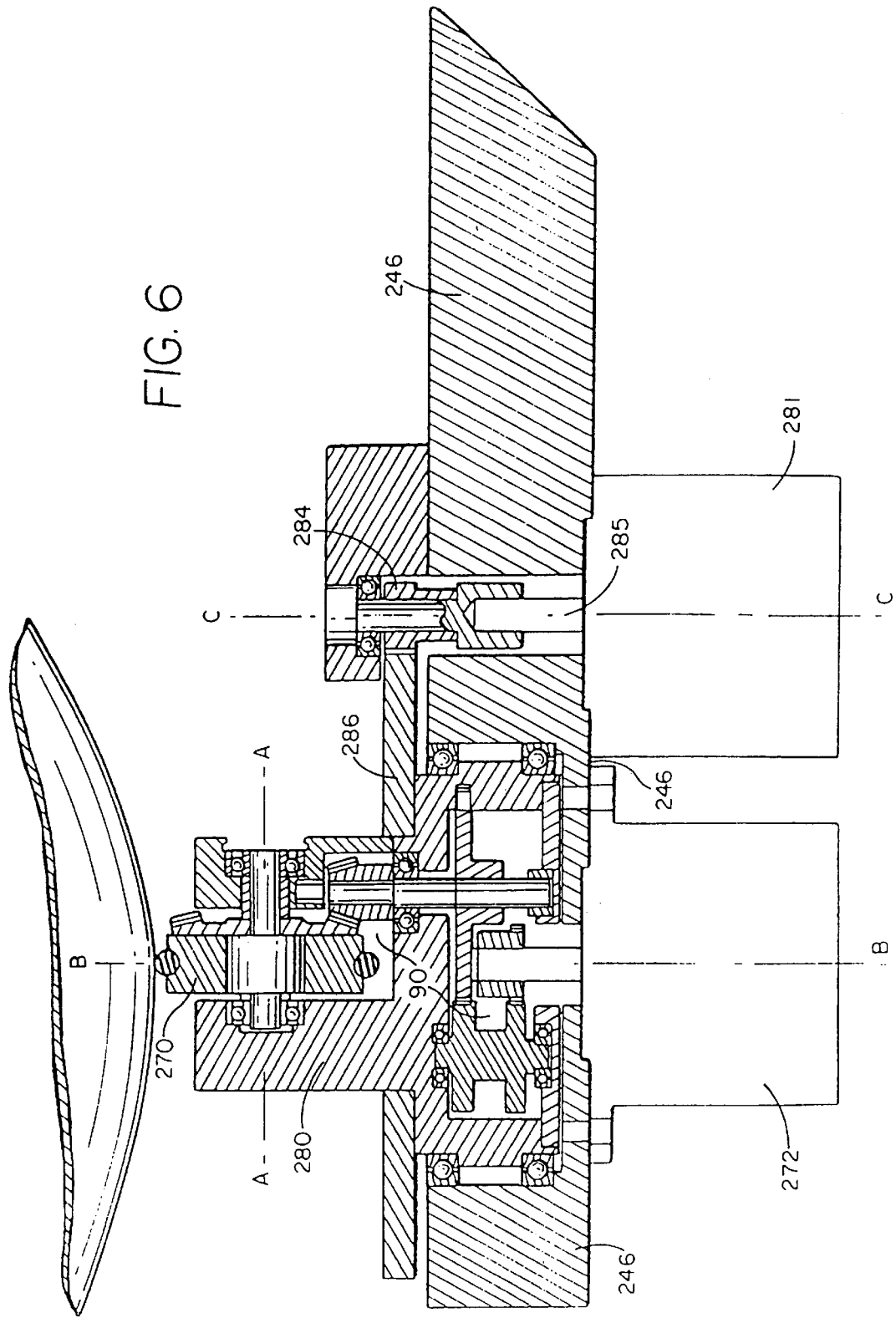
FIG. 6 is a cross-sectional view of another active drive roller in the invention.

FIGS. 4–6 show a variety of active roller embodiments. FIG. 4 depicts a plan view of an active roller (60) with a single drive wheel (70). The drive wheel (70) makes frictional contact with the surface of capsule (20). Rotation of the drive wheel (70) about the drive axis "A—A" rotates the capsule (20). Rotation of the drive wheel (70) about a perpendicular axis "B—B" changes the direction of the drive wheel (70). A yoke assembly (80) houses both the bearings (71) for the drive wheel (70), and the gear assembly (90) that actuates the drive wheel (70). A thrust bearing (83) supports the yoke (80) onto a mounting plate (46), wherein the mounting plate (46) is contiguous with a connecting joint (44) at the apexes of the triangular platform (41) as depicted in FIGS. 1–3.

The drive train for rotation about the "A—A" axis begins with a reversible drive wheel motor (72) and a drive wheel motor reduction means (73). An output shaft (74) is connected to the drive wheel motor reduction means (73), and may be coaxial with the control axis of the reversible yoke motor (81) and a reduction means (82). The output shaft (74) may emerge into the gear assembly (90) through the center of the yoke drive gear (84). The drive wheel drive gear (75) is rigidly connected to the output shaft (74) and engages a transfer gear (76). The transfer gear (76) may be connected by a drive shaft (77) through an intermediate bevel gear (78). The intermediate bevel gear (78) engages the drive wheel bevel gear (79) which rotates the drive wheel (70) about the drive axis "A—A."

The reversible yoke motor (81) rotates the yoke (80) and the drive wheel (70) about axis "B—B" through the reversible motor reduction means (82). The reversible yoke motor (81) and reduction means (82) may be substantially hollow along the central axis "B—B" to house the output shaft (74). Bidirectional torque output from the reduction means (82) drives the yoke drive gear (84). The yoke drive gear (84) engages a yoke idler gear (85). The yoke idler gear (85) engages teeth (86) which may be integral with the yoke (80), creating a torque that actuates rotation of the yoke (80) and the drive wheel (70) about the "B—B" axis.

The drive wheel motor (72), drive wheel motor reduction means (73), reversible yoke motor (81), and reduction means (82) may be rigidly and coaxially attached together. A face plate (67) mounts the motor/reducer assembly (95) to the mounting plate (46).

A number of electrical or optical cables (64) may connect the drive wheel motor (72) and the reversible yoke motor (81) with the power supply and also carry position information from angular encoders. This embodiment of an active roller (60) for a single roller about two perpendicular axes is advantageous because of the fixed position of the drive wheel motor (72) and the yoke motor (81). This fixed position allows use of a hard-wired cable harness rather than expensive and less reliable rolling or sliding electrical contacts.

FIG. 5 shows an alternative embodiment of the invention employing an active roller (160) which may have dual drive wheels (170). The two drive wheels (170) are driven by the output shafts (172). The output shafts (172) may engage an automotive type differential (174) which is connected to a gear assembly (190). A thrust bearing (83) directs loading against the mounting plate (46), which is formed as part of the connecting joints (44) as shown in FIG. 1. The motor/reducer assembly (95), as described for FIG. 4, is connected to the gear assembly (190), and works in the same manner as described in FIG. 4.

Using two drive wheels (170) for a single active roller (160) is more advantageous than using a single drive wheel (70) as shown in FIGS. 1, 2, and 4. First, the rotation of the two drive wheels (170) about their common center requires less energy input by the drive wheel motor (72) because the friction of rotation is reduced. Second, the typical curved path that the common center follows during actuation generates less friction and thus requires less energy input by the drive wheel motor (72). Third, the compressive loading at the contact points on the capsule (20) is half that of a single drive wheel (70) resulting in less wheel deformation of the capsule (20) and use of a thinner outer shell for the capsule (20).

FIG. 6 depicts another embodiment of the invention using a variation on the single drive wheel active roller system. In FIG. 6, a mounting plate (246) is integral to the connecting joint (44) as shown in FIG. 1 and rigidly supports both a reversible drive wheel motor (272) and a reversible motor (281). The drive wheel motor (272) and the reversible motor (281) may be mounted along two parallel but separate axis, "B—B" and "C—C". The drive wheel motor (272) may be connected to a gear assembly (290) so that the output from the drive wheel motor (272) rotates the drive wheel (270) about the drive axis "A—A". The drive wheel (270) is positioned about the "B—B" axis by the reversible motor (281). A spur gear (286) may be attached to the drive wheel housing (280) to the drive gear (284) which is connected to the output shaft (285) of reversible motor (281).

The invention preferably incorporates a vision system which the user views during motion. The vision system displays a scene on a monitor or a head mounted display wherein the viewed motion responds according to the motion of the user's vision. When using a head-mounted display, the display should shift when the user's head turns or tilts so that the user's experience parallels that of turning or tilting his or her head when viewing a real environment. For example, the displayed horizon will shift upwardly in the display when the viewer tilts his or her head downwardly. Position sensing is critical to coordinating vision with motion and the user's sense of real gravity. Consequently, both the position of the user's field of vision and the position of the capsule (20) itself are important in the present invention.

Position sensing may be accomplished by a variety of means. Rotational position may be sensed by a gyroscope mounted within the sphere, or by electrical coils interacting through electromagnetic induction. Linear position may be sensed by linear potentiometers, linear variable differential transformers, or magnetostrictive sensors mounted inside the actuator legs (48). Such systems are well known and well characterized by those in the art of motion sensing and control.

Motion control of the system may be either closed looped or open looped. A closed loop system senses the action being controlled and sends position information back to a controller so that the controller can minimize the error between the actual performance and the desired performance. An open loop system, however, does not send any position information back to the controller, and as a result, an open loop system does not automatically correct the error between the actual performance and the desired performance. Closed-loop motion control is preferred because it is more accurate. Both closed-loop and open-loop motion controls are established science, and a variety of theoretical and practical means are available for their implementation.

A preferred embodiment of the vision system may be a head-mounted display that sends separate images to each eye. Such a system creates a true three dimensional effect. Rotational motion on all three axes with respect to the ground is sensed at the user's head. Consequently, the user may tip his head and see a tilting landscape without causing the system to move. One such head-mounted display adaptable for use with the invention is the Eyephone HRX from VPL Research, Inc.

Another form of a virtual reality system useful with the present invention could include sound along with motion and vision. In a preferred embodiment, the sound system utilizes directional sound generation. Directional sound generation would allow the user's ears to perceive sound from different locations giving an indication of direction. One such system, the Convolvotron, has been dually developed by NASA's Ames Research Center and Crystal River Engineering, of Groveland, Calif.

The generally spherical capsule (20) is desirably free to fully rotate around the three orthogonal axes located at the center, the capsule has no direct physical contact with any external elements. Sliding contacts or hardwire cables are not particularly feasible in the embodiments depicted in FIGS. 1 and 2 because the data cable (227) shown in FIG. 3, for example, would interfere with the frame (40) as the sphere is rotated through certain angles or in certain directions. For example, if the user were to induce motions which would turn him or her upside down, such as in a simulated roll of an airplane, the cable system illustrated in FIG. 3 would tend to abut against the frame or the rollers. Consequently, data in the embodiments of FIGS. 1 and 2 must be exchanged between the capsule (20) and the external environment by electromagnetic means, as mentioned briefly above.

One such electromagnetic means may be a combination of multi-spectral digital laser pulses sending information into the capsule (20), and UHF radio signals sending information out of the capsule (20). For this communication configuration, a laser sending digital pulses aims its beam toward the capsule (20). A beam spreader widens the laser beam so that it projects the signal into a circular area called the "data circle." Laser-sensitive receivers (not shown) may be spaced evenly over the surface of the capsule (20) so that at least one receiver is within the data circle at any time. If necessary, these receivers may be flush with the rest of the surface of the capsule or be recess-mounted in the surface to avoid any unwanted effects from contact with the rollers supporting and driving the capsule.

Inductive means, such as two wire coils, may be used to provide power inside the capsule (20), where direct connection of power is not feasible. Alternatively, quick-charge or replaceable batteries may be employed within the capsule (20).

In addition to the sensations of sight, sound, and movement, the instant invention may also operate on the basis of the user's sense of touch by using interactive solids. Interactive solids for use with the invention are contemplated as being either "passive" or "active". As used herein, the term "passive interactive solid" refers to a solid or semi-solid object which remains substantially stationary or is under the direct physical control of the user, while the term "active interactive solid" is used to refer to a solid or semi-solid object which can be moved by the virtual reality system in coordination with the electronic simulation of physical reality and physical input from the user.

Passive interactive solids are not connected to the interactive control means, and as such, move (if at all) only when physically acted upon by the user. Passive interactive solids may be used to impart the physical sensations of touch in fixed environments or corporeal objects that may be simulated by inanimate objects.

For instance, a passive interactive solid may comprise a mock-up of a control panel which remains fixed within the capsule regardless of the movements of the user or, in the case of simulated switches and the like, will move only when the user reaches out and physically moves the switch. Active interactive solids, in contrast, are moved within the capsule under the control of the virtual reality system and may take the form of a solid representing a wall which moves within the capsule as the user "moves" within the virtual environment. In an alternative embodiment having application in the emerging field of so-called "virtual sex," the visual images displayed for the user may be explicitly sexual in nature and the active interactive solids may be solids or semi-solids which represent an interactive partner in the "virtual sex" environment.

Figure 7:
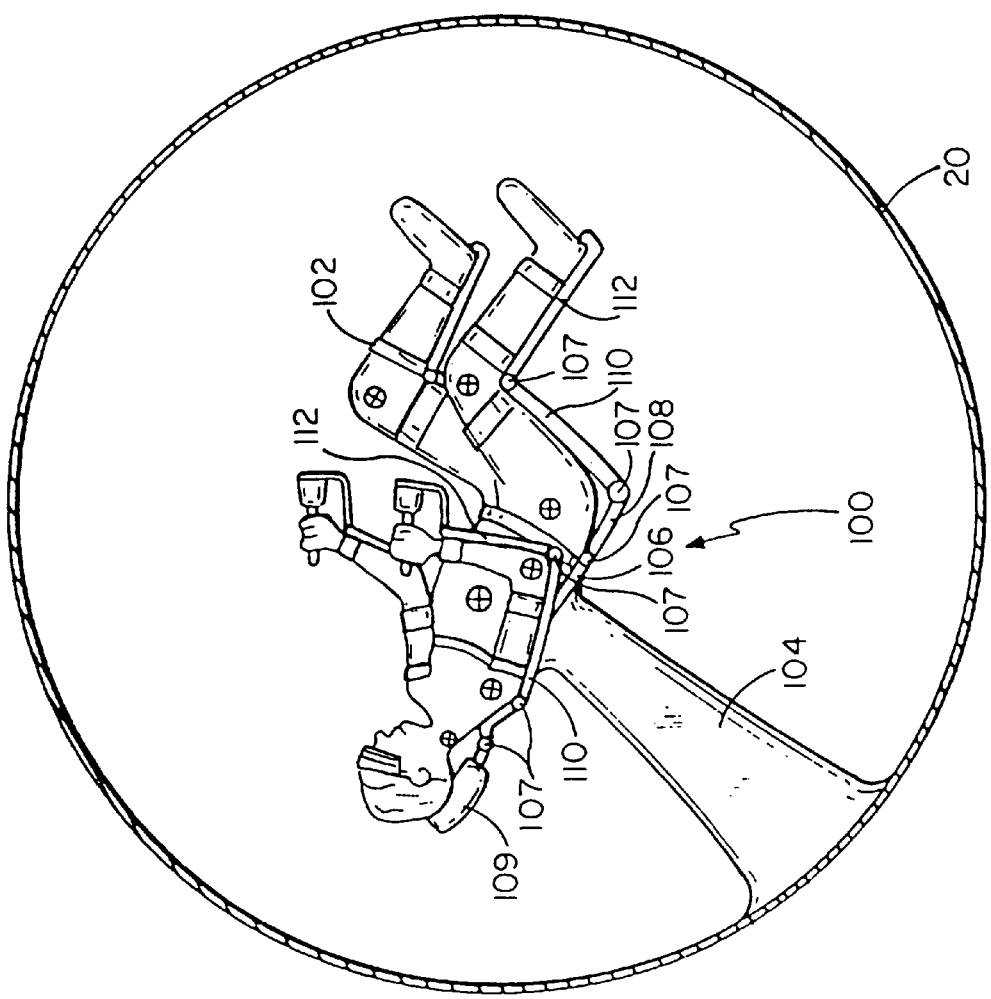
FIG. 7 is a perspective view of an interactive support apparatus in accordance with the invention wherein the user is in a reclining position.

FIGS. 7–8 show an interactive support apparatus (100) which is a type of active interactive solid. In the present invention, the interactive support and apparatus (100) is a self actuated solid that moves in coordination with the virtual vision depicted on the head-mounted visual display (30) and in response to the physical contact of the user. The interactive support apparatus (100) may include a support arm (104) that is attached to the capsule (20). A back plate (106) may be connected to the support arm (104) and hingedly attached to abdominal support plates (108) by motorized hinges (107). Each abdominal support plate (108) may be attached to two first limb support plates (110), and each first limb support plates (110) may be attached to a single second limb support plate (112). The motorized hinges (107) may connect the abdominal support plates (108), first limb support plates (110), and second limb support plates (112), so that the user is sufficiently supported along all parts of his or her body.

Upon entering the capsule (20), the user may simply recline in the interactive support apparatus (100) and be strapped into place by the restraints (102) as shown in FIG. 7. The restraints (102) are preferably placed near major body joints. The user will preferably be further secured to the interactive support apparatus (100) by a shoulder harness and groin straps (not shown). The restraints (102) may be velcro straps, mechanically actuated rigid clamps, or any other suitable device.

The interactive support apparatus (100) ensures that the user is supported in a manner appropriate to both the actual physical environment and the manufactured virtual environment. While reclining, for example, a user is supported from beneath. An arm attached to first and second limb support plates (110 and 112, respectively) will be allowed to move freely above the virtual surface of reclination. Once the arm attempts to move through the surface of reclination, however, the support plates become rigid and the user's arm is prevented from passing through the virtual surface. In another example, a user may be suspended beneath the interactive support apparatus (100) and the first and second limb support plates may provide the sensation of moving a wing through the air as the user experiences flying like a bird in virtual space.

Figure 9:
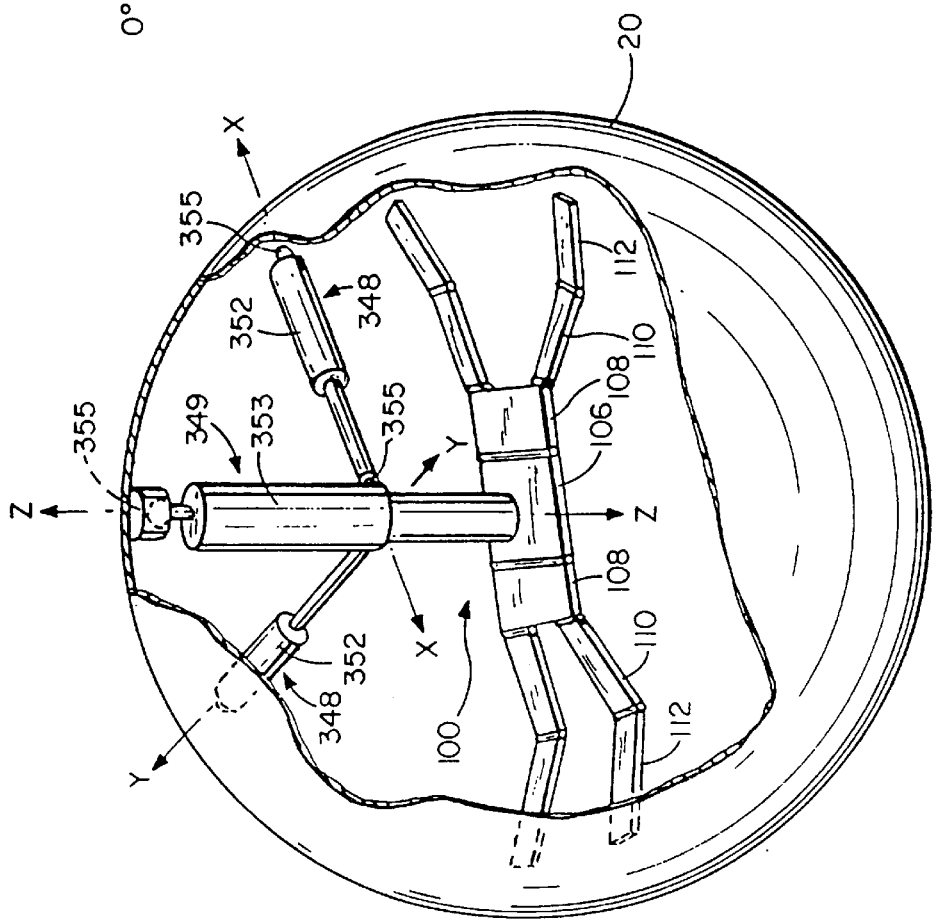
FIG. 9 is a perspective view of yet another interactive support apparatus which includes translational means.

FIG. 9 depicts an alternative embodiment of an interactive support apparatus (100) which is capable of moving along three orthogonal axes within the capsule (20). In FIG. 9, the actuator arms (348) and translatable support arm (349) may all be connected on one end to the capsule (20) by rotatable connectors (355). The actuator arms (348) may be connected on the other end to the housing (353) of the translatable support arm (349) by rotatable connectors (355). The translatable support arm (349) may then be securely connected to back plate (106).

The actuator arms (348) and the translatable support arm (349) are depicted as cylinders that may be powered, for example, hydraulically, pneumatically, or electrically as ball-screw type actuators. Additionally, the actuator arms (348) and the translatable support arm (349) may be arranged as a tripod. One advantage to providing translation back and forth along three orthogonal axes within the capsule (20) rather than by moving the frame (40) as shown in FIG. 1 is that the components required for translational motion within the capsule (20) are smaller in size and do not require as much power. Moreover, the size of the capsule (20) will only need to be increased a nominal amount.

Figure 10:
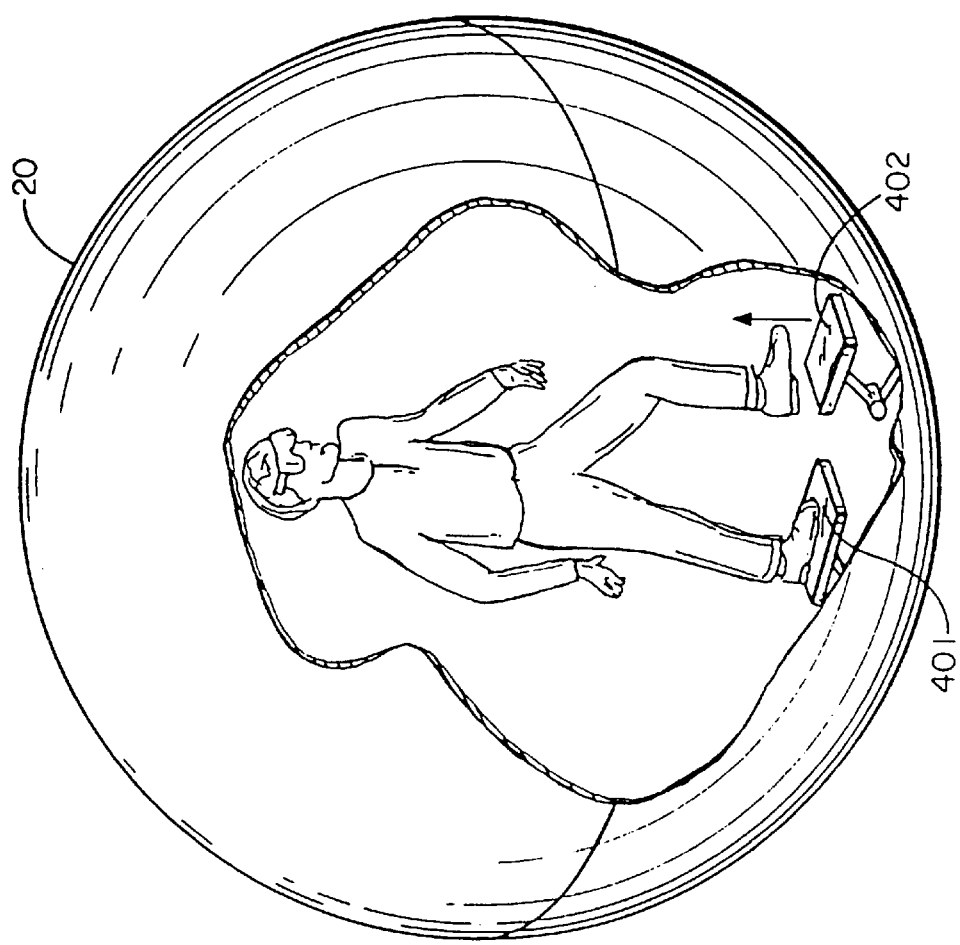
FIG. 10 is a cut-away view of a motion simulating device with interactive solids of the invention.
Figure 11:
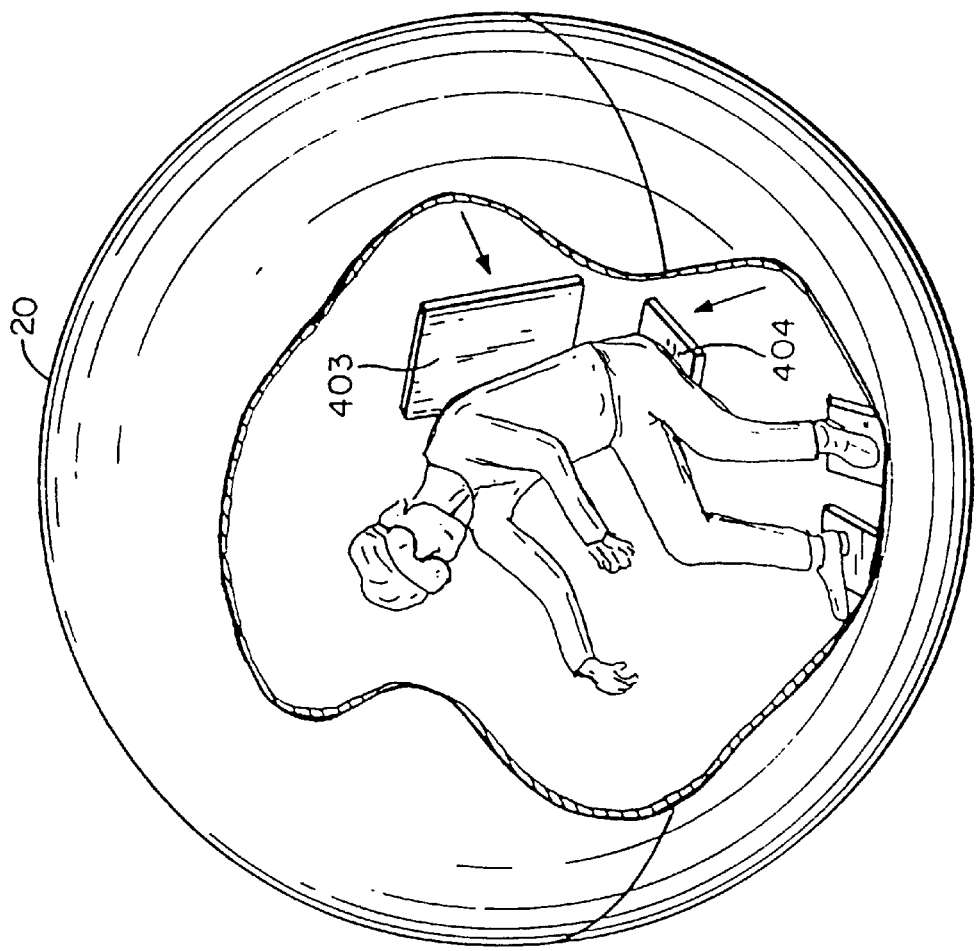
FIG. 11 is a cut-away view of a motion simulating device with interactive solids in accordance with another embodiment.

FIG. 10 depicts another type of active interactive solid for simulating walking. As the user's feet rise up and down, either a first platform (401) or a second platform (402) rise or fall to meet each step. Similarly, FIG. 11 depicts an active interactive chair. A seat platform (404) may move into position to act as a seat while a back platform (403) may move into position to act as a back. The active interactive solids depicted in FIGS. 10–11 allow a user to alternatively walk and sit upon a solid support while staying within the environment of the capsule (20).

Figure 12:
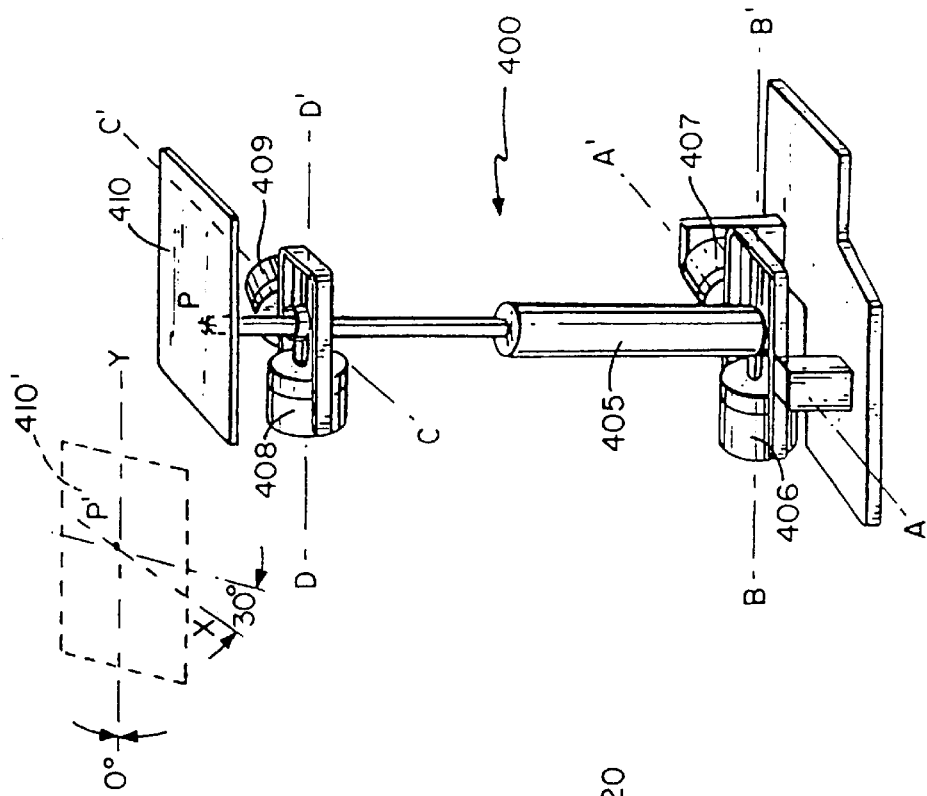
FIG. 12 is an elevational view of an interactive solid for stepping.

FIG. 12 shows an interactive step (400) which moves with respect to the inner surface of the capsule (20). The interactive step (400) is also an active interactive solid. A linear actuator (405) may be mounted on two rotatable axis, "A—A" and "B—B". A foot pad (410) may be connected to the upper end of the linear actuator (405) and may be rotatable around axis "C—C" and "D—D". A first lower stepper motor (407) causes rotation about the "A—A" axis. Similarly, the second lower stepper motor (406) causes rotation about the "B—B" axis, the first upper stepper motor (409) causes rotation about the "C—C" axis, and the second upper stepper motor (408) causes rotation about the "D—D" axis.

In the virtual reality environment, the interactive step (400) may simulate stepping up a pathway by first using the lower stepper motors (407) and (406) to orientate the linear actuator (405) in the correct direction, and then the upper stepper motors (408) and (409) rotate the angle of the foot pad (410) to match the inclination of the expected terrain.

It is understood that a rotation about axis "A—A", "B—B", "C—C", and "D—D" may be accomplished by a variety of positioning means known to those skilled in the art of motion control. For example, any of the stepper motors may be replaced by a servo motor, plain DC motor, AC motor, hydraulic motor, pneumatic motor, or even a linear actuator. The linear actuator may be driven by hydraulics, pneumatics, or electrically. Alternatively, the foot pad (410) may be placed at the end of a two-part linkage with each joint angle precisely controlled as depicted in FIG. 10.

Figure 13:
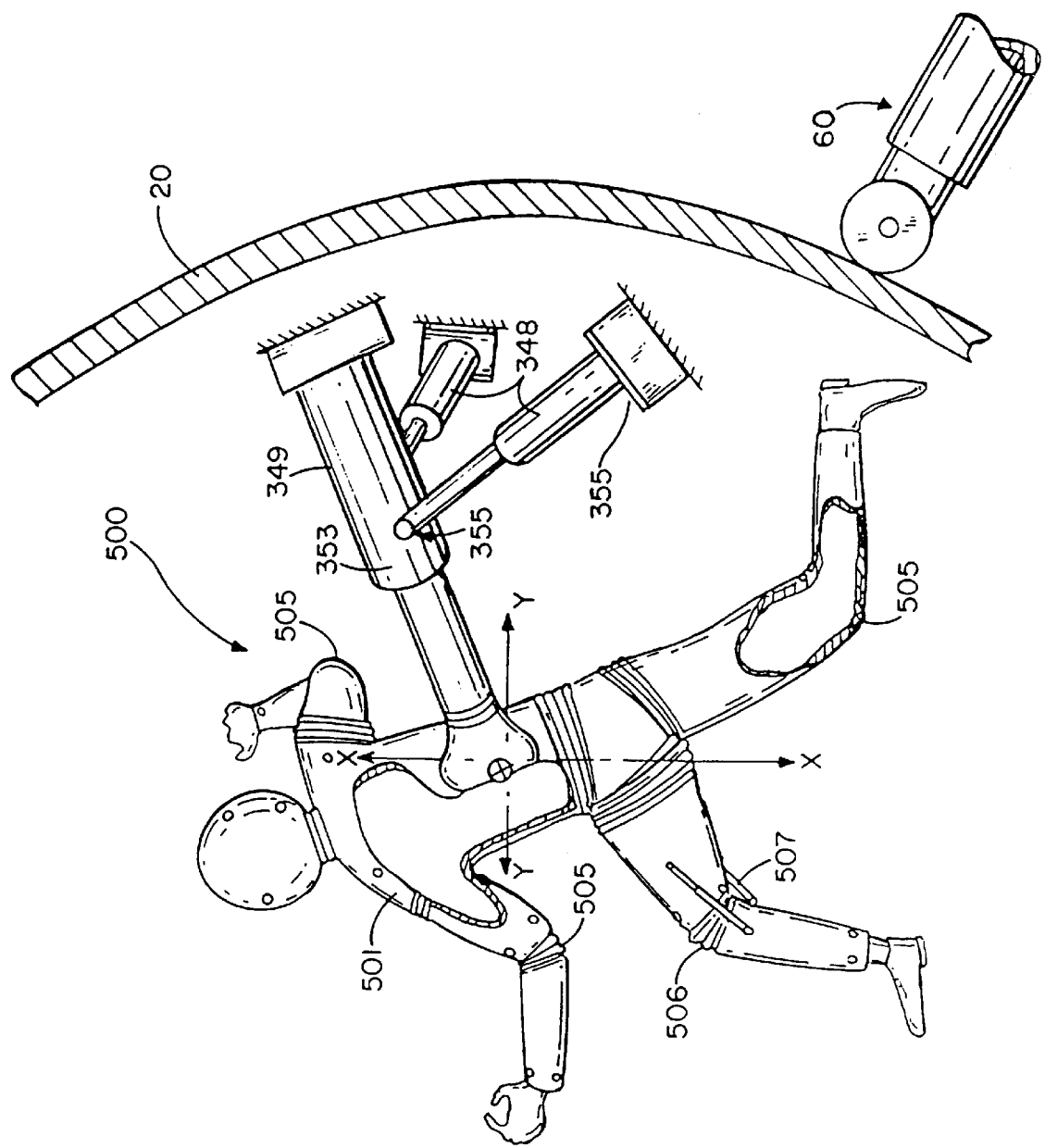
FIG. 13 is an elevational view of an interactive support apparatus coupled to an interactive pneumatic support suit.

FIG. 13 shows another type of active interactive solid, an interactive fluidic support apparatus (500). The fluidic support suit may use either a gas or a liquid as the support medium. A pneumatic support suit (501) may support a user in a suspended state and uses a gas as the support medium. A buoyancy suit (not shown) may use a liquid as the support medium. In a pneumatic support suit, the joints (505) may be mechanically actuated to respond to the user's positioning requirements. For clarity, FIG. 13 omits depiction of the actuator means at the joints (505), except as shown by the dual push/pull pistons at the left knee joint (506). A linear actuator (507) may position the user's body in response to the user's positioning requirements.

The pneumatic support suit (501) may be attached to one end of the translatable support arm (349) and the other end of the translatable support arm (349) may then be attached to the capsule (20). Two additional actuator arms (348) may be attached to the translatable support arm (349) by rotatable connectors (355) at the housing (353).

Figure 14:
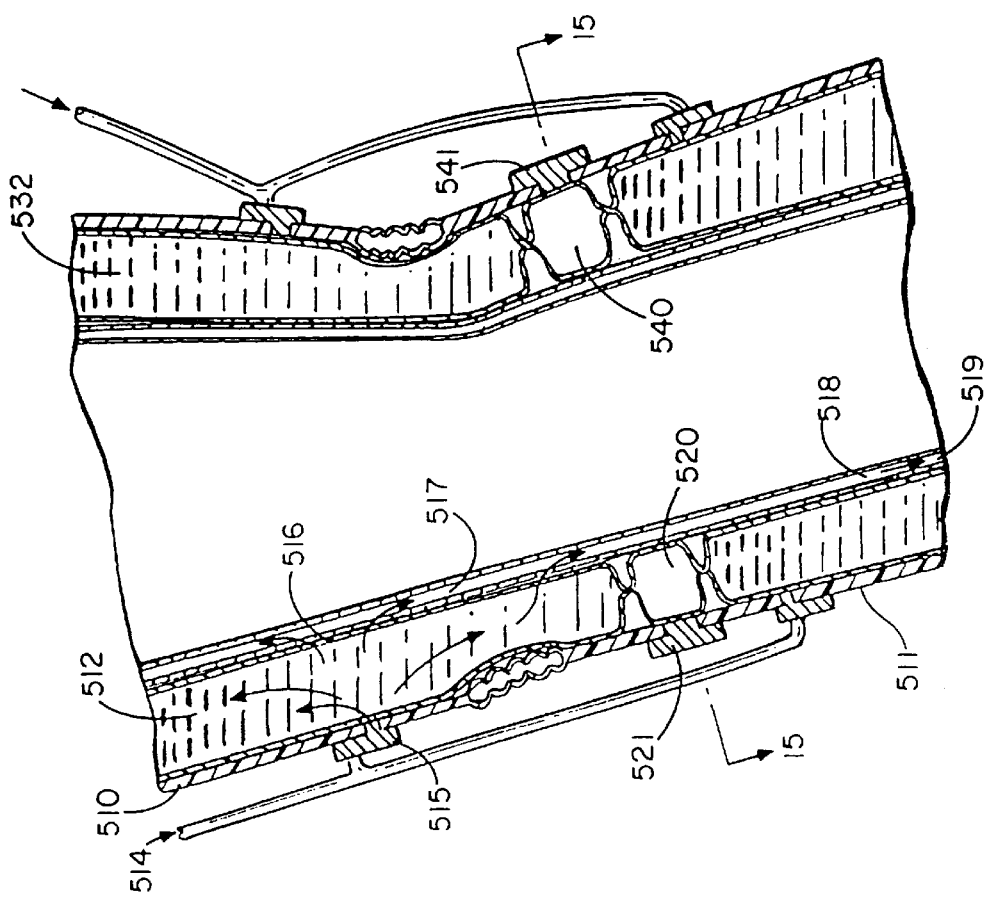
FIG. 14 is a cut-away view of the interactive pneumatic support suit of FIG. 13.

The cross section of the pneumatic support suit (501) shown in FIG. 13 medium is shown in FIG. 14. The pneumatic support suit (501) may use a rigid shell (510). An air bladder (512) may be placed immediately adjacent to the rigid shell (510) on one side and a semipermeable layer of material (517) on the user's side. A semirigid porus layer (518) may then be disposed between surface of the user and the semipermeable layer (517). Air input from a high pressure supply (514) may be regulated by the control valve (515) with integral pressure sensing. As the air enters through the control valve (515), it inflates the bladder (512) to provide support to the user. The air then passes through the semipermeable layer (517) and into the highly porus region (518) where it may then be exhausted out of the system along the exhaust path (519). The TiNi Alloy Company in San Leandro, Calif., manufactures a valve suitable for use as the valve on this application.

Relative and absolute positions of key external points of the pneumatic support suit such as the head, joints, feet, and center of gravity, may be calculated by kinematic means well known to those skilled in the art. Additional position information may be obtained by optical or sonic means.

Figure 15:
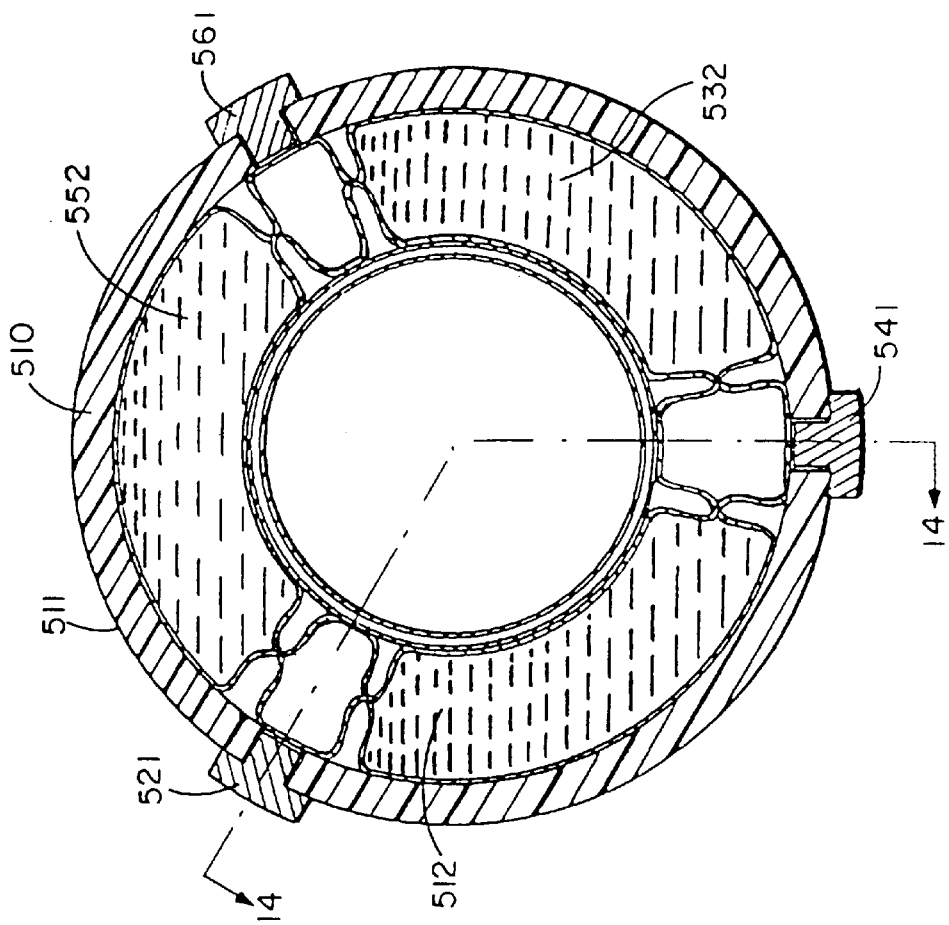
FIG. 15 is a cross-sectional view of a section of the interactive pneumatic support suit of FIG. 13.

The air pressure in bladder (512) varies according to the position of the user with respect to the bladder (512). Position of the user may be sensed using a sealed chamber (520) which encloses a pressure sensor (521). FIG. 15 shows a cross section of sensor location of the pneumatic support suit shown in FIGS. 13 and 14, with three pressure sensors a first sensor (521), second sensor (541), and third sensor (561). With the sensors spaced evenly at 120°, the position of the user's body may be determined continuously and accurately. If a supported segment of the user's body tends to go over to one wall of the suit and away from the other, one pressure sensing bladder is compressed while the other expands. For example, as pressure in the first bladder (512) increases, pressure in either the second bladder (532) or third bladder (552) may decrease giving direct indication of the position of the user within the rigid shell (510).

Typically, the first sensor (521), second sensor (541), and third sensor (561) may be of the micro-machined solid state type available from a number of manufacturers. The invention permits attachment of the valves (515) and sensors (521) to the rigid shell (510) along the surface (511). In the preferred configuration, at least three sensors may be mounted near every joint (505).

In the present invention, an advantage of an interactive pneumatic support suit (501) with controlled joint action is that the suit can be actively employed to create the sensation of virtual solids. To create a virtual solid, pneumatic support suit (501) will allow motion up to, but not through the space occupied by a virtual solid. For example, contact with a solid such as a wall will cause the pneumatic support suit to lock up so the user cannot push beyond the virtual plane of the wall, creating the sensation of a solid wall in a particular location. Similarly, the user may experience virtual flying like a bird by having the rigid shell (510) of the pneumatic support suit move and vary the air pressure in the bladders to transfer the force of the rigid shell to the user to create the perception of drag and lift against a wing.

The interactive solids require a position sensing system for providing the correct position in coordination with the virtual environment depicted on the head-mounted visual display (30). One example of position sensing system is described above in the description of the pneumatic support suit (501). Another example of a position sensing system within the capsule (20) requires a combination of transmitters and receivers, where a number of receivers evenly spaced along the inside surface of the capsule (20) sense the position of a number of transmitters that are attached to various points of a user.

The transmitter and receivers used in the position sensing system are well known to those skilled in the art. For example, Logitech, Inc. uses an ultrasonic technique for determining position in their 2D/6D Mouse. As another example, one could use a magnetic position sensor such as that marketed under the name "Flock of Birds" by Ascension Technology Corp. of Burlington, Vt. The Flock of Birds system may be of limited use if power is supplied to the capsule by inductive means, as noted above. Also, the PLADAR (Pulsed Light Angle Direction Tracking And Range) tracking system by David Fenner of the United Kingdom uses LED transmitter-receiver couplings.

Using the PLADAR system, transmitters may be positioned at points on a user's body. Three receivers, having an open line of sight to each sensor, then accurately determine the point in space of each receiver by triangulating the relative signal strength between the emitter-receiver pairs as an indication of distance between the pairs. Consequently, the position of each transmitter may be determined and then processed to determine the position of the corresponding body part of a user. The active interactive solids can respond to a user's requirements for support, suspension, or free movement, by combining force sensing on the active interactive solid acting against a user and the position of the user's body parts as determined by a sensing system such as the PLADAR light-based system.

A sense of touch may also be achieved by taking advantage of the fixed nature of certain virtual experiences. Interchangeable passive interactive solids may be used to tailor the environment inside the capsule (20) to conform to a specific virtual experience. In the present invention, passive interactive solids have no means of self-actuation. Passive interactive solids are generally pre-formed shapes whose contours match those of the virtual environment, and may be installed or removed quickly. Toggle-clamps or the like may be used to speed installation of a complete passive interactive solid environment.

One example of passive interactive solids involves a "mock-up" of the interior of an aircraft cockpit. In a cockpit, a pilot views the components of the cockpit's interior as fixed with respect to his position while the sky and earth appear to be moving. Pre-formed shapes whose contours match those of the virtual cockpit can be installed within the capsule (20) so that a user can press real buttons, grip a real control stick, and otherwise press against real solid surfaces corresponding to specific objects displayed in the virtual environment. Specific detail such as control gauges which respond to the actions of the user may be added virtually through the vision system.

Figure 16:
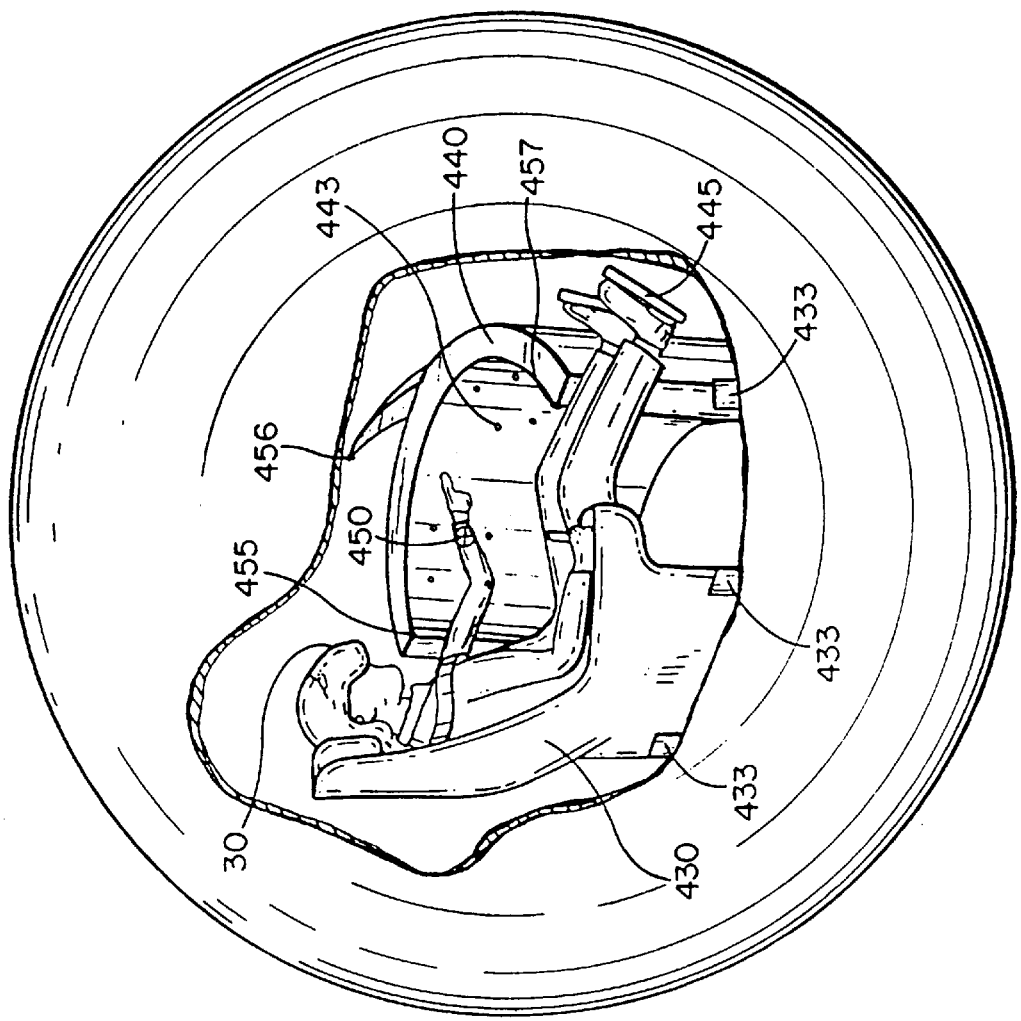
FIG. 16 is a partially broken-away schematic view of a motion simulating device of the invention including passive interactive solids.

FIG. 16 depicts one embodiment of a virtual environment including passive interactive solids. The user may recline in a fixed chair (430) which may be fastened to the inner surface of the capsule (20) by clamps (433). A control panel (440) may house a number of switches (443) which give an indication of being pressed. The control panel (440) does not house any dials or gauges, as those are represented visually through the head-mounted display (30).

By using passive interactive solids, the "reality" that the user experiences includes all of the elements of a fighter cockpit, for example, either through actual solid objects or virtual representations through the head mounted display (30). The passive interactive solids will allow the user to accurately sense pressing buttons and flipping switches and the like, and the system may respond as though the user is pressing real buttons.

An alternative or additional approach to interacting with passive interactive solids includes a sensing system for sensing the position of the user's lower arm and hand. Such a sensing system uses either light or ultrasonics, and may include an emitter (450) positioned near the users hand and a number of detectors positioned on the control panel (440) as shown by three detectors (455), (456) and (457). Position information may then be accurately determined and an image of the user's hand and arm can be coordinated into the image projected in the head mounted display (30). For example, a user will see his or her hand moving toward the control panel (440) and activating switches (443) when such a sensing system is employed.

Passive interactive solids are not limited to objects that define a fixed environment such as chairs and control panels. Passive interactive solids also include inanimate devices that passively simulate living beings such animals or humans. For example, a passive interactive dog may be used to impart the sensation of touch as a user pets a virtual dog, or a passive interactive human may be used to impart the sensation of physical contact. Of course, such objects could also be made as active interactive solids so that the dog or the partner move independently of direct physical contact with the user.

Figure 17:
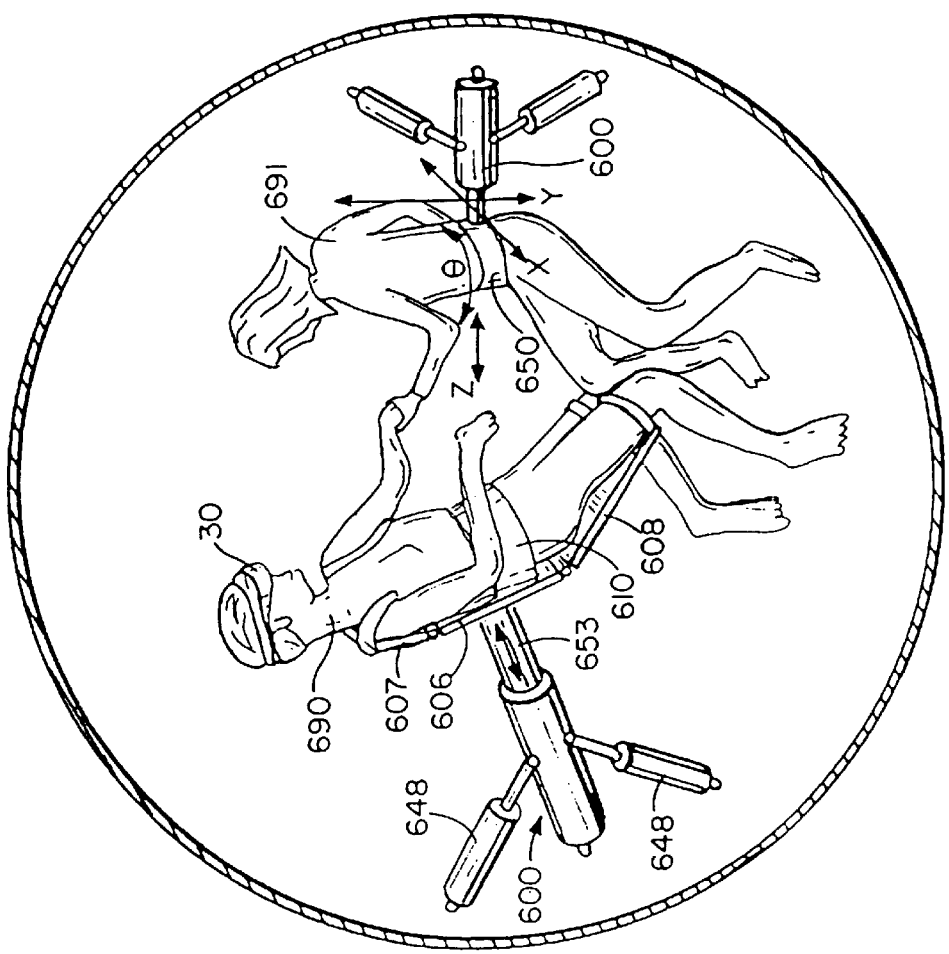
FIG. 17 is an elevational view of an interactive solid in accordance with another embodiment of the invention.

FIG. 17 depicts an alternative embodiment of a virtual system of the invention including a generally human-shaped interactive solid (691) simulating a human partner. The user (690) may wear a head-mounted display which displays the position and motion of the interactive solid (691) in virtual space exactly as the interactive solid is positioned in real space. This embodiment may be used for a variety of purposes, such as in teaching dancing lessons in a virtual reality environment, simulating wrestling, or in "virtual sex" applications.

The imagery corresponding to the interactive solid (691) may be completely generated by a computer; and as a result, the user (690) will have sole control over the virtual interaction. The imagery corresponding to the interactive solid (691) may also be generated by input from a second user (not shown) in a separate capsule (not shown). When the imagery is generated by a second user in a separate capsule, the interactive solid (691) is controlled by the second user and optimally is adapted to mimic the motions of the second user in the confines of the second capsule. Similarly, if the second user is interacting with a similar interactive solid in the second capsule, the second interactive solid will be controlled by the first user (690) and mimic that user's motions.

In FIG. 17, the user (690) may be supported by an interactive support apparatus (600) similar to the interactive support apparatus shown in FIG. 9. The interactive solid (691) may also be supported by an interactive support apparatus (600). An alternate embodiment of the interactive support apparatus (600) includes a rotation ring (650) for imparting complete rotation of the interactive solid (691) about the longitudinal axis of its torso. The rotation ring (650) permits a variety of interactive positions.

FIG. 18 depicts an alternative support apparatus (620) of the present invention for imparting greater freedom of movement to the interactive solid (691). The interactive support apparatus may include a linear actuator (624) which is movably attached to a positioning track (620). The positioning track (620) is mounted to the inner surface of the capsule at its ends. The linear actuator (624) moves the interactive solid (691) in and out along the longitudinal axis of the actuator. The movable contact of the linear actuator (624) along the arc of the positioning track (626) enables enhanced positioning of the interactive solid (691). A rotation ring (650) may be attached to the free end of the linear actuator to rotate the interactive solid (691) 360° about an angle relative to the longitudinal axis of a torso of the interactive solid.

Figure 19B:
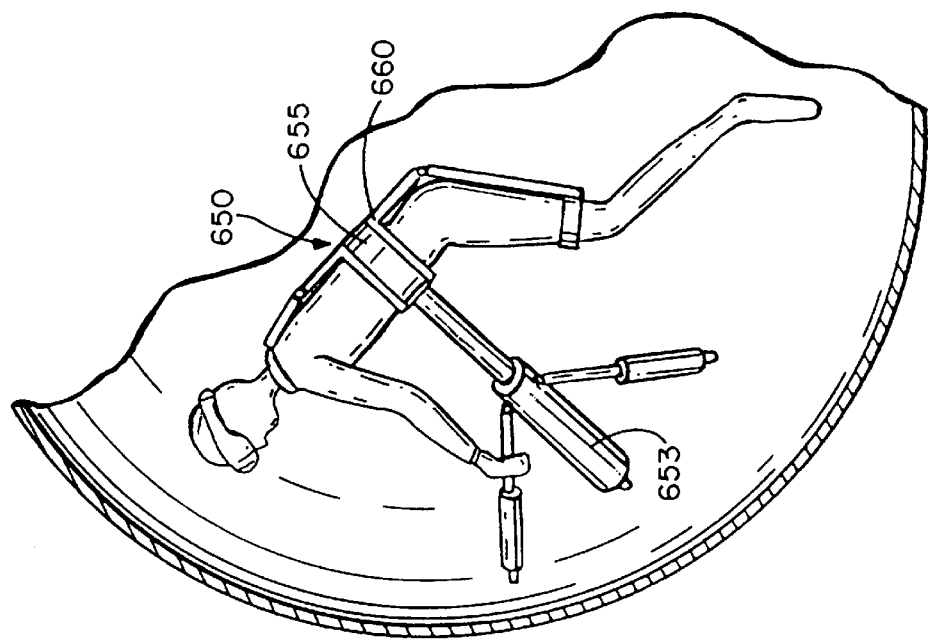
FIG. 19 is an elevational view of an interactive support apparatus in accordance with another embodiment of the invention.
Figure 19A:
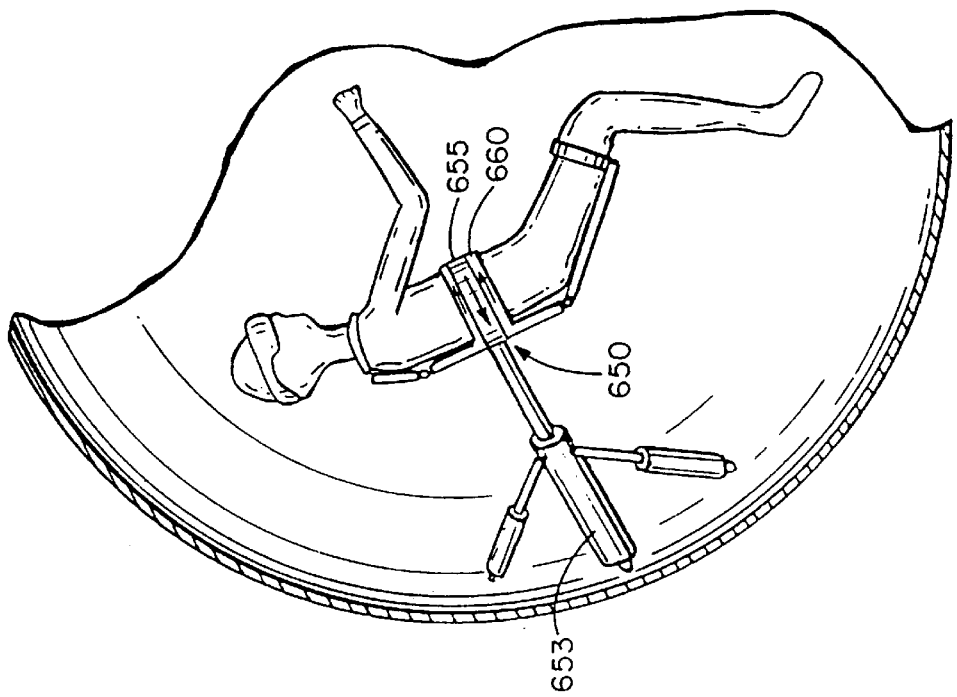

FIG. 19 schematically shows operation of the rotation ring (650) permitting the user (690) or an interactive solid to move into alternate positions. The rotation ring (650) may include a fixed ring (655) which is rigidly connected to the linear actuator (653), and a moving ring (660) which engages the fixed ring (655) along its outer surface and support the user with its inner surface. The moving ring (660) rotates within the fixed ring (655) to permit the user a full 360° rotation or to impart a full 360° of motion to an interactive solid (not shown). Any suitable means known in the art, such as gear and motor assemblies or hydraulics, may impart the rotation to the moving ring (660).

Figure 20:
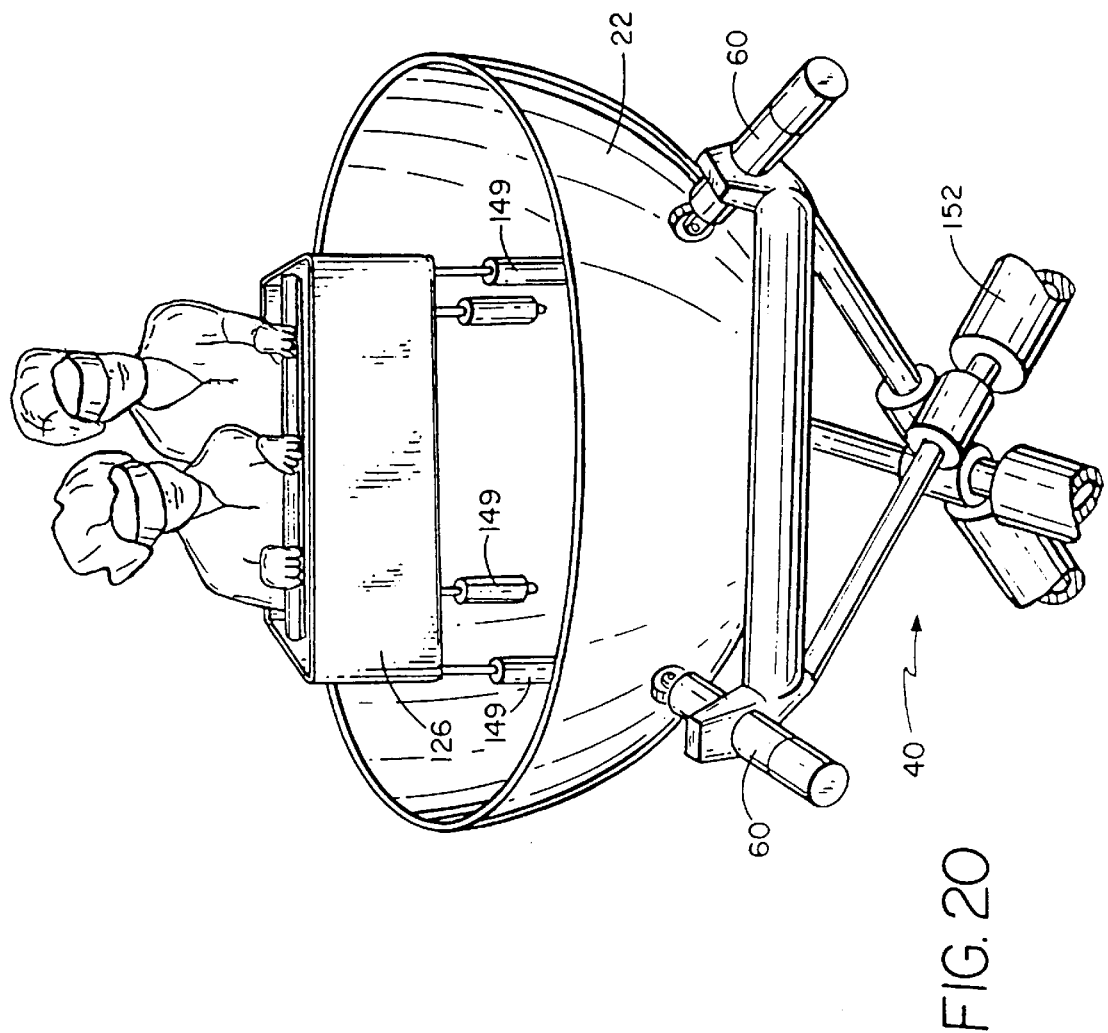
FIG. 20 is an elevational view of a motion simulating device of the invention with high-frequency internal actuators.

FIG. 20 depicts an embodiment for a vehicular motion simulator. A lower hemisphere (22) is supportively abutted by the active rollers (60) that are connected to the frame (40) as described in FIG. 2. Four high frequency linear actuators (149) may be connected to the inside wall of the lower hemisphere (22) and connected to the four corners of a seat (126). The high frequency motion conveyed by the high frequency linear actuators (149) to the seat (126) simulates the high frequency vibrations of a vehicle traveling over a road. The low frequency motion of the vehicle such as cornering or acceleration may be provided by the actuators (148) and active rollers (60).

Given any data exchange format, a user inside the sphere may either be passive or active. A passive user might put a ROM disk into the CD disk drive, or interface with a cable television channel. The user might then be guided through an amusement park ride where such a ride would have nearly all of the characteristics of a real ride.

Alternatively, an active user might interface with a dedicated data link to a central node computer and participate in a continuous game involving many players operating in their own virtual reality environment at separate locations. These individual users will each share the same "virtual space" and could compete or otherwise interact as if they were in the same physical space. Such interaction may involve conversations or physical contact such as dancing.

The invention may also include other means for stimulating a user's senses such as smell, taste, and temperature. Since the capsule forms a closed environment, it is within the spirit of the invention to include stimulating all known senses.

Figure 21:
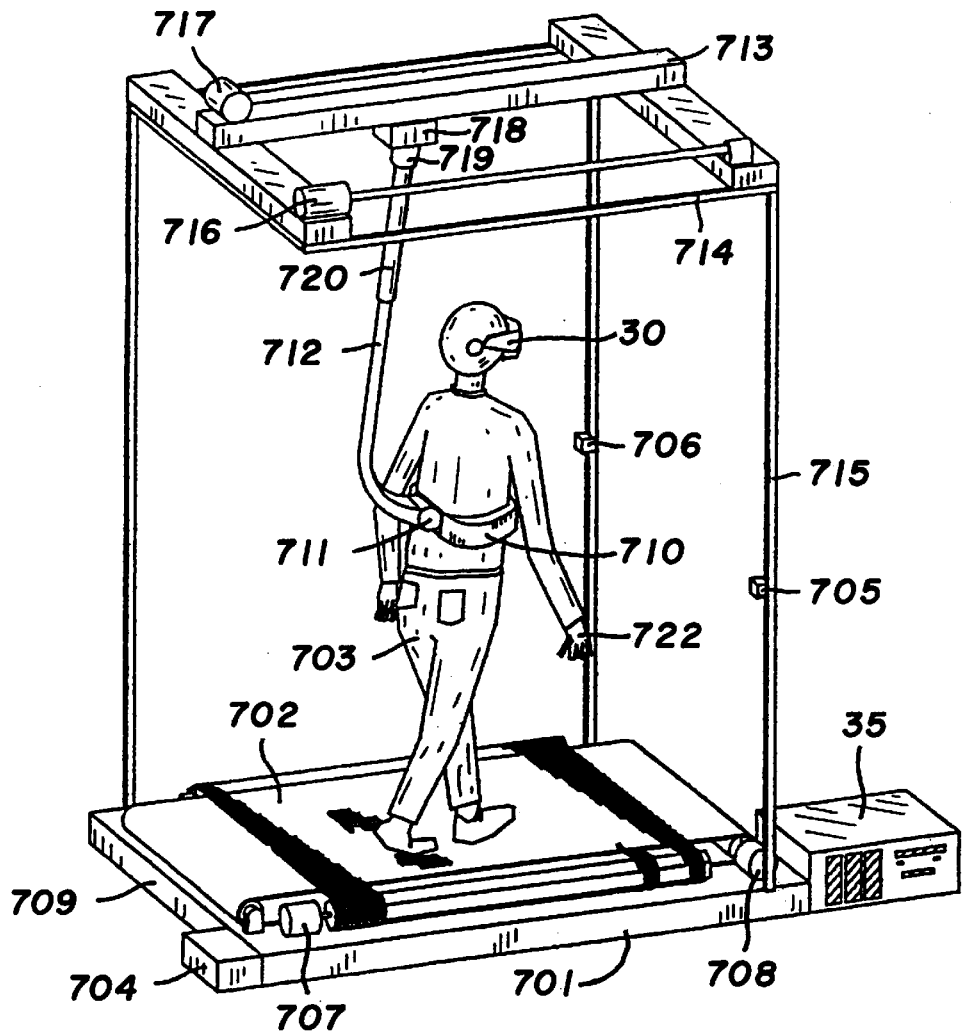
FIG. 21 is a perspective view of an omni-directional treadmill in accordance with a further embodiment of the invention.

Other types of interactive solid useful in a further embodiment of the invention are shown in FIGS. 21–39. FIG. 21 depicts an Omni-Directional Treadmill (ODT)(701) with an active surface (702) which employs a unique mechanism by which a user (703) positioned at any location on the active surface may be transported to any other point on that surface. Typically, a user who is headed off the active surface is moved back toward the center of the surface analogous to the way a linear treadmill prevents a user from running off the front or being flung off the back.

Integral to the ODT is a closed-loop motor control mechanism (704) and user position-sensing devices (705, 706) which pinpoint the position of the user (703) with respect to the fixed axes of the treadmill's active surface. These two work in concert with X axis control motor (707) and Y axis control motor (708) to ensure proper positioning of the user on the active surface, which is fixedly attached at selected points to a rigid base (709). In the embodiment of FIG. 21, the position sensors are ultrasonic transducers of a design well known to those skilled in the art of ultrasonic position sensing.

To address the problem of balance, the ODT optionally includes a means for steadying the user. A structure as simple as a circular railing may suffice. More preferable from the standpoint of transparency is the use of a balance cuff (710) which attaches near the user's center of balance. A hinge (711) at the small of the user's back connects the cuff to a support strut (712) which services to link the user with the X-Y tracking mechanism (713) of the support frame (714). Under normal circumstances, the cuff permits active X-Y tracking of the user because the support strut (712) actively maintains a vertical position. In this fashion, the user barely knows the cuff is there. When the user becomes unstable, however, the cuff serves to assist in regaining balance.

In order for the cuff and strut support to actively track the user in any orientation, the strut is preferably connected to a support structure (714) directly over the user's head which is supported by at least three vertical support members (715). Two motors (716, 717) actuate the X-Y tracking means respectively to maintain the support strut (712) in a vertical position with respect to the user. Motors are controlled by sensing the variance of the support strut from the vertical. A pair of X and Y potentiometers (718) sense the angular error of the support strut in the XZ plane and YZ plane respectively. An XZ error, for example, indicates that the X motor (716) must drive the mechanism in the direction to reduce the error to zero. Likewise for an error in YZ plane controlling the Y motor (717). Rotations about Z caused by the user turning are passed through a slip-ring assembly (719). Said slip-ring assembly prevents a winding or twisting of the support strut, and also permits passage of electrical power and signals through rotary electrical contacts so that connection may be maintained with the equipment worn by the user. Slip-ring assemblies are readily known to those familiar with rotary electrical contacts. In a similar fashion, the vertical motion of the user is permitted by an extension mechanism (720). Said extension mechanism allows only linear motion, and permits passage of electrical signals to and from the user.

The preferred embodiment of the device is a combined ODT/VR system as revealed in FIG. 21. It allows close coupling of the user's physical direction and velocity with that of the virtual world in which the user is navigating. Such a system might typically include a head-mounted display (HMD) (30) with speakers and microphone, data glove(s) (722), a body sensing suit (not shown), exoskeletal joint angle sensors, and/or other related apparatus. Said VR system would likely include a computer (35) for image generation, sound generation, and processing of related data such as head and hand position. Though not explicitly shown, peripherals worn by the user are hard-wire connected to the computer system through wires running up the support strut (712), through the X-Y tracking support (713), and down the support frame vertical member (715).

The ODT works in synchrony with the VR system by sending velocity and direction signals to the image generation computer. The computer uses the velocity vector thus provided to update the image which is shown to the user so that the user sees a visual image which takes into account this vector. For example, if the user's velocity is ½ meter/sec in the X direction as indicated by the X direction motion of the treadmill, the user will observe objects within the virtual world passing by at ½ meter/sec in the minus X direction.

Alternate embodiments of the combined ODT/VR system include the ability to tip the platform to stimulate uphill travel, and networked VR experiences in which one user shares a virtual world with others. Additional embodiments of the ODT/VR system include integration of sensing and stimulation systems. Examples of additional sensing systems might optionally include full or partial human surface mapping, video capture, or their combination, which can be manipulated and transported as the user's virtual image. A companion traveller in virtual space would then see a real-time facsimile of the user.

Figure 22:
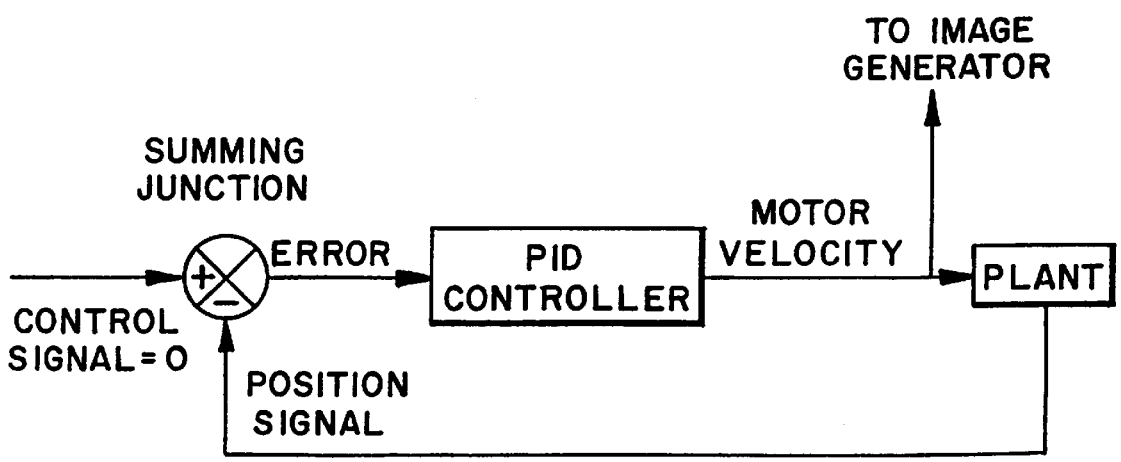
FIG. 22 is a block diagram of a motor control for use with the treadmill of FIG. 21.

FIG. 22 is a block diagram for the control of a single motor. This motor and its affiliated control loop may actuate either the X or Y axis control for either the active surface or the support cuff tracker. With reference to FIG. 22, for a single axis of the active surface, the control signal is set for zero at the center of the surface. If the position signal is off-center, the summing junction generates an error signal which is proportional to the error. A PID (proportional-integral-differential) controller, which is well known and well characterized to those familiar with the art of motion control, is tuned to interpret the error signal over time, outputting a signal which controls motor velocity along one axis. Motor velocity and its associated direction are interpreted by the VR system as a velocity and a direction, and the image presented to the user is updated accordingly. Motor velocity also causes the active surface to be driven in a direction which reduces the error. The plant represents the system components, including the user, which are responsible for generating a position signal. In the instant case, the plant includes first, the active surface as it is driven back toward center; second, the user, who is being driven back toward center by the motion of the surface; and third, the ultrasonic transducers, which sense the absolute position of the user with respect to the zero reference position, and generate the position signal which may be resolved by the summing junction.

Control of a support cuff tracking motor occurs in a similar fashion. With reference to FIG. 22, the control signal is set for zero when the support strut is vertical with respect to its active axis. If the position signal shows an angle other than zero, an error signal is generated which is proportional to the angular error. The PID controller outputs a signal for the motor controlling the axis of interest, which turns at the specified velocity. The motor velocity drives the mechanism of the plant in the direction to reduce the error to zero, and the next cycle is begun. In the embodiment of FIG. 21, the position signal might be generated by a rotary potentiometer (718) which is affiliated with the axis of interest.

An alternative embodiment of the cuff support is shown in FIG. 23. The user (703) is shown wearing a harness (721) rather than a cuff (710) of the type shown in FIG. 21. In this case the harness is flexibly connected through a hinge (711) to a rigid horizontal member (730). Said member is hingedly connected to a vertical member (732), which is hingedly connected to a rotating fixture ring (734). Said ring is rotatably held within the base (724). In the section view, 23a, we see that the fixture ring is fastened to a gear ring (736) which rests on a dual bearing race (738) supported by a bearing ring (740). The gear ring is restrained from transverse movement by the bearing race grooves, and is constrained in the upward direction by roller contacts (742). Said ring is driven about its center by geared contact with a spur gear (744). The spur gear is driven by the drive motor (746) through a gear reduction means (748).

Shear sensors within the cuff (750) or at the hinge (711) generate a signal which is analogous to the error signal of FIG. 22. The motor (723) drives the ring in a direction to reduce the shear sensor output toward zero. In this manner the cuff and support struts track the user's position, providing support and balancing assistance to the user along with a hard-wired connection to the HMD and sound system. In all other respects, the active surface (702) of the ODT behaves the same as that in FIG. 21. For clarity, the position sensors, motor drivers, and computers are omitted from the figure.

An alternate embodiment would provide better support for the user by making the hinge support (752) of the horizontal member (730) and the hinge support (754) of the vertical member active members, i.e., they could be actively damped. Active damping would sense the rate at which the user is moving, and would increase damping in proportion to the velocity of movement. In this way, if the user should fall or lose his or her balance, the rapid change in velocity would cause much increased damping at the hinges, thus providing the support needed for the user to regain his or her balance.

A non-motorized embodiment of FIG. 23 would employ a hand grip for steadying balance, as shown in FIG. 24, rather than the actively tracking cuff of FIG. 21 or the harness of FIG. 23. The hand grip (760) attaches through a horizontal member (730) through a hinge (752) to a vertical member (732). The vertical member is attached through a hinge (754) to a rotating fixture ring (734) of the type depicted in FIG. 23 which is rotatably attached to the base (724). Because the ring rotates around the user (not shown) under power of the user, there is no motor. The user would always have at least one hand on the hand grip, and would apply forward and backward force, and torque to the handle to properly position it as he or she moved about the active surface (702). This embodiment of the invention, though reduced in features, would be less costly to manufacture and would require less ceiling height. The unit could be comfortably installed in the home or office with no special height or power requirements. For clarity, the user, position sensors and computers are omitted from the figure.

Figure 25:
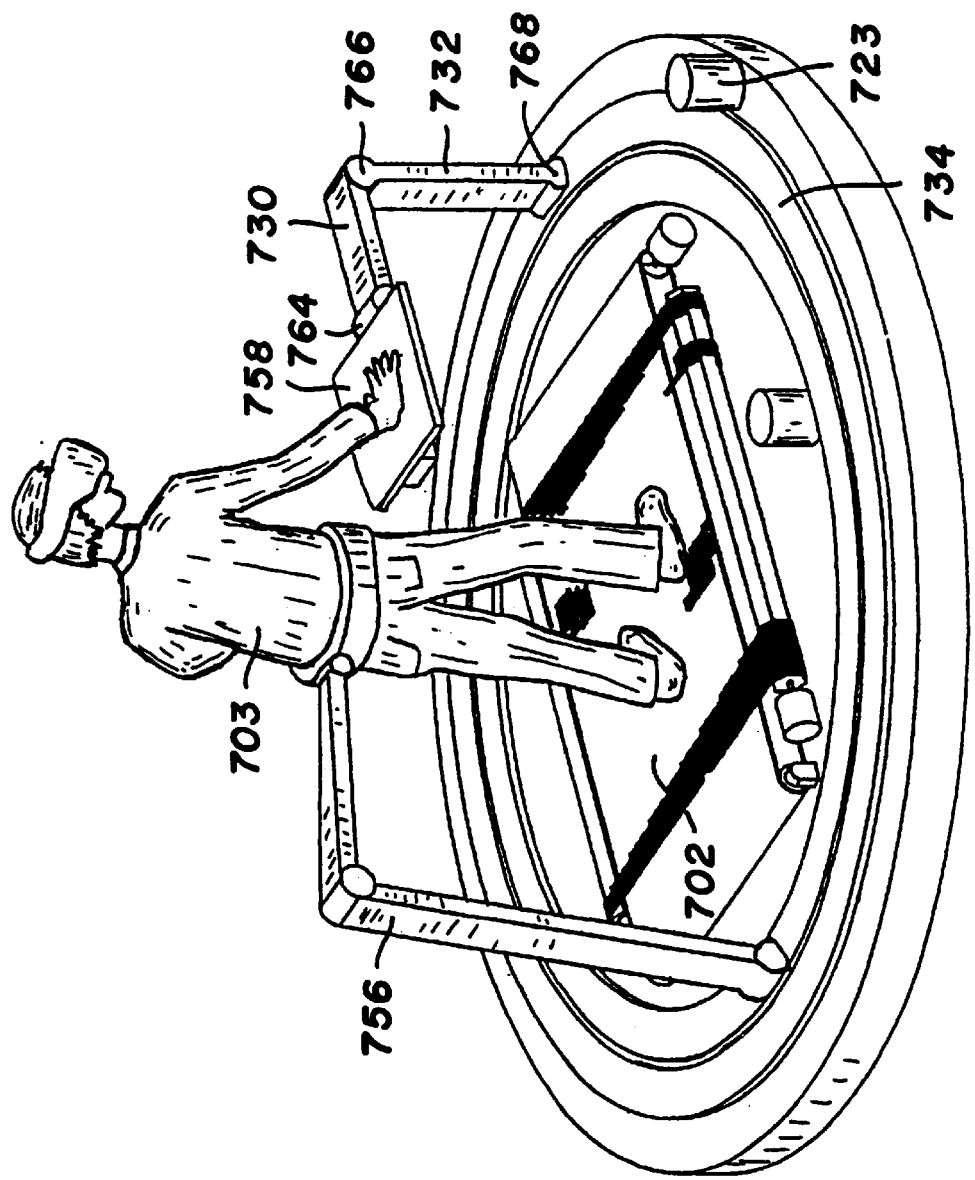
FIG. 25 is a perspective view of yet another embodiment of a treadmill of the invention.
Figure 26:
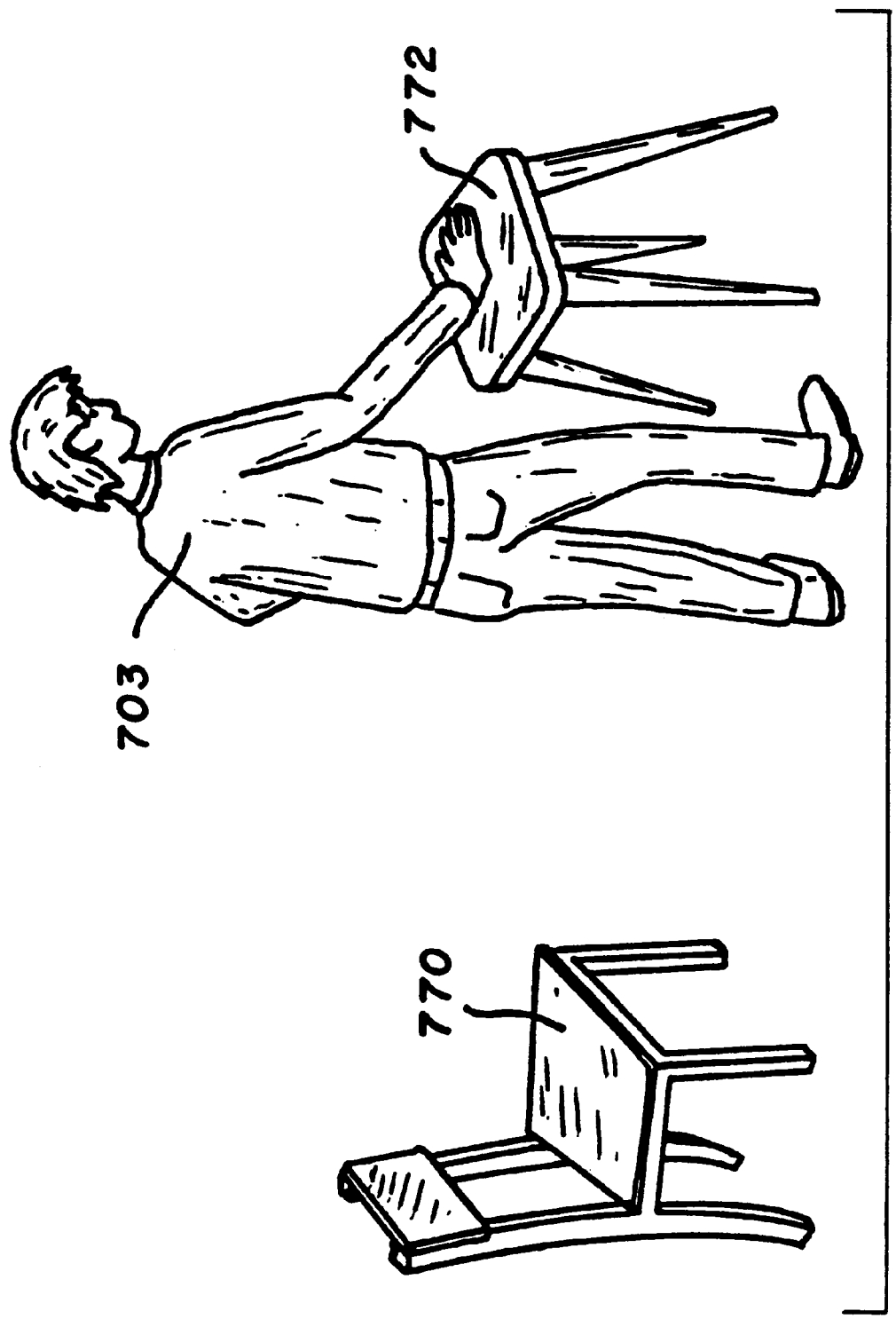
FIG. 26 is a diagrammatic view showing a user in real space.

Haptic interaction may be accomplished through use of active or dynamic "interactive solids" also referred to generally as "haptic displays." FIGS. 25 and 26 show how such haptic display might interact with the user. FIG. 25 depicts a user in real space. Here we see the user (703) standing on the ODT (702), supported as before by a cuff and strut assembly (756). The user is reaching out and touching a flat, horizontal surface (758) upon which he is about to sit. Said surface is controllably placed by a motorized strut assembly consisting of a horizontal member (730), a vertical member (732), and hinge control motors (764, 766, 768). This positioning assembly is fixedly mounted on a secondary mounting ring (734) of the type first shown in FIG. 23. Said ring is powered and positioned by a motor (723) in a fashion similar to that of the motor depicted in FIG. 23. The surface of the haptic display (758) may be controllably placed by suitable rotation of the mounting ring (734) and turning of the hinge motors (764, 766, and 768).

FIG. 26 depicts visual reality as seen by the user of FIG. 25. In the virtual space of FIG. 26, the user (703) sees and physically interacts with the surface of FIG. 25 where it appears as a chair (772). This is an example of a dynamic interactive solid (also referred to as an "active interactive solid", above) because it may dynamically interact with the user to solidify the synthetic visual reality. A second chair (770) which is within the user's virtual world is also available to sit upon. If the user were to choose the second, lower chair, he would simply turn and walk to that chair. The ring (734) of FIG. 25 will swing the interactive solid (758) to correspond with the anticipated surface of the second chair (770), and the user may touch it and sit upon it.

In a similar fashion, a solid may be fixedly placed on the immobile base of the ODT. This example of a passive interactive solid performs the same function as a dynamic interactive solid, but has no ability to move or react to the user or the virtual environment. The image which corresponds to said passive solid is fixed in the reference space of both the real world and the virtual world. An example of said passive solid might be a desktop.

Passive and dynamic solids are not restricted to the circular-ring embodiments of FIG. 23–26. They may just as easily be implemented within the embodiment of FIG. 21 and its related variations. An example of such a hybrid system would include abovemounted cuff support, such as shown in FIG. 21, as well as single or multiple rings for positioning and securing passive and dynamic interactive solids.

The invention is not restricted to the use of a balance cuff. Omni Directional Treadmills with a larger surface and gentle centering actions may not need a cuff to support and balance a user. A large active surface area allows restorative forces to be gentle enough to avoid upsetting the user's balance.

Interactive solids are referred to in the literature as "haptic displays" or "roboxels". Related work has evolved interactive surfaces such as circular plates and shafts with torque feedback (Good, U.S. Pat. No. 5,185,561). Exoskeletal devices, such as those developed by Exos, Inc. and by Tachi in Japan, permit force feedback from shapes of arbitrary geometry. It is in the spirit of the invention to optionally include both passive and dynamic interactive, reality-enhancing means as integral to the function of the ODT.

By itself, the ODT is useful as an exercise device, a motion analysis device for movement in arbitrary directions, and a training device for lateral moves in arbitrary direction.

Combined with a VR system, the ODT is useful for exercise, motion analysis, training, recreation, virtual space navigation, telepresence, education, and psychological analysis and therapy.

In order for an active surface to move a resting mass in any direction, it must have available two active vector motion components, plus and minus X, and plus and minus Y. A linear treadmill has only plus and minus X. The ODT has both.

The ODT employs a "vector thrust drive" which mechanically separates the two motion components so that they can be powered and controlled by two separate motors. The vector thrust is the vector sum of the X motion component and the Y motion component.

Figure 27:
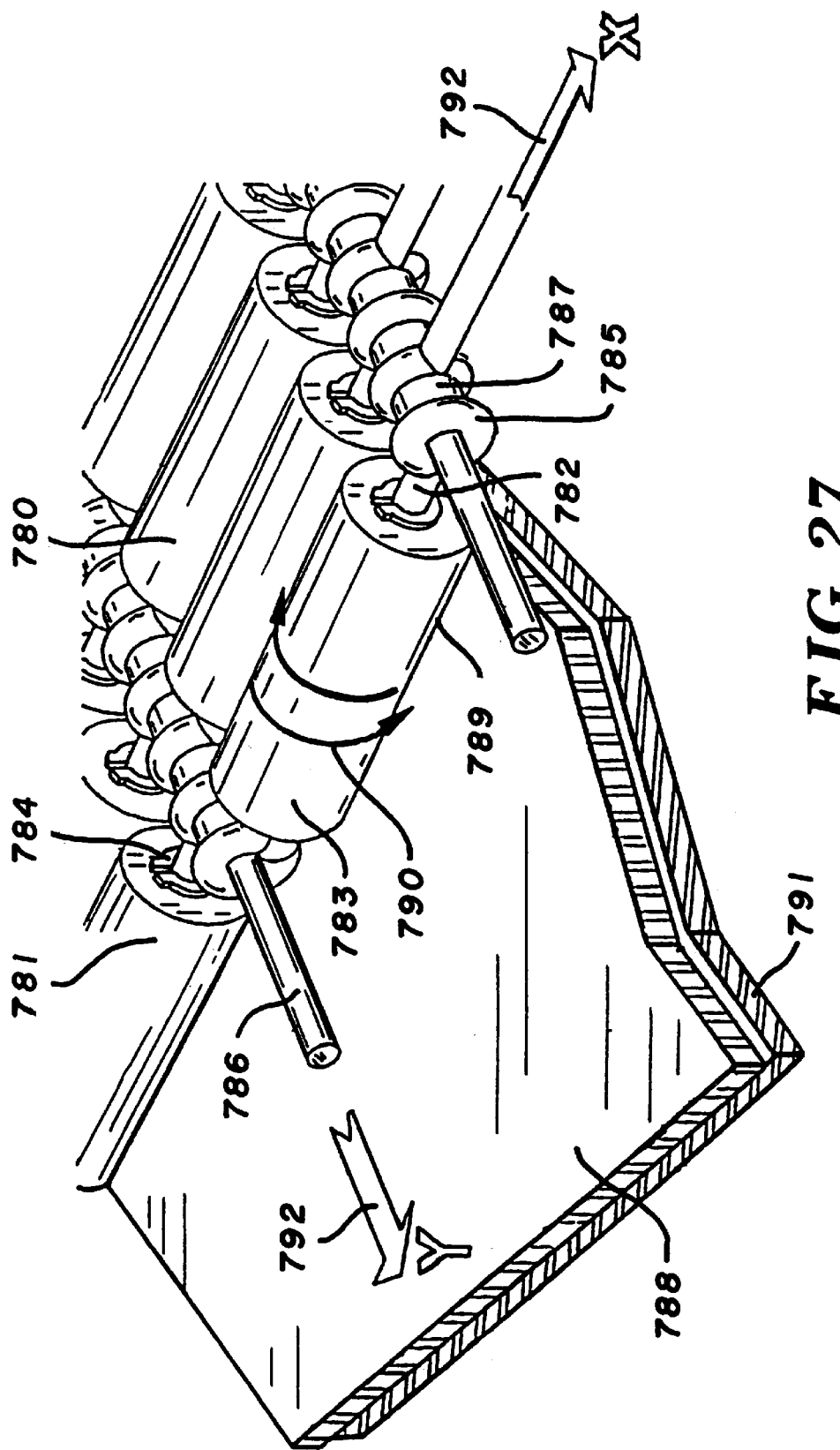
FIG. 27 is a perspective view of a section of a track assembly employed in the embodiments of a treadmill such as those in FIGS. 21 to 25.

As shown in FIG. 27, the active surface (780) of the ODT, hereinafter referred to as the roller belt, is comprised of a multiplicity of identical roller segments (781). A roller segment consists of a rigid shaft (782) upon which is mounted a freely rotating roller (783) which is kept within its lateral boundaries by spring clips (784) fastened at the ends of the shaft. Ends of the shaft are formed into eye hooks (785), which, in turn, are held around a common hinge axis by a hinge rod (786). Contact points of individual eye hooks are separated by spacers (787) to properly position them and to prevent lateral motion. Each roller fictionally abuts a surface (788), preferably a flexible belt, moving at right angles to the motion of the roller segments, along a line of contact (789) which serves to create selective rotational motion (790) to the roller. The flexible belt is supportively abutted by a rigid support plate (791) which substantially takes the load of the user's weight, and ensures that the active surface remains flat.

X-direction motion (792) of the roller belt (780) is driven by the X-direction motor (707) of FIG. 21. Y-direction motion (792) of the flexible belt (788) is driven by the Y-direction motor (708) of FIG. 21.

Figure 28:
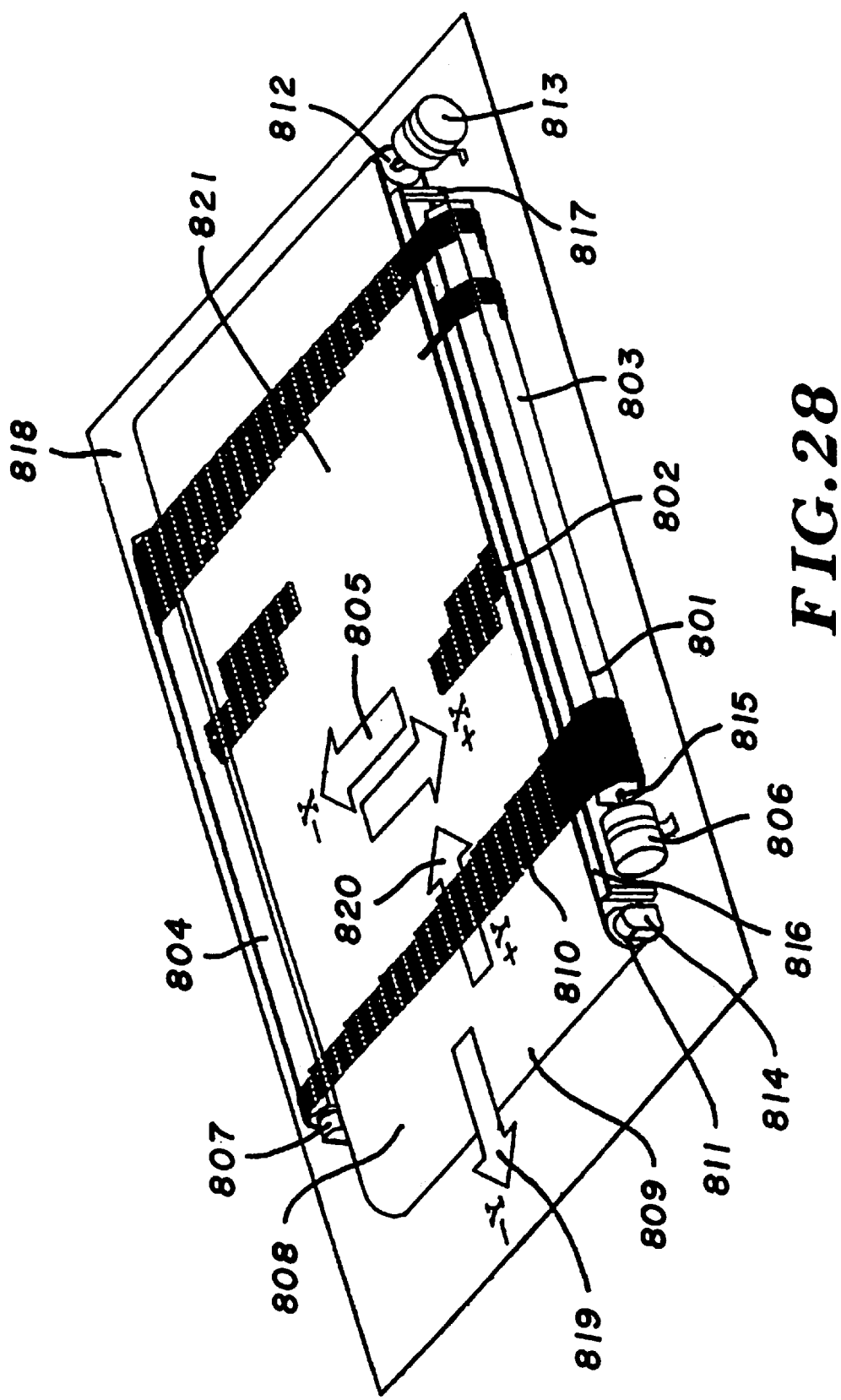
FIG. 28 is another perspective view of a track assembly employed in the embodiments of a treadmill such as those in FIGS. 21 to 25.
Figure 29:
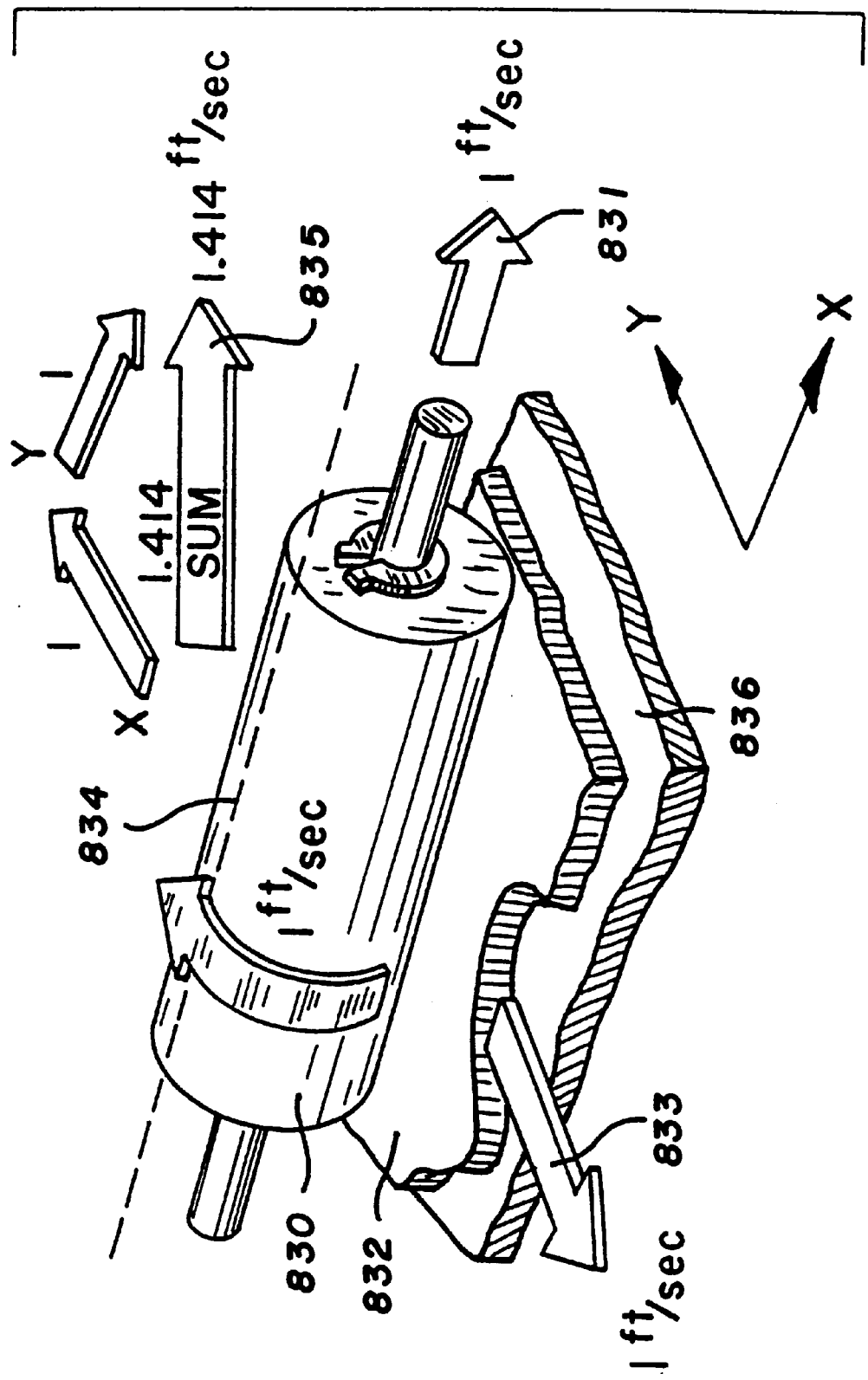
FIG. 29 is a diagrammatic perspective view, similar to FIG. 27, showing the movement of rotatable sleeves and a sleeve drive belt.

FIG. 28 shows the complete mechanism for achieving full omni-directional motion, and shows that the hinge rod (801) permits the roller belt (802) to flex around rollers (803, 804) at the belt edges. Hex rollers actuate the roller belt in the plus and minus X vector direction (805). As shown, rollers are hexagonal in shape to accommodate the hinged nature of the roller belt.

In the embodiment of FIG. 28, one hex roller is powered by a motor (806) while the other is an idler (807), although both rollers could easily be powered. The linearly actuated planar surface (808), which is the top surface of a flat, closed-loop drive belt (809) is placed in intimate contact with the bottom surface of the roller belt (810), and oriented so that its motion is at right angles to the motion of the roller belt. It is supported and directed at its ends by rollers (811, 812). In the preferred embodiment, only one roller is actuated by a motor (813); the other is an idler roller.

Rollers are supported by bearings (814), or by a motor drive shaft (815). The bottom surface of the flat, flexible drive belt (809) is supportively abutted by a rigid support plate (816) which is supported at each of its four corners by support legs (817). Said support legs, bearings, and motors are securely fastened to a rigid support surface (818) which serves as ground.

When the roller belt alone is actuated, the top of the rollers provide plus and minus X motion. When the flat belt alone is actuated, it fictionally contacts the bottom surface of the rollers, thus causing them to rotate about their free axis. So, if the belt is moving in the −Y direction (819), the top surface of the rollers is moving in the +Y direction (820).

Since the contact lines at the top of each roller are moving in concert, a mass resting on the active surface (821) defined by the sum of the contact lines is moved in the direction of the combined X and Y motion vectors. The active surface of this figure (821) may be identified with the active surfaces of FIG. 21, FIG. 23, and FIG. 24.

By actuating the beaded belt and the flat belt simultaneously, the surface contact lines of the rollers may be made to impart any combination of X and Y movement. For instance, in FIG. 29 we see a roller segment (830) moving at plus 1 foot/second in the X direction (831), and the flat belt (832) is moving at minus 1 ft/second in the minus Y direction (833). The freely-rotating roller converts the belt's −Y motion to a +Y motion at the contact line (834). And the combined thrust vector (835) equals the vector sum of the two belt's motions, i.e., 1.414 ft/second at an angle of 45 degrees in the first quadrant.

For better stability, the underside of the flat belt is supported by a smooth, flat, rigid surface (836). The interface surface between the flat belt (832) and the support surface (836) is preferably reduced in friction by coating with a slippery substance such as teflon.

A tensioning mechanism is advantageously employed on one of the two rollers in the X direction and one of the rollers in the Y direction, preferably the idler roller, so that any slack or relaxation of the belts may be taken up.

Rollers may be arbitrarily small or arbitrarily large. However, sensible limits are placed on roller size by factors such as ease of assembly. In addition, the size of the hexagonal rollers is determined by the length of the roller and the hinge segment it defines. Obviously, there is an optimal roller size range for said assembly.

A hexagon shape has been arbitrarily chosen to depict the roller belt actuation means. The roller is not restricted to this shape, though it is reasonably expected that the roller will have between six and eight sides to optimize the balance between size and manufacturability.

Figure 30:
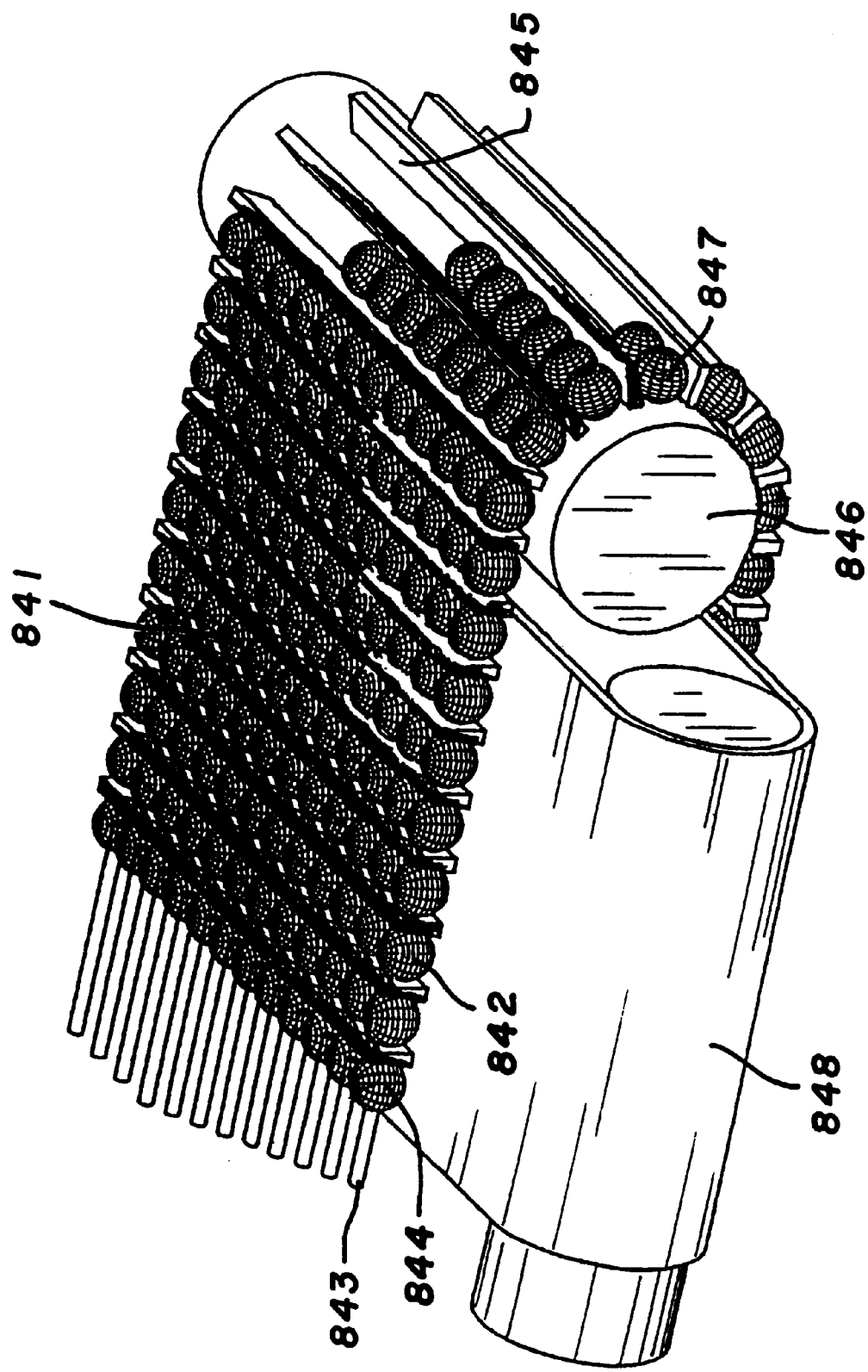
FIG. 30 is a perspective view of an alternate embodiment of a track assembly useable with embodiments of treadmills similar to FIGS. 21 to 25.

The vector-slip principle may be employed with discrete components of another form as well. In FIG. 30 is seen one corner of the active surface of the ODT (841), which consists of a multiplicity of identical beaded segments (842). A beaded segment consists of a flexible cable (843) upon which is strung a number of beads (844). The cable is fastened end to end to form a closed loop. Beads are separated by spacers (845). Spacers serve two purposes. First, they ensure a uniform bead spacing. Second, they impart linear force to the bead as the cable is pulled in either direction. Without the spacers attached to the cable, the cable would tend to pull through the beads rather than force them in the desired direction.

Rollers (846) (only one shown) support and direct the return loops (847) at the segment ends. Adjacent segments are fastened to each other by the spacer mechanisms (845). The combination of adjacent bead segments and their associated spacers forms a uniform surface of beads, which is directly analogous to the uniform surface of the roller belt. As with the roller belt system, said beads are actuated in the plus and minus X direction by one set of rollers, and are actuated in the plus and minus Y direction by contact with a flat belt (848).

Figure 31:
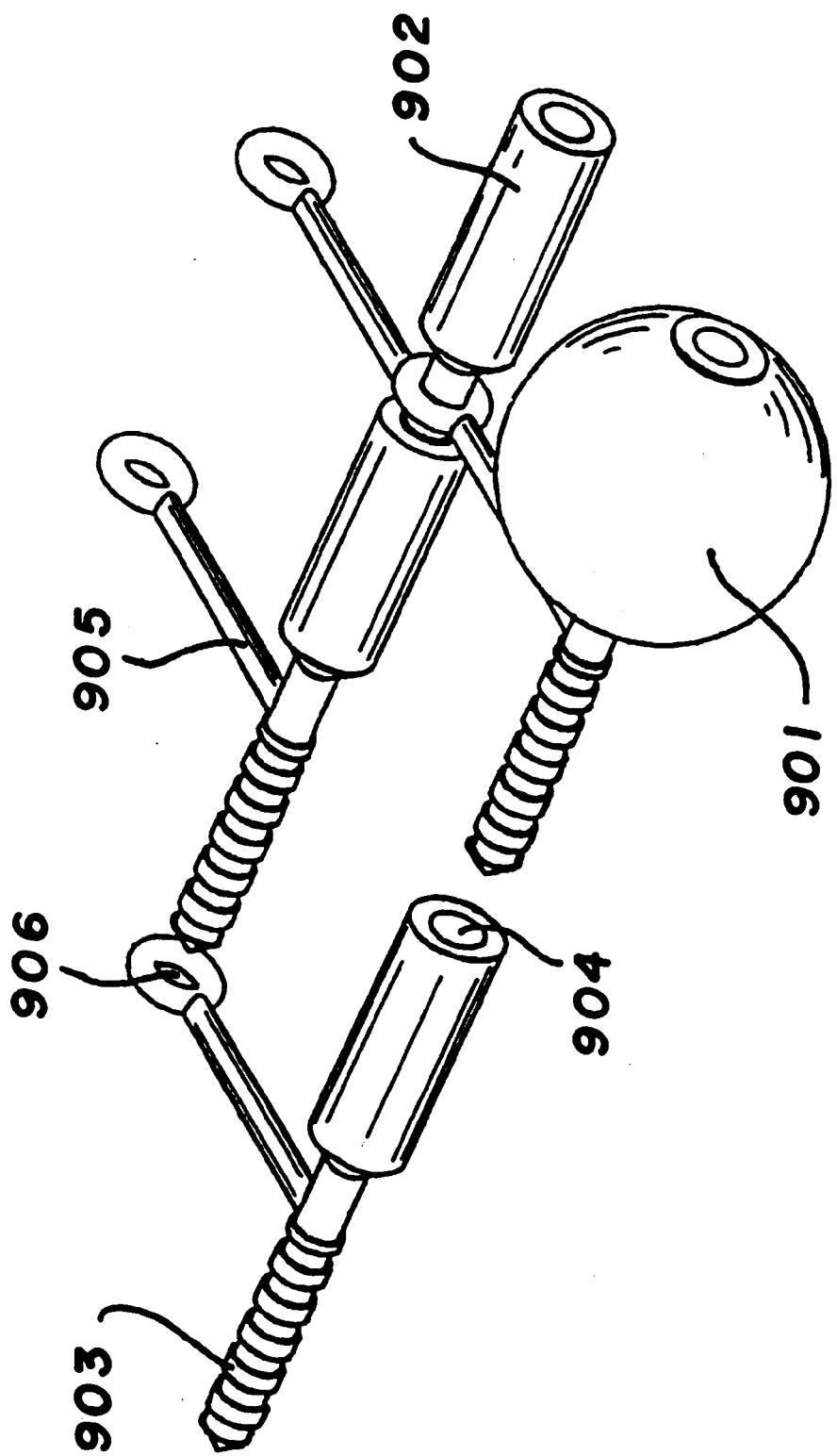
FIG. 31 is an exploded perspective view of a section of another embodiment of a track assembly useable with embodiments of treadmills similar to FIGS. 21 to 25.

Rather than stringing components on wire and fastening them together, it is also possible to fabricate a single, repeating construction unit which accomplishes the same function as the wire and bead assembly of FIG. 30. FIG. 31 depicts such a repeating unit. A bead (901) (or roller) is rotatably mounted on a shaft (902) which has a male (903)

and female (904) end as well as a connecting strut (905). Beads are connected into closed-loop strings by fastening the male portion of the assembly into the female. Connections between strings of beads are made by mounting the hole of the strut (906) over the male portion of the adjacent string. It is understood that said repeating, componentized structures are also suitable for construction of a roller-type unit which duplicates the function of the roller belt described in connection with FIG. 30.

Following assembly of all the bead segments which comprise a roller belt, the assembly will look much as that depicted in FIG. 30, except the spacers (845) will be an integral part of each unit assembly as separate connecting struts (905).

Figure 32:
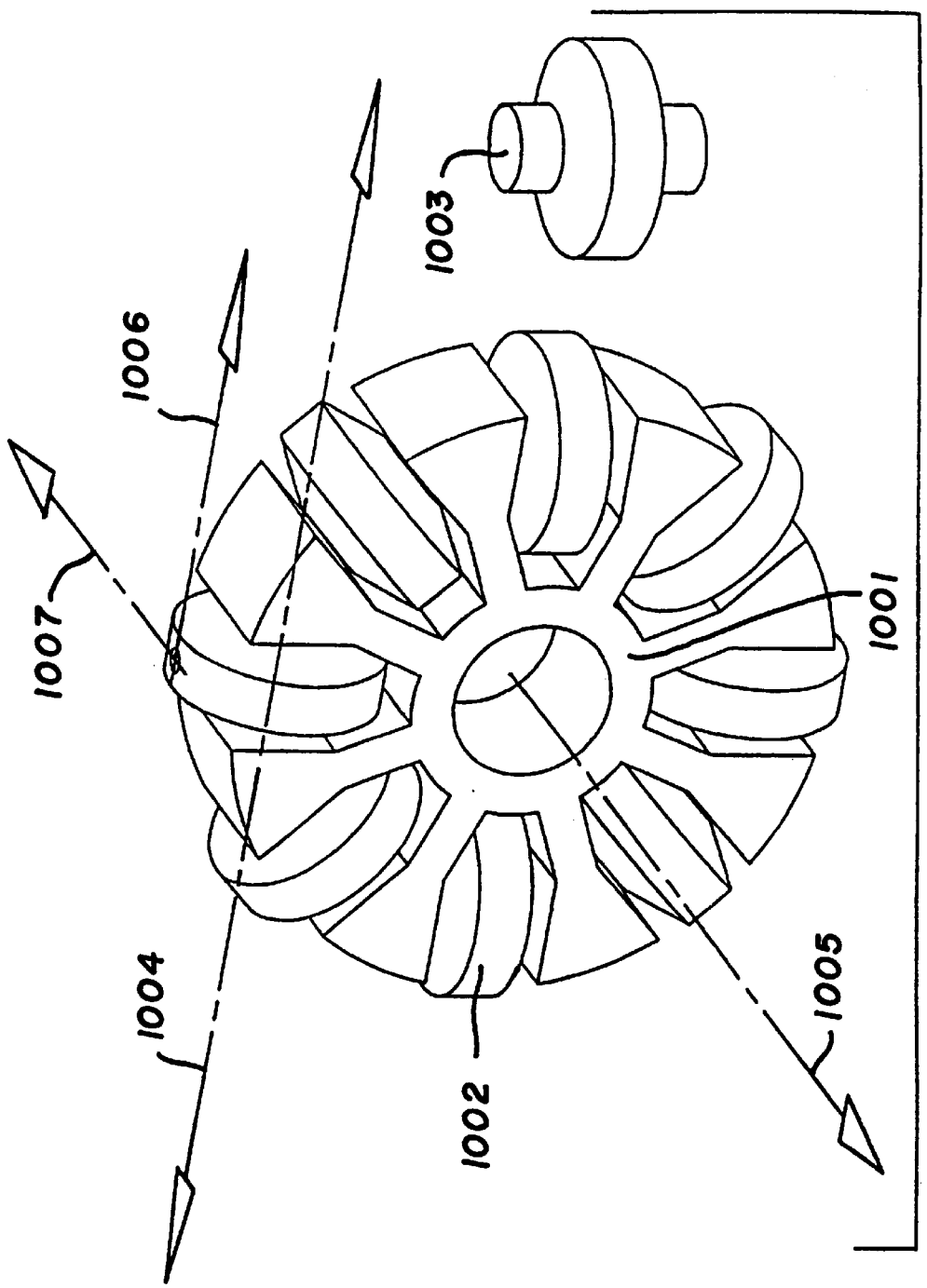
FIG. 32 is a perspective view of an embodiment of an omni-directional wheel and idler rollers.

FIG. 32 reveals yet another embodiment of an omni-directional surface actuation means which uses a wheel (1001) with idler rollers (1002) positioned around its circumference. An idler roller unit (1003) is inserted into the appropriate receptor notch in the wheel (1001). Each idler axis (1004) is oriented perpendicular to the powered axis (1005) of the wheel. Said vector-slip wheel has the unique property of being able to transmit force only through a line perpendicular to the powered axis (1006), the X axis. Any motion which the wheel sees in the Y axis passes over the idlers (1007).

Figure 33:
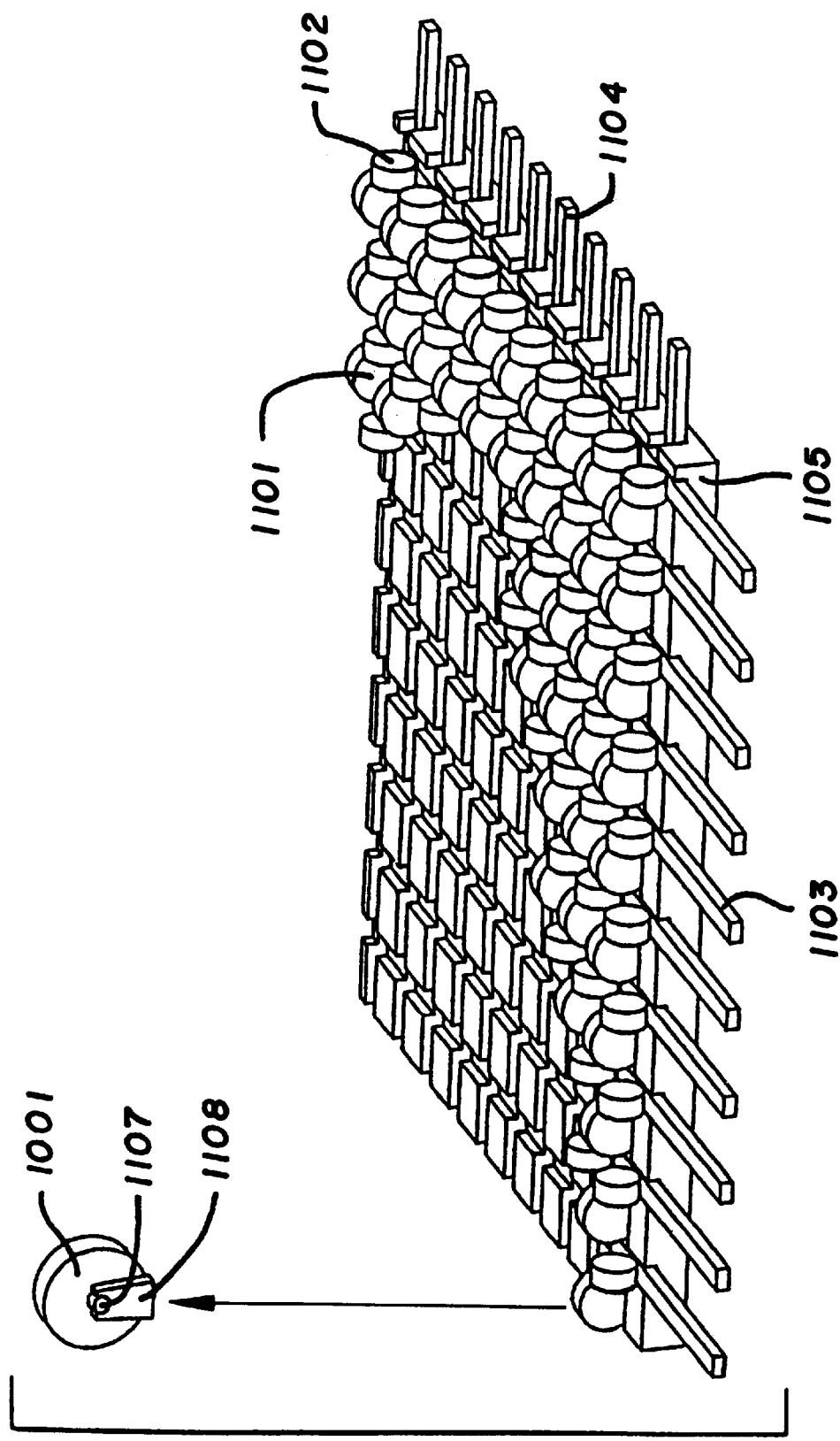
FIG. 33 is a perspective view of an embodiment of a track assembly useable with a treadmill similar to FIGS. 21 to 25.

FIG. 33 shows that by combining the above-described vector-slip wheel of FIG. 32 in an array of X oriented wheels (1101) and Y oriented wheels (1102), a combined direction vector may be achieved by selective actuation of the X and Y arrays. Said wheels are actuated in the Y direction by one set of belts (1103), and in the X direction by another set of belts (1104) which contact the bottoms of the wheels. These belts are held and directed by a base (1105) with guide grooves and mounts for the wheel arrays. Wheel (1001) is a typical X-direction wheel of the construction of FIG. 32. It is held onto the base by snap fitting its axle (1107) into snap grooves of a pair of mounting posts (1108), where only one post is shown. Every wheel is held onto the base in the same manner.

Because the X wheels are a larger diameter than the Y wheels, the X-contacting belt and the Y-contacting belt do not come into contact with one another. As with the beaded invention, actuation of the X wheel array actuates motion in the plus and minus X direction which passes easily over the idlers of the Y vector-slip wheels with no hinderance. Pure Y motion is likewise unhindered by the X array. As long as a resting mass contacts a reasonable number of X and Y rollers, combining X and Y wheel arrays permits an active surface which is able to linearly actuate the resting mass in any direction through combination of the X and Y vectors.

Drive belts (1103, 1104) are continuous belts which are driven by rollers (not shown). The rollers are powered and controlled by motors in a fashion similar to the roller/motor combinations of FIGS. 21–24 & FIG. 28.

Ergotech, Inc. makes an assortment of large rollers which employ shaped idler pulleys on their exterior which fall into the same class as the vector-slip wheel. Their use is as passive moving devices for boxes and other flat-bottomed articles.

Martin-Marietta has employed a vector-slip drive on a lunar rover. Their idler rollers are oriented at 45 degrees to the main wheel drive axis. Thrust is therefore always at 45 degrees to the main wheel drive axis. By proper combination of the four thrust vectors available from the four wheels, the rover is able to navigate in any arbitrary planar direction.

One advantage of the method of discrete construction units is that their hinged nature allows better control of the active surface topography. By making the material of the flat belt flexible and deformable, and by supporting the underside of the flat belt with a multiplicity of individually controllable idler rollers, each support point may be selectively raised or lowered. By selectively raising or lowering the idler support points on the flexible underside of the flat belt, and by jointedly connecting discrete construction units to form the beaded active surface, the active surface may be deformed with controllable bumps and depressions. Said bumps and depressions might be advantageously shown as matching bumps and depressions in the virtual environment, thus enhancing the reality of the immersive experience.

In a comparable fashion, the vector-slip wheels of FIGS. 32 & 33 may be individually raised and lowered to simulate a surface of varying texture. Since the vector-slip wheels are discrete units rather than tied in to a belt, they may be raised and lowered substantially more than their roller or bead counterparts. In this embodiment, because vector-slip wheels are potentially decoupled from their support surface, it is no longer possible to drive them using belts as shown in FIGS. 33. Each wheel must be individually actuated using separate drive means. While more complex, this embodiment is the only one of the aforementioned systems which permits simulation of complex tasks such as climbing stairs while retaining the advantage of ODT.

Figure 34:
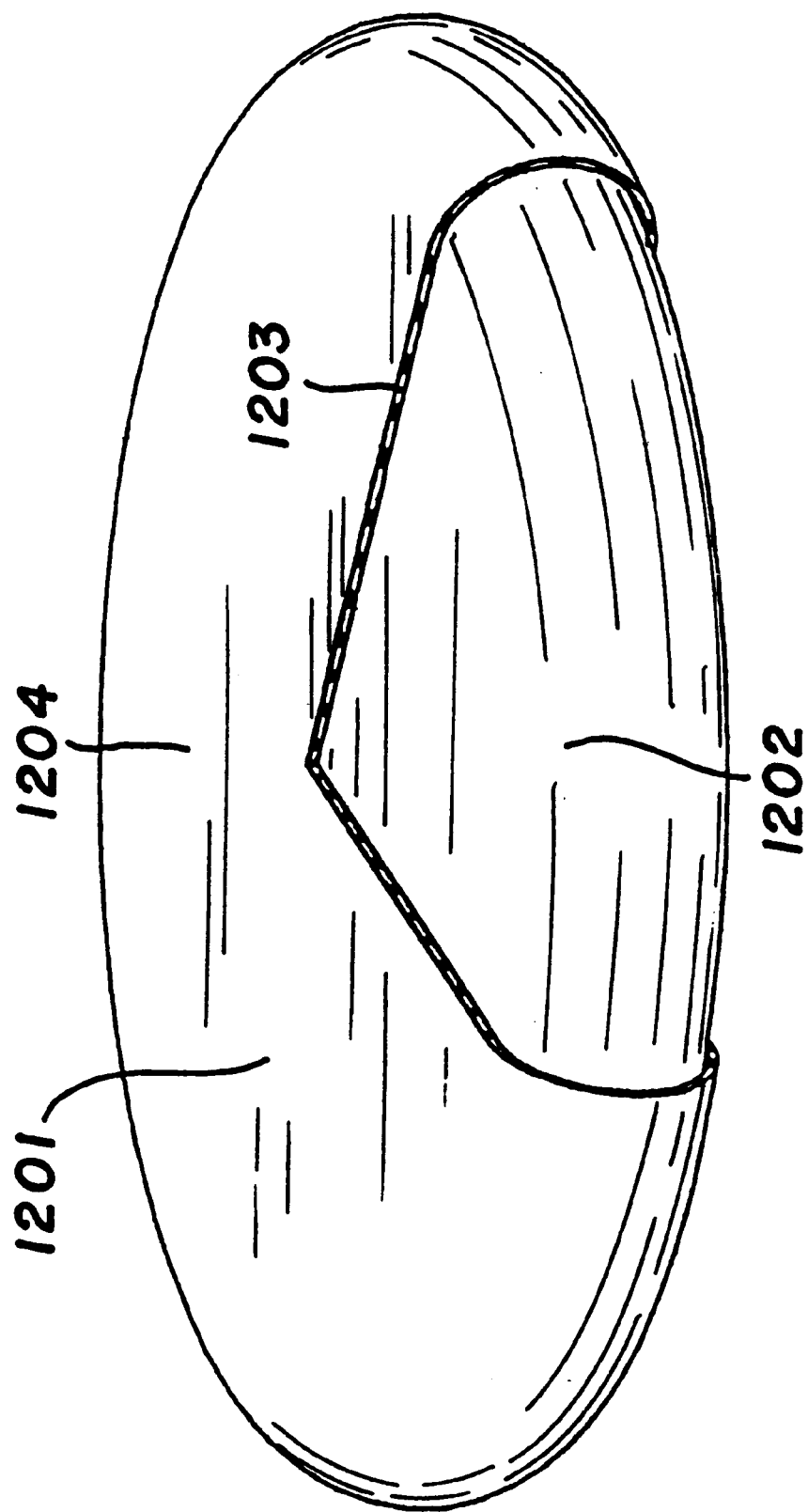
FIG. 34 is a perspective view, partly sectioned, of a spheroid treadmill segment.

FIG. 34 reveals yet another embodiment of an ODT which employs a moveable, continuous, active surface (1201) that wraps around a flattened spheroid (1202). Said active surface is held onto the surface of the spheroid by its own elasticity, and the contact zone between the rigid spheroid and the moving surface (1203) is relatively frictionless. By sliding the active surface around the spheroid, the flat portion at the top of the spheroid (1204) will serve the same function as the active surface of earlier figures.

Figure 35:
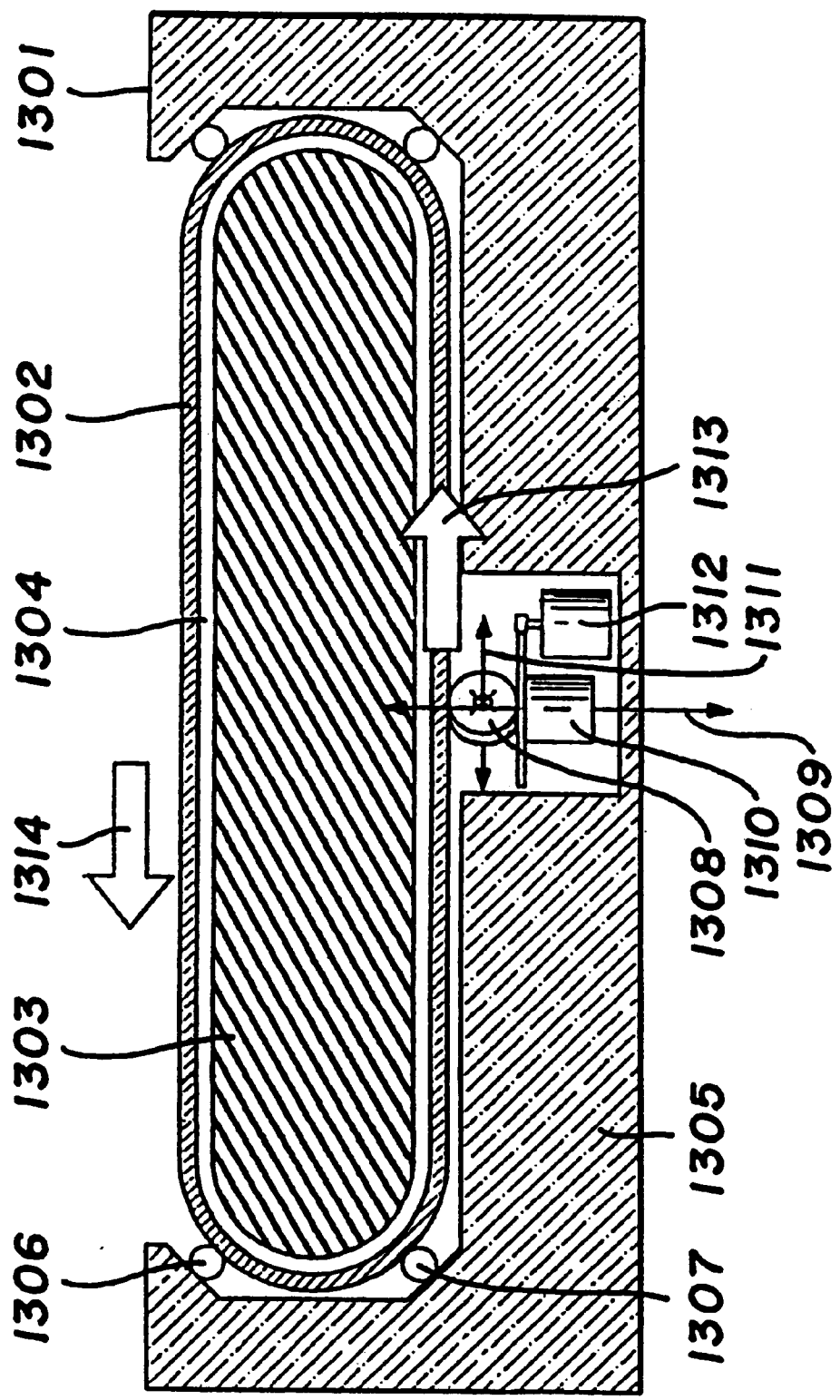
FIG. 35 is a sectional view of a segment of FIG. 34 incorporated in a track assembly.

FIG. 35 is a cross section of the fully implemented spheroid construction of FIG. 34 the ODT (1301) shows an active surface (1302) which stretchably surrounds the rigid spheroid (1301), separated by a relatively frictionless layer (1304). The housing (1305) retains the active surface and spheroid by mounting passive casters which substantially retain the top (1306) and bottom (1307) contours of the fundamentally spheroid shape, and by presenting a slight overhang to retain motion of the assembly in the upward direction.

The active surface is controllably actuated by frictional contact with a steerable roller (1308). Said roller is steerable about two axes. Axis one (1309) is powered by a motor (1310) about the roller itself, thus driving the bottom side of the active surface by a frictional contact. Axis two (1311) drive by motor (1312) provides steerability of the roller so that the roller can direct its thrust vector in a full circle. A thrust vector provided by the roller causes the active surface to slide around the spheroid. As depicted, with the roller providing thrust on the lower surface substantially in the plus X (1313) direction, the upper surface responds in the minus X (1314) direction.

Figure 36:
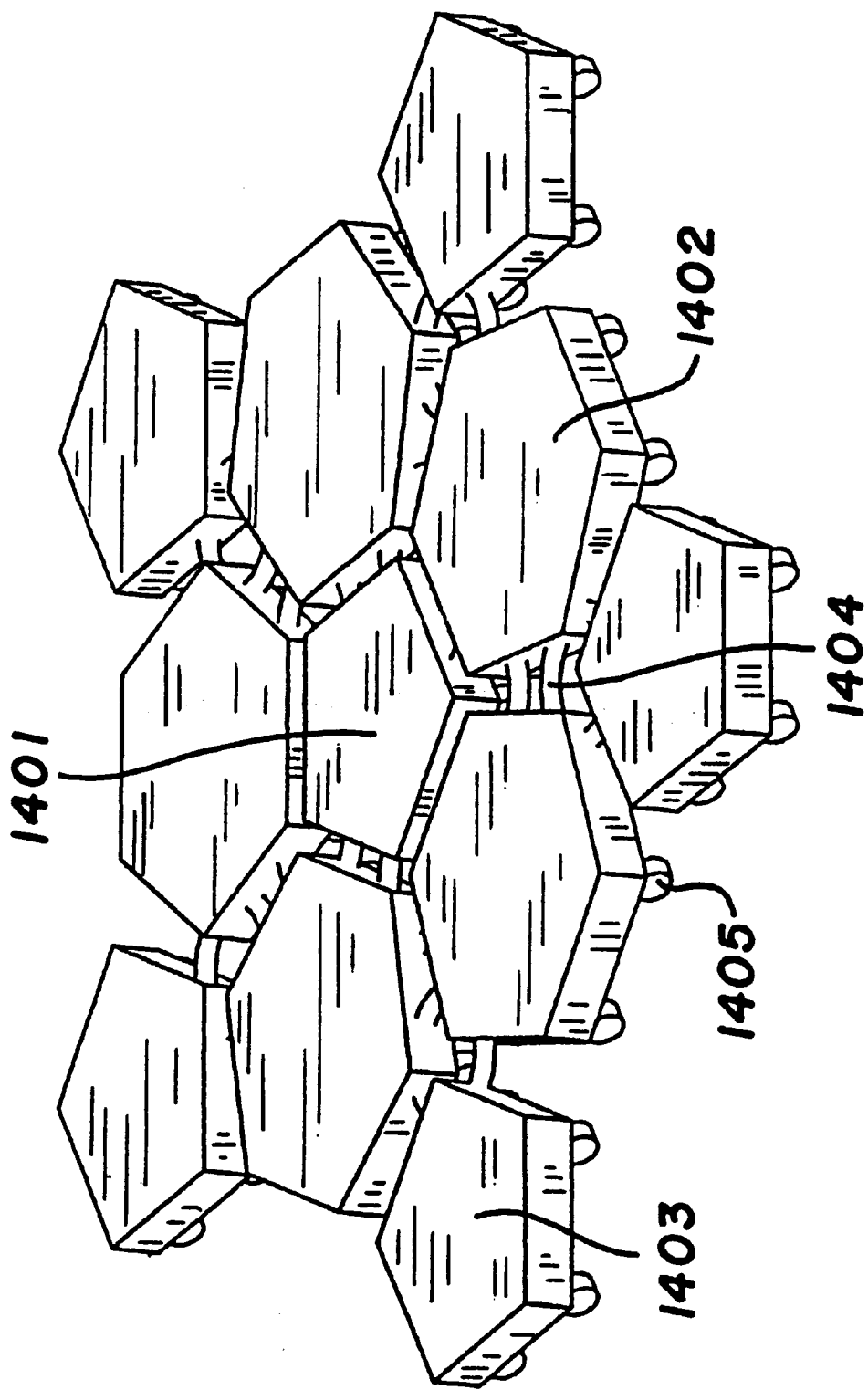
FIG. 36 is a perspective view of an alternate embodiment of an active surface of a track assembly.

FIG. 36 details a potential embodiment of a small area of the active surface (1401). A pattern of rigid plates is arranged to form an array of hexagons (1402) and pentagons (1403), much like the surface of a soccer ball. Corners of the plates are held together elastically (1404), so that the surface may expand and contract appropriately as it traverses the spheroid. The underside of each plate is suitably supported by an arrangement of casters (1405) which are pressed into the rigid material of the plate. Said casters permit contact between the plate and the spheroid to be low in friction, as required for proper function.

An improvement on the embodiment of the powered roller (1308) of FIG. 35 would be to split the roller function into two rollers actuated by a differential gear unit. It may still be powered by two motors as revealed above, however it would gain the advantage of minimizing rotational friction during steering, in much the same way an automobile differential permits the drive wheels of a turning car to rotate at their own speed.

It is understood that the surface construction of FIG. 36 is exemplary, and represents only one of a class of surface constructions which fulfills the function of a flexible, low-friction active surface interacting with a contained, flattened, spheroid.

Although the basic system configuration includes a support cuff for assistance of balance and optionally for tracking user orientation, it also has the potential to completely lift and support the user. A strengthened and fully actuated support strut connected to a fully supporting cuff and harness enables a user to be lifted up from the active surface and moved within the confines of the mechanically limited motion envelope. A system of this type would allow a user to transition between active surface locomotion and free-body flight.

In a similar fashion, the entire active surface and related mechanism may be mounted upon a motion platform which permits various combinations of linear and angular motions of the surface. A tipped surface is useful for simulating an inclined surface in virtual space, like a user might encounter when walking up a virtual hill. A surface which moves up and down as well as angularly can simulate the deck of a ship, or the cabin aisle of an aircraft.

Figure 37:
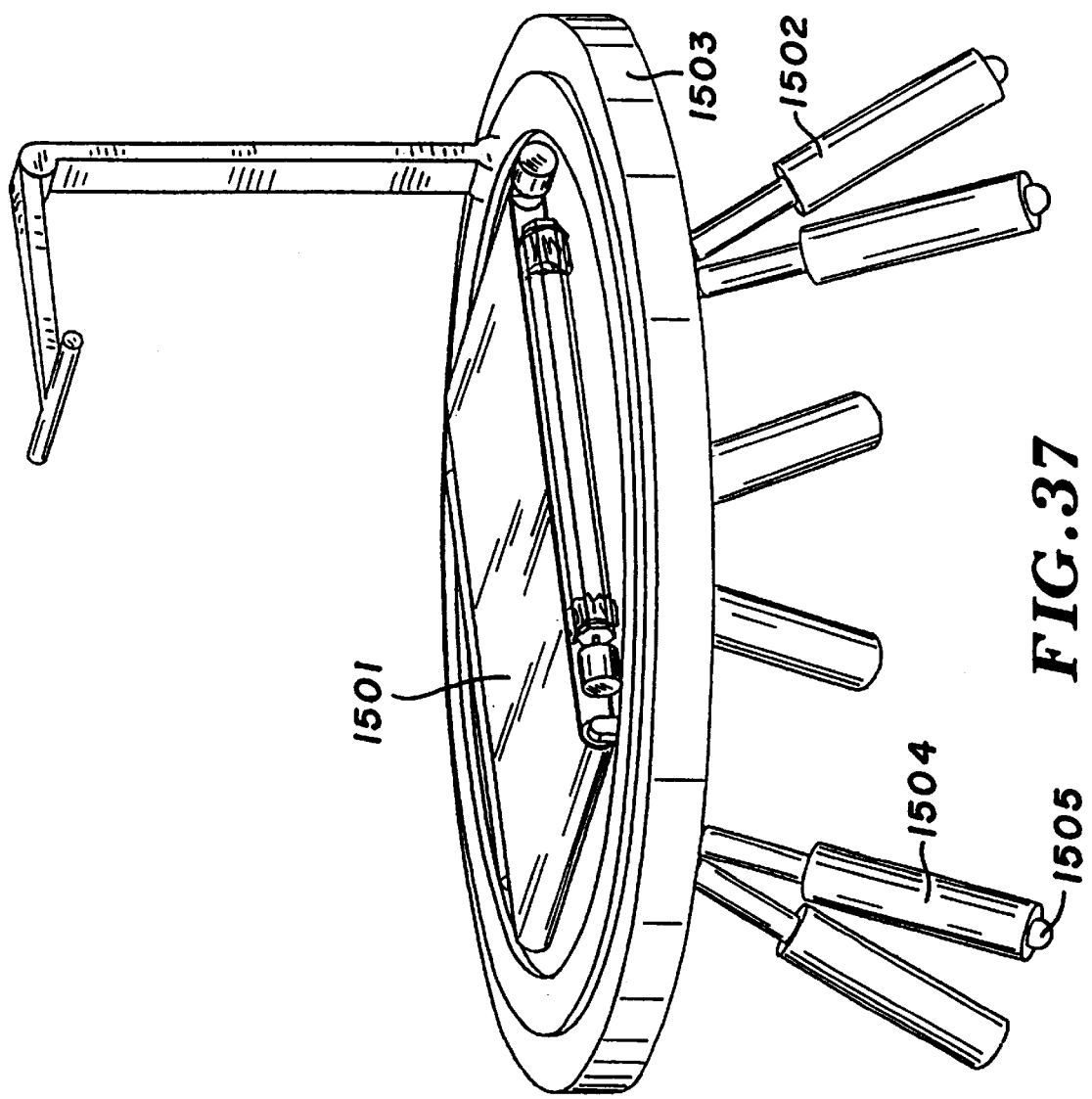
FIG. 37 is a perspective view of a treadmill similar to that of FIG. 24 but including a hexapod motion platform.

FIG. 37 depicts the combination of the simplified ODT of FIG. 24 (1501) with a standard 6 degree-of-freedom hexapod motion platform (1502). The base of the ODT (1503) serves as the attachment point for the six linear actuators (1504) which comprise the hexapod. Control of said cylinders provides full 6 DOF motion, and the control of said hexapod structure is well known to those skilled in the art of motion control. Cylinders are attached by ball joints (1505) to the ground, and by ball joints to the base (1503). Said cylinders may typically be actuated by hydraulics, pneumatics, or by a ball screw mechanism. The power and control means for the hexapod and ODT are omitted from the figure, but are understood to include a power conditioning means, a position sensing means, a control computer, and a control loop of the type described in FIG. 22. It is also understood that the ODT which attaches to the hexapod might just as easily be of the construction of FIGS. 21, 23, 25, 30, 33, 34, or 35.

Combining the ODT with an enclosed simulator such as the spherical motion environment discussed above in connection with FIGS. 1–20 would permit not only 3 to 6 degrees of freedom motion to be applied to the active surface of the ODT, but would also allow transitioning between waling, free-body flight, and vehicular simulation.

An ODT need not be the main interface device for an immersive system. It might, for example, be complimentary to a vehicle simulator. A standard simulator for a vehicle such as a jeep, mounted on a hexapod motion platform, could be placed adjacent to an ODT. As the user emerges from the vehicle simulator, the ODT would be positioned at virtual ground so that the user experiences a smooth transition between vehicular transport and ground motion.

Figure 38:
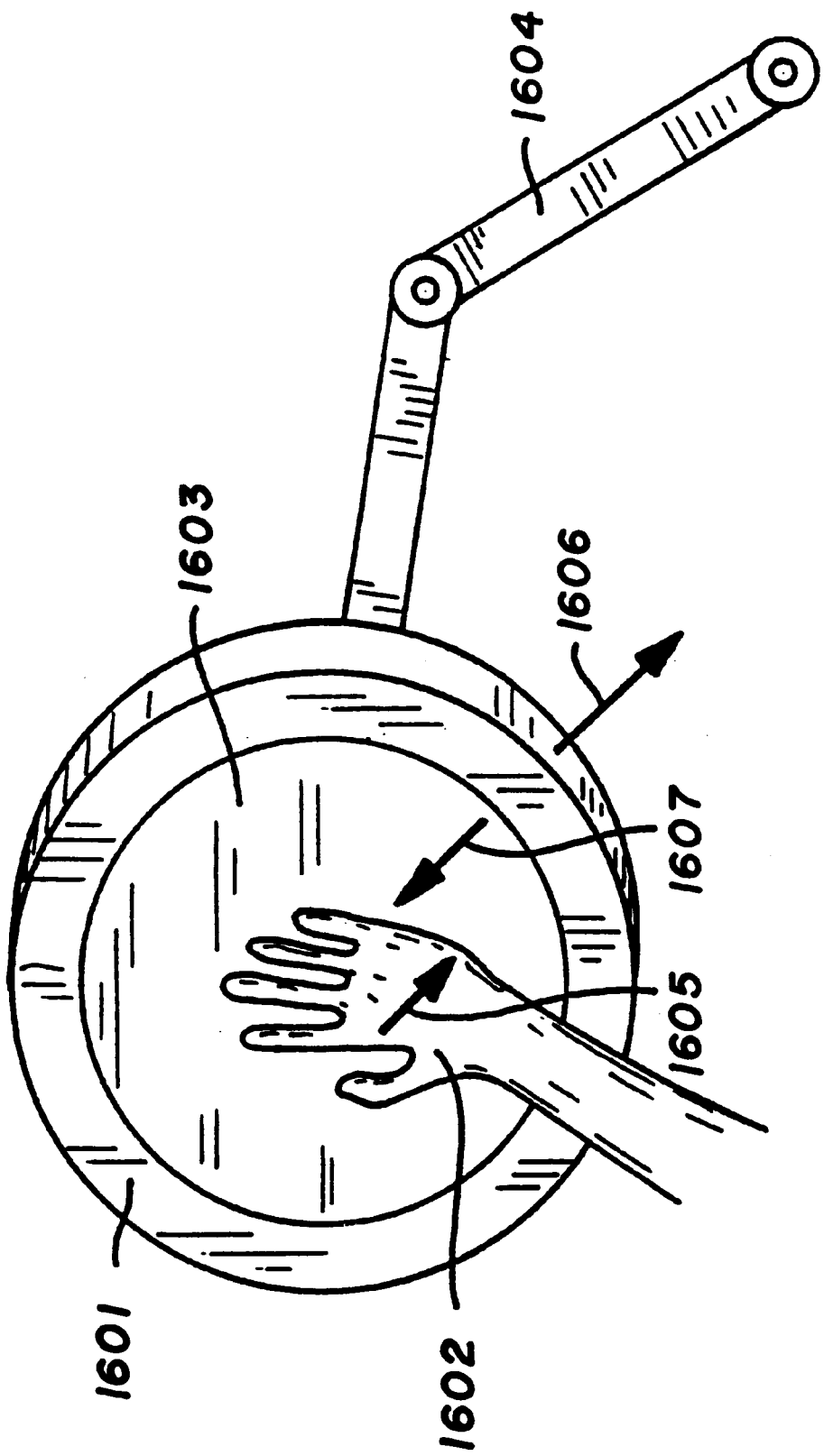
FIG. 38 is a perspective view of an active surface haptic display.

The unique, omni-directional qualities of an active surface such as those revealed herein may be employed in yet another way. As a haptic display device, an active surface is able to convey a sense of friction to a user as they run their hand along a surface. FIG. 38 presents an embodiment for an active-surface haptic display (1601). As the user's hand (1602) reaches out to contact a virtual object, the active surface (1603), which is only slightly larger than the major diameter of the user's palm print, is placed by a robotic mechanism (1604) where the user expects that surface to be. As the user moves their hand along the surface in one vector direction (1605), the haptic display mirrors the motion of the hand (1606), while the active surface creates an equal and opposite counter vector (1607) by moving its surface counter to the motion of the hand. The user resultingly feels the friction of the virtual solid's surface as the hand is rubbed across the moving surface. Because of the omni-directional nature of the active surface, the hand may trace an arbitrary path.

In its basic embodiment, the active surface is flat both because the support surface behind the activation means is most easily fabricated as a flat surface, and because the interlinked nature of the active means tends to prevent creation of surface contour. A flat surface will be effective for simulating a flat virtual solid, but it can only approximate a curved solid. A moderate amount of curvature may be achieved, however, by bowing the support surface upward. In the case of haptic display using an active surface, bowing might be accomplished using pressurized air behind a thin and flexible support surface. The amount of bowing may be controlled to correspond to the average curvature at the user's contact point with the virtual solid.

Description of the preferred embodiment as including an HMD, gloves, body suit, etc. does not exclude other applicable system configurations. There are a number of additional display options which may advantageously employ an ODT. For example, a display method may surround the user with large display screens. Spherical display surfaces have been employed for a number of years by various companies such as IMAX theater, or Evans & Sutherland, Inc. Most recently, Evans & Sutherland, Inc. revealed a spherical viewing structure which essentially surrounds the user to provide a nearly fully spherical viewing surface. A projected image tracks the user's viewing cone and displays the appropriate scene. An advanced display method being developed by the Human Interface Technology Lab places light directly on the retina of the eye using a weal laster beam. Any of these display systems and their related interfaces can benefit by use of the ODT.

Discussion of a VR system would not be complete without mention of telepresence. While VR systems substantially synthesize the user's sensory experience, telepresence systems extract their sensory information from a real, remote source and convey it to the senses of the user. In the simplest example, a pair of video cameras might be mounted on a 3 degree-of-freedom platform whose motion is slaved to the user's head. An HMD on the user's head receives the stereo images from the paired video cameras thus creating the visual illusion that the user's head is sitting on the platform instead of the two cameras! A system is this type which also includes sound is commercially available from Telepresence Research, Inc.

With regards to the ODT, it is feasible to couple the walking motion of the user to the lateral movement of a remote sensing device. Using natural walking and turning motion to steer and guide a remote device has the advantage of freeing both hands to perform other tasks rather than being restricted to a steering device like a joystick. A coupling of the telepresent remote with the user would likely include, besides the ODT, a video and sound link. Other system configurations might include one or two hand operated actuators which the operator uses to perform manipulation tasks at the remote site.

FIGS. 39a and 39b show a system in which a user at one site (FIG. 39a) controls the remote at a distal site (FIG. 39b). This advanced form of ODT and telepresent coupling would employ not only the above-mentioned systems, but also a means of conveying the remote's physical orientation. This is accomplished by using the balance cuff (710) to force the user (703) into the orientation (1703) of the remote (1704). Feedback on the cuff by the user, in turn, also forces the remote into the orientation of the user. By combining this orientational interplay with a bipedal remote and an exoskeletal structure (1705) which links the remote's legs to the user's legs, it is possible for the remote to balance itself in both standing and walking modes. Combination of the above structures to enable locomotion of the remote is made possible because the user is standing on an ODT active surface (702) which permits the user to employ their natural balance abilities as they navigate using the electronic eyes of the remote.

According to the provisions of the patent statutes, we have been explaining the principle, preferred construction and mode of operation of our invention and have illustrated and described what we now consider to represent its best embodiments. However, it should be understood that within the scope of the intended claims, the invention may be practiced otherwise than as specifically illustrated and described.

What is claimed is:

1. A motion simulating device, comprising:
   a capsule adapted to receive at least a portion of a user therein;
   at least three rollers carried by a frame and supportively abutting the capsule, wherein the capsule is supported solely by the rollers and at least two of the rollers are active multi-directional rollers for rotationally driving the capsule with respect to any of three orthogonal axes located at the center of the capsule; and
   a means for interactively controlling the motion of said capsule and said frame.

2. The motion simulating device of claim 1, wherein the interactive control means comprises:
   a visual display;
   a means for sensing the position of said capsule;
   a means for coordinating the motion of said capsule and a representation of motion on said visual display; and
   a means for controlling the motion of said capsule responding to a representation of motion of the user on said visual display.

3. The motion simulating device of claim 2, further comprising:
   a means for sensing the position of a user within said capsule;
   a means for coordinating the motion of a user and a representation of motion on the visual display; and
   a means for controlling said interactive solids responding to a representation of the motion of a user on visual display.

4. The motion simulating device of claim 1, wherein the frame comprises:
   plurality of beams;
   a plurality of connecting joints, each rigidly attached to two of said beams; and legs, each connected on one end to one of said connecting joints and on the other end to a supporting surface.

5. The motion simulating device of claim 4, wherein said connecting joints further comprise:
   beam receptacles, each fixedly attaching one end of said beams to said connecting joint; and
   a mounting plate for fixedly attaching one of said rollers to said connecting joint.

6. The motion simulating device of claim 4, wherein said actuator legs further comprise a means for changing the length of said actuator legs.

7. The motion simulating device of claim 6, wherein said means for changing the length of said actuator legs further comprises a hydraulic cylinder for telescoping a movable rod along the longitudinal axis of a support housing.

8. The motion simulating device of claim 6, wherein said means for changing the length of said actuator legs further comprises a ball screw for telescoping a movable rod along the longitudinal axis of a support housing.

9. The motion simulating device of claim 4, wherein said actuator legs are each rotatably connected on one end to one of said connecting joints and on the other end to a supporting surface.

10. The motion simulating device of claim 1, wherein at least one of said active rollers comprises:
    a drive wheel rotatable about a drive axis generally parallel to a tangent to the surface of said capsule and frictionally engaging said capsule; and
    a yoke for orienting the drive axis with respect to said capsule, said yoke being pivotable about an axis generally perpendicular to the drive axis.

11. The motion simulating device of claim 1, wherein there are only three rollers supportively abutting the capsule and one of said rollers is passive.

12. The motion simulating device of claim 1, further comprising active interactive solids connected to the interior of said capsule for imparting sensations of force directly upon a user.

13. The motion simulating device of claim 12, further comprising a translatable support arm.

14. The motion simulating device of claim 12, further comprising:
    a support arm;
    a back plate attached to said support arm;
    abdominal support plates hingedly connected to said back plate;
    first limb support plates hingedly connected to said abdominal support plates;
    second limb support plates hingedly connected to said first limb support plates;
    a means for positioning said abdominal support plates, said first limb support plates, and said second limb support plates, about the hinged connections; and
    a means for securely restraining user to said back plate, said abdominal support plates, said first limb support plates, and said second limb support plates.

15. The motion simulating device of claim 14, wherein said support arm is translatable.

16. The motion simulating device of claim 1 further comprising a treadmill mounted within the capsule, the treadmill having a track assembly comprising a user support movable in a first direction for supporting a user, said user support including a plurality of support members rotatable about axes generally parallel to the first direction; a first driver connected to the user support means to move the user support in the first direction; and a second driver cooperating with said support members to rotate said members, whereby the combined movements of the user support and the support members results in movement of the user on the user support in a second direction.

17. The motion simulating device of claim 16 wherein the user support comprises a pair of cylindrical members, at least one cylindrical member being connected to one of the first and second drivers to rotate the one cylindrical member; an endless belt trained about said cylindrical members moveable by the one cylindrical member in said first direction, said endless belt having rods for rotatably supporting the user support members for rotation about axes generally parallel to the first direction.

18. The motion simulating device of claim 17 wherein the second driver comprises a pair of rollers and an endless belt trained about said rollers, said second driver being connected to at least one of the rollers to move the belt; said belt having a top surface operably engagable with the user support members to rotate said support members.

19. The motion simulating device of claim 18 wherein said endless belt has an upper run defining the top surface, further comprising support means located below said upper run for folding the upper run in contiguous relationship relative to the user support members.

20. The motion simulating device of claim 16 wherein the user support includes rods and the user support members are cylindrical sleeves rotatably mounted on the rods.

21. The motion simulating device of claim 16 wherein the user support includes a plurality of longitudinal rods and the support members comprise spherical members rotatably mounted on the rods for rotation about the longitudinal axes of the rods.

22. The motion simulating device of claim 16 further comprising a virtual reality apparatus, the virtual reality apparatus comprising
 a first display mountable on a person's head for displaying visual images;
 a display control means for projection of an image;
 a speaker for generating sounds;
 a microphone;
 means for sensing the position of the person on the support; and
 means connected to the first display, display control means and speaker for generating images and sounds.

23. The motion simulating device of claim 22 further comprising interactive solids for providing the person with haptic feedback.

24. A motion simulating device having an active interactive solid for use in conjunction with a virtual reality display, comprising:
 a controllably movable physical medium having a sufficient substance for imparting the desired motion upon a user, the medium comprising an interactive support apparatus including a support arm and an interactive pneumatic support suit attached to said support arm; and
 a means for interactively regulating the motion of said physical medium for regulating the amount and direction of force applied upon a user.

25. The motion simulating device of claim 24 wherein the support arm is translatable.

26. The motion simulating device of claim 24, wherein said regulating means further comprises:
 a means for sensing the position of a user;
 a means for coordinating the motion of a user and a representation of the motion of the user on a visual display; and
 a means for regulating said controllably movable physical medium responding to a representation of the motion of the user.

27. The motion simulating device of claim 24 wherein the support arm is translatable, the interactive pneumatic support suit being attached to an end of the support arm.

28. A motion simulating device, comprising:
 a generally spherical capsule;
 a translatable frame for supporting said capsule, the frame including a plurality of beams, a plurality of connecting joints each rigidly orienting two of the beams, a plurality of actuator legs each rotatably connected on one end to one of the connecting joints and on the other end to a supporting surface;
 a plurality of rollers mounted to the connecting joints supportively abutting the capsule, and at least one of said rollers comprising an active roller, wherein the active roller comprises a drive wheel rotatable about a drive axis generally parallel to a tangent to the surface of said capsule and frictionally engaging said capsule, and a yoke for orienting the drive axis with respect to said capsule, the yoke being pivotable about an axis generally perpendicular to the drive axis;
 an interactive user support apparatus including a translatable support arm connected to an interactive pneumatic support suit; and
 a means for interactively controlling the motion of said capsule and said frame, the interactive control means including a visual display, a means for sensing the position of said capsule, a means for coordinating the motion of said capsule and a representation of motion on said visual display, a means for sensing the position of a user within said capsule, a means for coordinating the motion of a user and a representation of motion on the visual display, a means for controlling the motion of said capsule and at least one interactive solid responding to a representation of motion of the user on said visual display.

* * * * *